United States Patent
Ohashi et al.

[11] Patent Number: 6,057,071
[45] Date of Patent: May 2, 2000

[54] DIHYDROXYSILICON COMPOUND AND ELECTROPHOTOGRAPHIC PHOTORECEPTOR CONTAINING THE COMPOUND

[75] Inventors: Toyoshi Ohashi; Yasuko Osano; Yuko Kojima; Ichiro Yokotake; Hitoshi Ono; Yuka Nagao, all of Yokohama; Masatomi Ozawa, Inashiki-gun, all of Japan

[73] Assignee: Mitsubishi Chemical Corporation, Tokyo, Japan

[21] Appl. No.: 08/980,820

[22] Filed: Dec. 1, 1997

[30] Foreign Application Priority Data

| Nov. 29, 1996 | [JP] | Japan | 8-319856 |
| Dec. 5, 1996 | [JP] | Japan | 8-325210 |
| Feb. 28, 1997 | [JP] | Japan | 9-045972 |
| Oct. 17, 1997 | [JP] | Japan | 9-284172 |

[51] Int. Cl.$^7$ .................................................. G03G 5/06
[52] U.S. Cl. ................................ 430/56; 430/78; 540/128
[58] Field of Search ................................ 430/78, 56, 59.4; 540/128

[56] References Cited

U.S. PATENT DOCUMENTS

| 3,094,536 | 6/1963 | Kenney et al. ......................... 540/128 |
| 4,557,989 | 12/1985 | Branston et al. . |
| 5,132,190 | 7/1992 | Yamada et al. . |
| 5,235,104 | 8/1993 | Yamada et al. . |
| 5,283,146 | 2/1994 | Ohashi et al. . |
| 5,463,041 | 10/1995 | Nukada et al. . |
| 5,491,228 | 2/1996 | Ong et al. . |
| 5,595,846 | 1/1997 | Shigematsu et al. . |
| 5,622,801 | 4/1997 | Nukada et al. . |

FOREIGN PATENT DOCUMENTS

| 50-38543 | 4/1975 | Japan . |
| 7-53559 | 2/1995 | Japan . |
| 2 290 489 | 1/1996 | United Kingdom . |

OTHER PUBLICATIONS

Klein, Cornelius et al.. Manual of Mineralogy, New York: John Wiley & Sons. pp. 65–68, 1985.

E. Ciliberto, et al., J. Am. Chem. Soc., vol. 106, pp. 7748–7761, "π–πInteractions and Bandwidths in "Molecular Metals". A Chemical, Structural, Photoelectron Spectroscopic, and Hartree–Fock–Slater Study of Monomeric and Cofacially Joined Dimeric Silicon Phthaloyanines", 1984.

T. Ito, Nature, No. 4174, pp. 755–756, "A General Powder X–Ray Photography", Oct. 29, 1949.

*Primary Examiner*—Christopher D. Rodee
*Attorney, Agent, or Firm*—Oblon, Spivak, McClelland, Maier & Neustadt, P.C.

[57] ABSTRACT

An electrophotographic photoreceptor which is excellent in sensitivity, durability and environmental capability comprises a photosensitive layer containing dihydroxysilicon phthalocyanine which is monoclinic and has lattice constants a=12.8±1Å, b=14.5±1Å, c=6.8±1Å and β=94.4±1°.

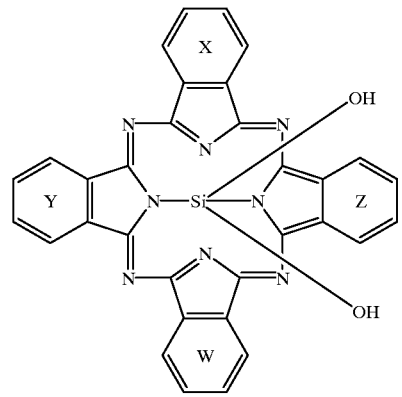

5 Claims, 36 Drawing Sheets

DIHYDROXYSILICON COMPOUND AND ELECTROPHOTOGRAPHIC PHOTORECEPTOR CONTAINING THE COMPOUND

FIELD OF THE INVENTION

The present invention relates to a dihydroxysilicon phthalocyanine compound having a new crystal form. It further relates to an electrophotographic photoreceptor having a photosensitive layer containing this silicon phthalocyanine compound, particularly a electrophotographic photoreceptor which can be effectively used in printers, facsimiles and copying machines. The present invention relates to a method of producing the dihydroxysilicon phthalocyanine compound.

BACKGROUND OF THE INVENTION

Conventional phthalocyanine compounds exhibit excellent photoconductivity and are used in electrophotographic photoreceptors, for example. Laser printers which use laser light in place of white light as a light source and have such advantages as high speed, high picture quality and no impact have been widely used in recent years and the development of a photoreceptor for use in such laser printers is now undertaken energetically. Most of them employ a system which uses a semiconductor laser whose progress has been remarkable in recent years as a light source and a photoreceptor which has high sensitivity to light having a long wavelength of 780 nm or so, the wavelength of the light source, is strongly desired. Under the circumstances, there have been reported some phthalocyanine compounds (1) which can be relatively easily synthesized, (2) which have an absorption peak of a long wavelength of 600 nm or more, and (3) which change in spectral sensitivity according to their center metal and crystal form and exhibit high sensitivity at the wavelength range of a semiconductor laser. Thus, the research and development of phthalocyanine compounds are under way energetically.

Phthalocyanine compounds differ from one another in absorption spectrum and photoconductivity according not only to type of their center metal but also to their crystal form. It is known that, when phthalocyanines having the same center metal differ in crystal form, their photoconductivities are greatly affected. For example, in the case of copper phthalocyanine, crystal forms such as α, γ, ε, π, χ, τ, ρ and δ other than a β stable form are known and it is known that these crystal forms can be shifted according to mechanical distortion, sulfuric acid treatment, organic solvent treatment, heat treatment and the like (see "Phthalocyanine" of organic Electronics Materials Series 6). Japanese Laid-open Patent Application No. Sho 50-38543 discloses the crystal forms and electrophotographic properties of copper phthalocyanine and teaches that an ε form shows the highest sensitivity when α, β, γ, and ε forms are compared.

As for hydroxymetal phthalocyanines, U.S. Pat. No. 4,557,989 discloses electrophotographic photoreceptors which comprise dihydroxygermanium phthalocyanine, dihydroxytin phthalocyanine and dihydroxysilicon phthalocyanine. Japanese Laid-open Patent Application No. Hei 6-214415 also reports electrophotographic photoreceptors comprising hydroxy metal phthalocyanines (Al, Ga, In, Si, Ge, Sn) and suggests one crystal form for dihydroxysilicon phthalocyanine.

However, even the dihydroxysilicon phthalocyanine having the above crystal form has problems in dispersibility, applicability of its dispersion and storage properties and cannot achieve sufficient electrophotographic properties such as charge acceptance. Even a phthalocyanine compound which has been proposed in the prior art is not satisfactory in terms of photosensitivity and durability when it is used as a photoconductive material. Therefore, the development of a phthalocyanine compound having a new crystal form is strongly desired. The present invention has been made in view of the above circumstances and it is an object of the present invention to provide a phthalocyanine compound having a new crystal form, which is excellent in photosensitivity, durability and environmental capability as a photoconductive material and an electrophotographic photoreceptor having high sensitivity, durability and stability.

A dihydroxy silicon phthalocyanine compound is produced in accordance with an acid paste or acid slurry method in which a corresponding halogenated silicon phthalocyanine compound is dissolved in sulfuric acid or a slurry of the compound is prepared and the solution or slurry is injected into a poor solvent such as water, or a method in which the compound is treated with an alkali such as sodium hydroxide, potassium hydroxide or ammonia water. In these methods, as large quantities of an acid, alkali and by-produced salt are present in the system, an operation for removing these is required. In many cases, a large quantity of water is used to wash the compound several times, thereby causing many problems in operation, exhaust water disposal and productivity. A salt or the like contained in phthalocyanine crystals cannot be removed with ease, thereby causing problems in the dispersibility of a pigment and the storage and applicability of its dispersion and making it impossible to achieve sufficient electrophotographic properties such as charge acceptance, sensitivity and low residual potential.

SUMMARY OF THE INVENTION

The present inventions have been made in view of the above circumstances in the prior art and it is an object of the present invention to provide a novel method of producing a dihydroxysilicon phthalocyanine compound which is excellent in photosensitivity, durability and environmental capability as a photoconductive material.

The inventor of the present invention has conducted intensive studies on the relationship between the crystal form and electrophotographic properties of a phthalocyanine compound and found that a dihydroxysilicon phthalocyanine compound which is monoclinic and has lattice constants a=12.8±1Å, b=14.5±1Å, c=6.8±1Å and β=94.4±1°, a dihydroxysilicon phthalocyanine compound having peaks at a Bragg angle 2 θ (±0.3°) of 9.2, 14.1, 15.3, 19.7 and 27.1° in the X-ray diffraction spectrum, or a dihydroxysilicon phthalocyanine compound showing Raman shifts at least at 685 $cm^{-1}$ and 1,542 $cm^{-1}$ in the FT-Raman spectrum and having an intensity ratio of a Raman shift at 685 $cm^{-1}$ to a Raman shift at 1,542 $cm^{-1}$ of 0.65 or less is excellent in photosensitivity, durability and environmental capability as a photoconductive material. That is, the present invention relates to a dihydroxysilicon phthalocyanine compound which is monoclinic and has lattice constants a=12.8±1Å, b=14.5±1Å, c=6.8±1Å and β=94.4±1°, a dihydroxysilicon phthalocyanine compound having peaks at a Bragg angle 2 θ (±0.3°) of 9.2, 14.1, 15.3, 19.7 and 27.1°, or a dihydroxysilicon phthalocyanine compound showing Raman shifts at least at 685 $cm^{-1}$ and 1,542 $cm^{-1}$ in the FT-Raman spectrum and having an intensity ratio of a Raman shift at 685 $cm^{-1}$ to a Raman shift at 1,542 $cm^{-1}$ of 0.65 or less, and to an electrophotographic photoreceptor containing the dihydroxysilicon phthalocyanine compound.

Further, the present inventors have conducted intensive studies on the relationship between the production method and electrophotographic properties of a dihydroxysilicon phthalocyanine compound and found that a dihydroxysilicon phthalocyanine compound can be produced easily and at a high yield by heating a halogenated silicon phthalocyanine compound in a polar solvent having a dielectric constant of 10 or more or a nitrogen-containing organic solvent in the presence of water. It has also been found that a dihydroxysilicon phthalocyanine compound produced by this method is excellent in photosensitivity, durability and environmental capability as a photoconductive material. Thus, the present invention relates to a method of producing a dihydroxysilicon phthalocyanine compound which is excellent as a photoconductive material.

Moreover, the present inventors have conducted intensive studies on the relationship between the production method and electrophotographic properties of a dihydroxysilicon phthalocyanine compound and found that a dihydroxysilicon phthalocyanine compound can be produced easily and at a high yield by heating an alkoxylated silicon phthalocyanine compound in a polar solvent having a dielectric constant of 15 or more in the presence of water. It has also been found that a dihydroxysilicon phthalocyanine compound produced by this method is excellent in photosensitivity, durability and environmental capability as a photoconductive material. Thus, the present invention relates to a method of producing a dihydroxysilicon phthalocyanine compound which is excellent as a photoconductive material.

DETAILED DESCRIPTION OF THE INVENTION

The present invention is described in detail hereinunder.

Figure 1:
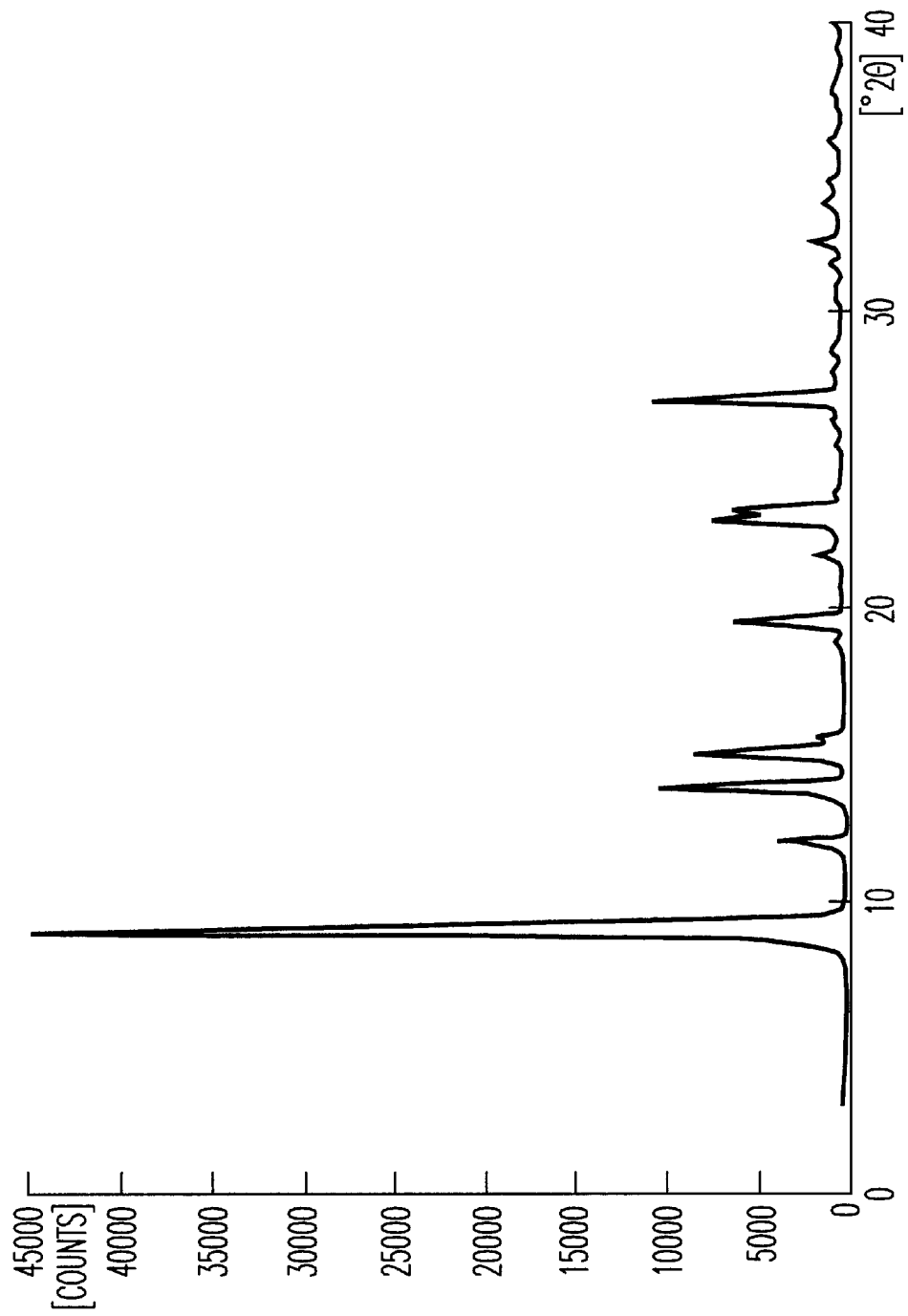
FIG. 1 is an X-ray diffraction diagram of a dihydroxysilicon phthalocyanine compound obtained in Example 1.

The dihydroxysilicon phthalocyanine compound of the present invention has a crystal form completely different from that of conventionally known dihydroxysilicon phthalocyanine, is monoclinic and has lattice constants $a=12.8\pm1\text{Å}$, $b=14.5\pm1\text{Å}$, $c=6.8\pm1\text{Å}$ and $\beta=94.4\pm1\text{Å}$, or peaks at a Bragg angle $2\theta$ ($\pm0.3°$) of 9.2, 14.1, 15.3, 19.7 and 27.1° in the X-ray diffraction spectrum as shown in FIG. 1. Although the dihydroxysilicon phthalocyanine compound has other peaks, for example, at 12.2, 23.1 and 23.4°, the peak intensity ratio, position and the like may change a little by production conditions, crystal orientation, the measurement method of the X-ray diffraction spectrum and the like. The dihydroxysilicon phthalocyanine compound of the present invention shows new lattice constants and X-ray diffraction pattern but its basic structure is represented by the following general formula (I).

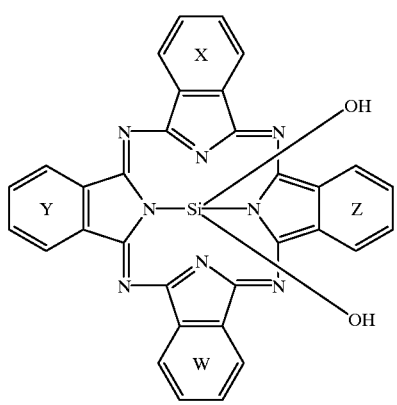
(I)

The benzene rings x, y, z, and w of the above dihydroxysilicon phthalocyanine compound may have an alkyl group, alkoxy group and halogen atom.

The above lattice constants are obtained in accordance with a method of Ito et al. by measuring the X-ray diffraction spectrum of the compound under the following conditions (Nature, 164, 755 (1949), "X-ray Studies on Polymorphism", Maruzen, Tokyo, 187).

TABLE 1

| X-ray | CuKα$_1$ |
|---|---|
| voltage | 50 kV |
| current | 250 mA |
| start angle | 5.00° |
| stop angle | 60.00° |
| step angle | 0.01° |
| measurement time | 10.00 sec/step |
| slit | DS 1°, SS 1°, RS 0.15 mm |

The above X-ray diffraction spectrum is measured under the following conditions.

TABLE 2

| X ray | CuKα$_1$ |
|---|---|
| voltage | 40 kV |
| current | 30 mA |
| start angle | 3.00° |
| stop angle | 40.00° |
| step angle | 0.050 |
| measurement time | 0.50 sec/step |
| slit | DS 1°, SS 1°, RS 0.2 mm |

The basic structure of a dihydroxysilicon phthalocyanine compound produced by the method of the present invention is represented by the above general formula (I).

The dihydroxysilicon phthalocyanine compound having a specific crystal form of the present invention can be produced by the following method, for example.

The first production method of the present invention uses a halogenated silicon phthalocyanine compound corresponding to the above general formula (I) to produce a dihydroxysilicon phthalocyanine compound. The halogenated silicon phthalocyanine compound can be produced by a known method as disclosed by Moser and Thomas, "Phthalocyanine Compounds" or the like. For example, the compound can be produced by o-phthalodinitrile or a derivative thereof, or 1,3-diiminoisoindoline or a derivative thereof together with a metal halide by heating, or heating the same in an organic solvent.

The production method of the present invention is characterized in that a dihydroxysilicon phthalocyanine compound is produced by heating the halogenated silicon phthalocyanine compound obtained by the above method in water and a polar solvent having a dielectric constant of 10 or more or a nitrogen-containing organic solvent substantially in the absence of an alkali to hydrolyze a halogen atom bonded to the center metal of phthalocyanine. Illustrative examples of the polar solvent having a dielectric constant of 10 or more include ketones such as acetone (20.7), diethyl ketone (17.0), diisopropyl ketone (12.6), ethyl methyl ketone (18.5) and cyclohexanone (18.3); alcohols such as methanol (32.6), ethanol (24.3), propanol (18.3 to 20.1), butanol (10.9 to 17.8), cyclohexanol (15.0) and benzyl alcohol (13.1); aldehydes such as acetoaldehyde (21.1), propylaldehyde (18.5), butylaldehyde (13.4) and benzaldehyde (17.8); nitro compounds such as nitromethane (35.9), nitroethane (28.4), nitropropane (23.2), nitrobenzene (34.8), dinitrobenzene (21 to 42), chloronitrobenzene (21 to 38), fluoronitrobenzene (28 to 40) and nitrotoluene (23 to 27); nitrile compounds such as acetonitrile (37.5), propionitrile (27.2), butylonitrile (20.3), benzonitrile (25.2), naphthonitrile (16.0) and ethyl cyanoacetate (27.7); carbonates such as ethylene carbonate (89.6) and propylene carbonate (69.0); and sulfoxides such as dimethyl sulfoxide (48.9) and sulfolane (43.3). Figures within parentheses indicate dielectric constant at 25° C. Illustrative examples of the nitrogen-containing organic solvent include aliphatic amines such as methylamine, ethylamine, propylamine, butylamine, pentylamine, hexylamine, secondary and tertiary amines thereof; aromatic amines such as aniline, N-methylaniline, N,N-dimethylaniline, toluidine, pyrrole, pyridine, picoline, lutidine, quinoline and isoquinoline; cyclic amines such as cyclohexylamine, dicyclohexylamine, piperazine, pyperidine, pyrrolidine, morpholine, imidazole and imidazolidinone; amides such as formamide, N-methylformamide, N,N-dimethylformamide, N,N-diethylformamide, acetoamide, N-methylacetoamide and N,N-dimethylacetoamide; and lactams such as 2-pyrrolidone, N-methylpyrrolidone and caprolactam. Out of these, organic solvents having a boiling point of 70° C. or more are preferred and organic solvents having a boiling point of 100° C. or more are more preferred. Although a hydrolysis reaction proceeds with the above organic solvents having a boiling point of 70° C. or less, the reaction takes long. Out of the polar solvents having a dielectric constant of 10 or more, carbonates such as ethylene carbonate (89.6) and propylene carbonate (69.0) and sulfoxides such as dimethylsulfoxide (48.9) and sulfolane (43.3) are preferred. Out of the nitrogen-containing organic solvents, hexylamine, cyclohexylamine, dicyclohexylamine, morpholine, quinoline, N,N-dimethylformamide, N,N-dimethylacetoamide, 2-pyrrolidone, N-methylpyrrolidone and caprolactam are preferred.

The amount of water required for the hydrolysis reaction is not particularly limited if it is more than the reaction theoretical molar amount. However, it is preferably 30 wt % or less, more preferably 20 wt % or less, based on the treating solvent (the above organic solvent).

The amount of the treating solvent (the above organic solvent+water) is generally 0.5 to 1,000 parts by weight, preferably 1 to 800 parts by weight, more preferably 5 to 300 parts by weight based on 1 part by weight of the halogenated silicon phthalocyanine compound.

The heating temperature at the time of a hydrolysis reaction which differs according to an organic solvent used is generally 0 to 250° C., preferably 70 to 200° C., more preferably 100 to 200° C. The treatment time is generally 0.5 to 100 hours.

The thus treated dihydroxysilicon phthalocyanine compound is obtained by isolating from the treating solvent, washing and drying. Since an inorganic substance such as an acid or a substantial amount of an alkali is not used in this method, a washing operation which has been required for removing an excessive acid or alkali in the prior art method is not necessary and a dihydroxysilicon phthalocyanine compound can be produced with ease and at a high yield. When an alkali is added, it is difficult to control the crystal form of the dihydroxysilicon phthalocyanine compound. The "substantial amount of an alkali" means an amount that requires a washing operation for removing an excessive alkali which has been required in the prior art method.

Another method for producing dihydroxysilicon phthalocyanine compound (of the general formula (I)) of the present invention uses an alkoxylated silicon phthalocyanine compound corresponding to the above general formula (I) to produce a dihydroxysilicon phthalocyanine compound. The alkoxylated phthalocyanine compound can be produced by a method as disclosed by Moser and Thomas, "Phthalocyanine Compounds". For example, it can be produced by a method in which 1,3-diiminoisoindoline or a derivative thereof is molten together with alkoxysilicon by heating or heated in an organic solvent, or a method in which a halogenated silicon phthalocyanine compound obtained by 1,3-diiminoisoindoline or a derivative thereof together with a metal halide by heating or heating in an organic solvent is reacted with a metal alkoxide such as sodium alkoxide.

The second production method of the present invention is characterized in that a dihydroxysilicon phthalocyanine compound is produced by heating the alkoxylated silicon phthalocyanine compound obtained by the above method in a polar solvent having a dielectric constant of 15 or more in the presence of water to hydrolyze an alkoxy group bonded to the center metal of phthalocyanine. Illustrative examples of the alkoxy group of the alkoxylated silicon phthalocyanine compound include methoxy, ethoxy, propoxy, isopropoxy, butoxy, sec-butoxy, ter-butoxy, pentoxy, hexoxy, cyclohexoxy, heptoxy, octoxy and the like. Illustrative examples of the polar solvent having a dielectric constant of 15 or more include ketones such as acetone (20.7), diethyl ketone (17.0), ethyl methyl ketone (18.5) and cyclohexanone (18.3); alcohols such as methanol (32.6), ethanol (24.3), propanol (18.3 to 20.1) and cyclohexanol (15.0); aldehydes such as acetoaldehyde (21.1), propylaldehyde (18.5) and benzaldehyde (17.8); nitro compounds such as nitromethane (35.9), nitroethane (28.4), nitropropane (23.2), nitrobenzene (34.8), dinitrobenzene (21 to 42), chloronitrobenzene (21 to 38), fluoronitrobenzene (28 to 40) and nitrotoluene (23 to 27); nitrile compounds such as acetonitrile (37.5), propiononitrile (27.2), butylonitrile (20.3), benzonitrile (25.2), naphthonitrile (16.0) and ethyl cyanoacetate (27.7); carbonates such as ethylene carbonate (89.6) and propylene carbonate (69.0); sulfoxides such as dimethyl sulfoxide (48.9) and sulfolane (43.3); amides such as formamide (111), N-methylformamide (182.4), N,N-dimethylformamide (36.7), N,N-diethylformamide, acetoamide (59), N-methylacetoamide (191.3), N,N-dimethylacetoamide (37.8) and N-methylpropionamide (172.2); and lactams such as 2-pyrrolidone and N-methylpyrrolidone (32.0). Figures within the parentheses indicate dielectric constants at 25° C. Out of these, organic solvents having a boiling point of 70° C. or more are preferred and organic solvents having a boiling point of 100° C. or more are more preferred. Although a hydrolysis reaction proceeds with organic solvents having a boiling point of 70° C. or less, the reaction takes long. Out of the polar solvents having a dielectric constant of 15 or more, carbonates such as ethylene carbonate (89.6) and propylene carbonate (69.0); sulfoxides such as dimethyl sulfoxide (48.9) and sulfolane (43.3); amides such as N,N-dimethylformamide, N,N-dimethylacetoamide, 2-pyrrolidone and N-methylpyrrolidone and lactams are preferred.

The amount of water required for a hydrolysis reaction is not particularly limited if it is more than the reaction theoretical molar amount. It is preferably 30 wt % or less, more preferably 20 wt % or less, based on the treating solvent (the above organic solvent).

The amount of the treating solvent is generally 0.5 to 1,000 parts by weight, preferably 1 to 800 parts by weight, more preferably 5 to 300 parts by weight based on 1 part by weight of the alkoxylated silicon phthalocyanine compound.

The heating temperature at the time of a hydrolysis reaction which differs according to an organic solvent used is generally 0 to 250° C., preferably 70 to 200° C., more preferably 100 to 200° C. The treatment time is generally 0.5 to 100 hours.

The thus treated dihydroxysilicon phthalocyanine compound can be obtained by isolating from the treating solvent, washing and drying. Since an inorganic substance such as an acid or alkali is not used in the production method of the present invention, a washing operation for removing an excessive acid or alkali which has been required in the prior art method is not necessary and a dihydroxysilicon phthalocyanine compound can be produced with ease and at a high yield.

A description is subsequently given of an electrophotographic photoreceptor which uses the above dihydroxysilicon phthalocyanine compound in a photosensitive layer as a photoconductive material. In the electrophotographic photoreceptor of the present invention, a photosensitive layer formed on an electroconductive support may have a single-layer structure or a multi-layer structure consisting of a charge-generation layer and a charge-transport layer. An under coat layer may be formed between the electroconductive support and the photosensitive layer, and a surface protective layer may be formed on the photosensitive layer in the single-layer structure and the charge-transport layer in the multi-layer structure.

Any electroconductive support may be used if it can be used as an electrophotographic photoreceptor. Illustrative examples of the electroconductive support include drums and sheets of metals such as aluminum, copper, nickel and the like, laminates of these metal foils, and these metal deposited materials. Plastic films, plastic drums, papers and the like prepared by applying conductive materials such as metal powders, carbon black, copper iodide and polymer electrolytes thereto together with an appropriate binder and making them conductive, plastic sheets and drums which are made conductive by containing conductive materials such as metal powders, carbon black and carbon fibers, and plastic films having conductive metal oxide layers such as tin oxide and indium oxide may also be used.

The under coat layer is effective for preventing the injection of unrequired electric charge from the electroconductive support and serves to enhance the charging of the photosensitive layer. It also serves to enhance adhesion between the photosensitive layer and the electroconductive support. The material of the under coat layer is an inorganic material such as an aluminum anode oxide coating film, aluminum oxide, aluminum hydroxide, titanium oxide or surface treated titanium oxide; organic layer such as polyvinyl alcohol, casein, polyvinyl pyrrolidone, polyacrylic acid, cellulose, gelatin, starch, polyurethane, polyimide or polyamide; organic zirconium compound, titanium chelate compound, titanium alkoxide compound, organic titanium compound, silane coupling agent or the like. The thickness of the under coat layer is preferably in the range of 0.1 to 20 $\mu$m, the most preferably 0.1 to 10 $\mu$m.

When the electrophotographic photoreceptor has a multilayer structure, the charge-generation layer is composed of the above dihydroxysilicon phthalocyanine compound and a binder resin. In the present invention, a charge-generating substance other than the above dihydroxysilicon phthalocyanine compound may be used. Illustrative examples of the charge-generating substance include dihydroxysilicon phthalocyanine having a crystal form different from that of the present invention, dialkoxysilicon phthalocyanine, titanyl phthalocyanine, gallium phthalocyanine, indium phthalocyanine, metal-free phthalocyanine and the like. Further, phthalocyanine-based compounds other than above, azo compounds, anthraquinone-based compounds, perylene-based compounds, polycyclic quinone-based compounds, methine squalate-based compounds and the like may also be used as the charge-generating substance. The charge-generating substance is not limited to these. The binder resin can be selected from a wide range of insulating resins. Preferred examples of the binder resin include polymers and copolymers of vinyl compounds such as styrene, vinyl acetate, vinyl chloride, vinylidene chloride, acrylic esters, methacrylic esters, acrylamide, acrylonitrile, vinyl alcohols, ethyl vinyl ethers and vinylpyridine, phenoxy resins, polysulfones, polyvinyl acetal, polyvinyl butyral, polycarbonates, polyesters, polyamides, polyurethanes, cellulose esters, cellulose ethers, epoxy resins, silicon resins, alkyd resins, polyarylates and the like. The binder resin is not limited to these.

The charge-generation layer can be formed by dispersing the above dihydroxysilicon phthalocyanine compound in a solution of the above binder resin in an organic solvent to prepare a coating solution, applying the coating solution to the electroconductive support and drying it. When the dihydroxysilicon phthalocyanine compound is dispersed, it may be partly molten. To disperse the compound, known means such as a ball mill, sand grind mill, epicyclic mill, roll mill, paint shaker or the like may be used. In this case, the ratio of the dihydroxysilicon phthalocyanine compound to the binder resin is not particularly limited but the binder resin is generally used in an amount of 1 to 1,000 parts, preferably 10 to 400 parts by weight, based on 100 parts by weight of the dihydroxysilicon phthalocyanine compound. When the proportion of the dihydroxysilicon phthalocyanine compound is too large, the stability of the coating solution tends to lower and when the proportion is too small, the residual potential tends to become high. Therefore, the ratio is suitably within the above range. Illustrative examples of the organic solvent used include ethers such as tetrahydrofuran, dioxane and ethylene glycol monomethyl ether; ketones such as acetone, methyl ethyl ketone and cyclohexanone; aromatic hydrocarbons such as toluene and xylene; halogenated aromatic hydrocarbons such as monochlorobenzene and dichlorobenzene; halogenated aliphatic hydrocarbons such as methylene chloride, chloroform, carbon tetrachloride, dichloroethane and trichloroethane; alcohols such as methanol, ethanol and isopropanol; esters such as methyl acetate and ethyl acetate; amides such as N,N-dimethylformamide and N,N-dimethylacetoamide; sulfoxides such as dimethyl sulfoxide; and the like. The coating solution may be applied by coating such as dip coating, spray coating, spinner coating, bead coating, wire bar coating, blade coating, roller coating, curtain coating, ring coating or the like. Drying after coating can be carried out in a still or ventilation state at 25 to 250° C. for 5 minutes to 3 hours. The thickness of the formed charge-generation layer is generally 0.1 to 5 $\mu$m.

The charge-transport layer is composed of a charge-transporting material and a binder resin and an additive such as an antioxidant as the case may be. Generally speaking, charge-transporting materials are divided into electron transporting materials and hole transporting materials. Both of them and mixtures thereof can be used in the electrophotographic photoreceptor of the present invention. The electron transporting materials include electron attractive compounds having an electron attractive group such as a nitro, cyano or ester group, such as nitrated fluorenones exemplified by 2,4,7-trinitrofluorenone and 2,4,5,7-tetranitrofluorenone, tetracyanoquinodimethane and quinones such as diphenoquinone. The hole transporting materials include electron donative organic photoconductive compounds such as carbazole-based, indole-based, imidazole-based, oxazole-based, thiazole-based, oxadiazole-based, pyrazole-based, pyrazoline-based, thiadiazole-based, benzooxazole-based, benzothiazole-based and naphthothiazole-based heterocyclic compounds, diaryl alkane derivatives such as diphenyl methane, triaryl alkane derivatives such as triphenyl methane, triarylamine derivatives such as triphenylamine, phenylene diamine derivatives, N-phenyl carbazole derivatives, diaryl ethylene derivatives such as stilbene, hydrazone-based derivatives, and greatly electron donative compounds substituted with amino substituents such as alkylamino group and diphenylamino group or electron donating groups such as alkoxy group and alkyl group or aromatic groups substituted with these electron donating groups. Further, polymers having groups composed of the above compounds as a main chain or a side chain such as polyvinyl carbazole, polyglycidyl carbazole, polyvinyl pyrene, polyvinyl phenyl anthracene, polyvinyl acridine, pyrene-formaldehyde resins may also be used. Stated more specifically, the following compounds can be used.

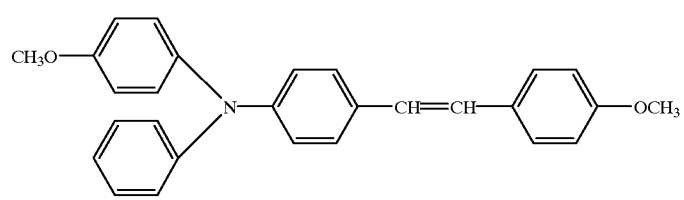
(1)
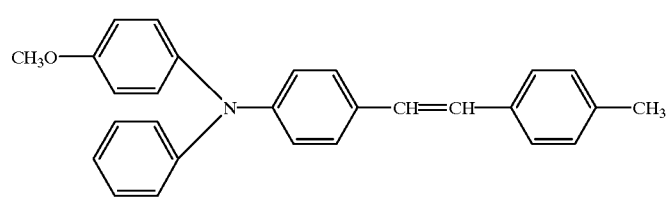
(2)
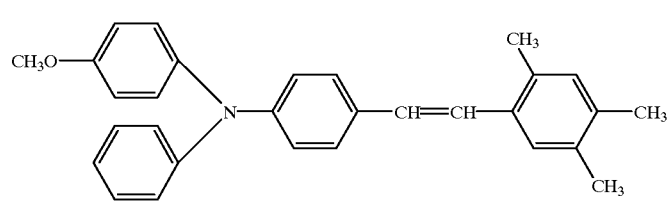
(3)
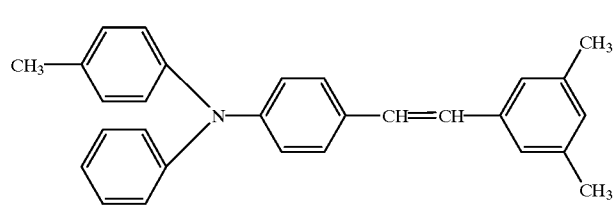
(4)
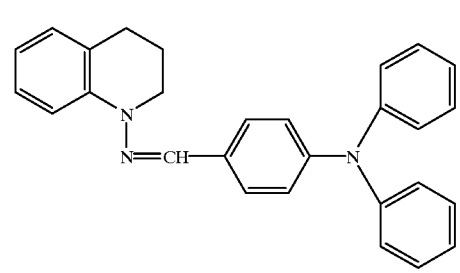
(5)
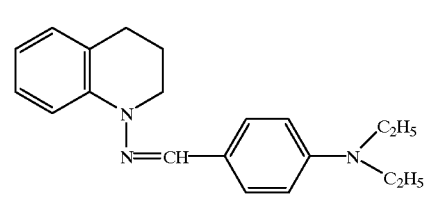
(6)
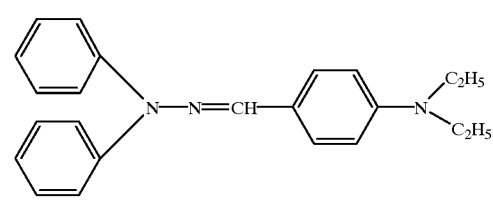
(7)

-continued
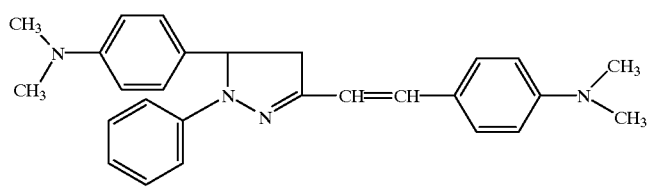
(8)
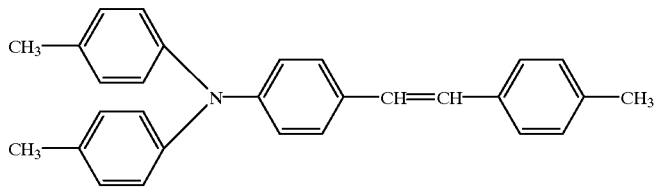
(9)
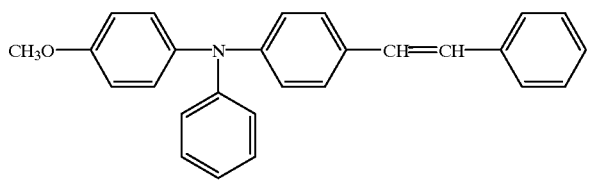
(10)
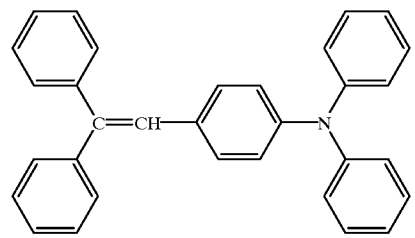
(11)
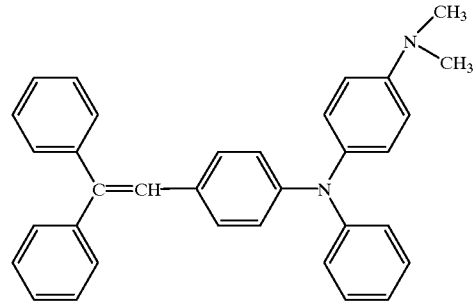
(12)
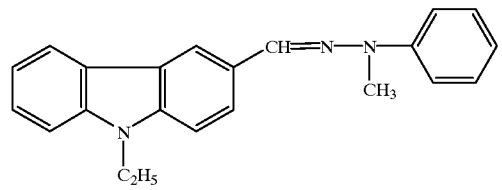
(13)
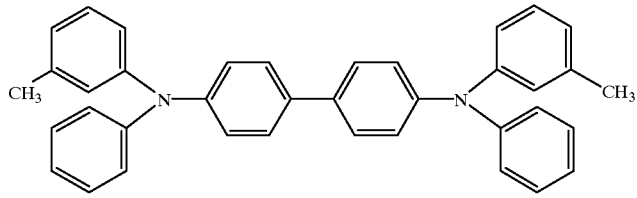
(14)

-continued
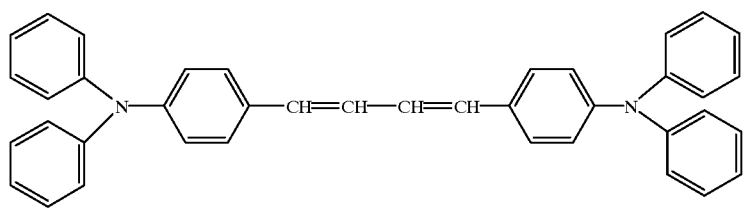
(15)
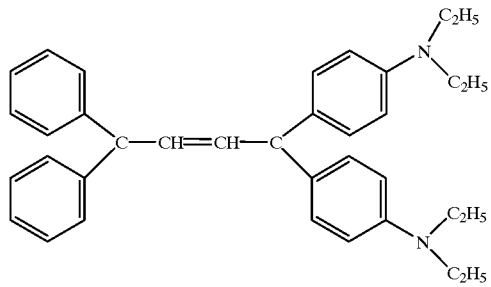
(16)
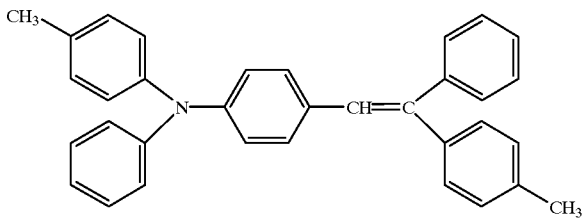
(17)
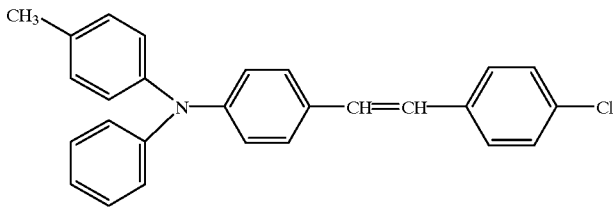
(18)
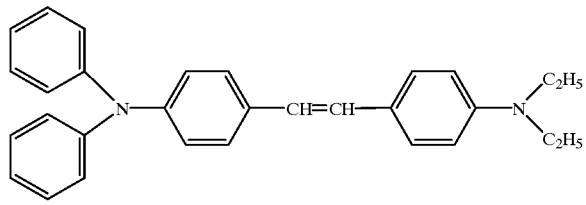
(19)
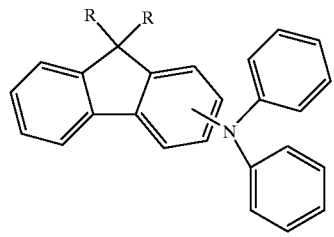
(20)
(R: hydrogen, methyl group, or ethyl group)

-continued

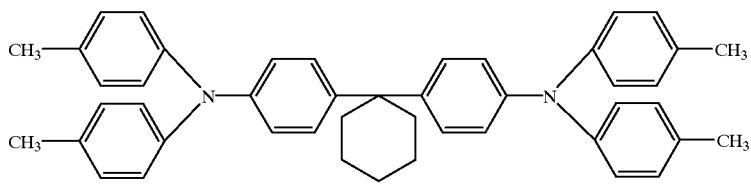

(21)

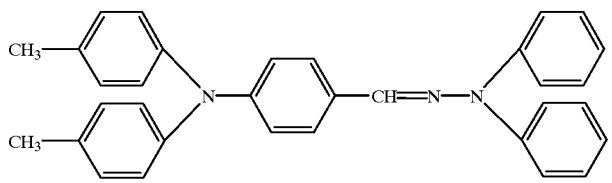

(22)

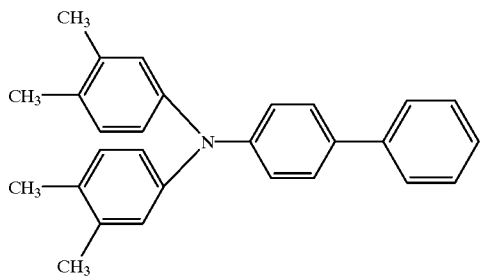

(23)

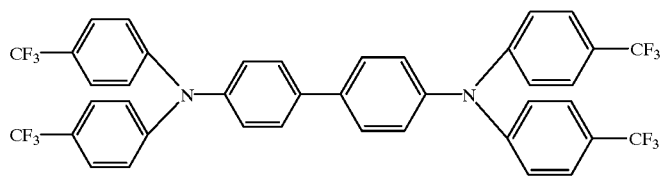

(24)

The same insulating resins as those used in the above-described charge-generation layer can be used as the binder resin. The ratio of the charge-transporting material to the binder resin is not particularly limited, but the binder resin is generally used in an amount of 20 to 3,000 parts by weight, preferably 50 to 1,000 parts by weight, based on 100 parts by weight of the charge-transporting material. The charge-transport layer can be formed by dissolving the above charge-transporting material and the binder resin in the same organic solvent as used in the above-described charge-generation layer to prepare a coating solution, applying the solution by the same method as described above and drying the coating. The thickness of the charge-transport layer is suitably in the range of 5 to 50 μm.

When the electrophotographic photoreceptor has a single-layer structure, the photosensitive layer is composed of the above dihydroxysilicon phthalocyanine compound, the charge-transporting material and the binder resin. Like the multi-layer photoreceptor, a charge-generating substance other than the dihydroxysilicon phthalocyanine compound of the present invention may be used. The same charge-transporting material and binder resin as described above are used. The photosensitive layer may contain such additives as an antioxidant and sensitizer as required. As for the ratio of the dihydroxysilicon phthalocyanine compound and the charge-transporting material to the binder resin, the binder resin is suitably used in an amount of 2 to 300 parts by weight based on 10 parts by weight of the dihydroxysilicon phthalocyanine compound and the charge-transporting material. As for the ratio of the dihydroxysilicon phthalocyanine compound to the charge-transporting material, the charge-transporting material is suitably used in an amount of 0.01 to 100 parts by weight based on 1 part by weight of the dihydroxysilicon phthalocyanine compound. After the coating solution is prepared as described above, the photosensitive layer can be obtained by applying and drying the coating solution.

As described in detail above, the present invention provides a dihydroxysilicon phthalocyanine compound having specific lattice constants and a specific crystal form which are not existent in the prior art. Further, an electrophotographic photoreceptor comprising a photosensitive layer composed of this dihydroxysilicon phthalocyanine compound is excellent in sensitivity and charge retention properties as evident from following examples and can be effectively used in printers, facsimiles and copying machines.

The present invention also provides a novel method for producing a dihydroxysilicon phthalocyanine compound.

Since the dihydroxysilicon phthalocyanine compound produced by the present invention has a large absorption peak at 800 to 1,000 nm, it can be used for near infrared absorption ink.

DETAILED DESCRIPTION OF THE PREFERRED EMBODIMENTS

The following examples are given to further illustrate the present invention. The present invention is not limited by the following examples if they do not depart from the scope of the present invention.

SYNTHESIS EXAMPLE 1

(Synthesis of dichlorosilicon phthalocyanine)

Figure 2:
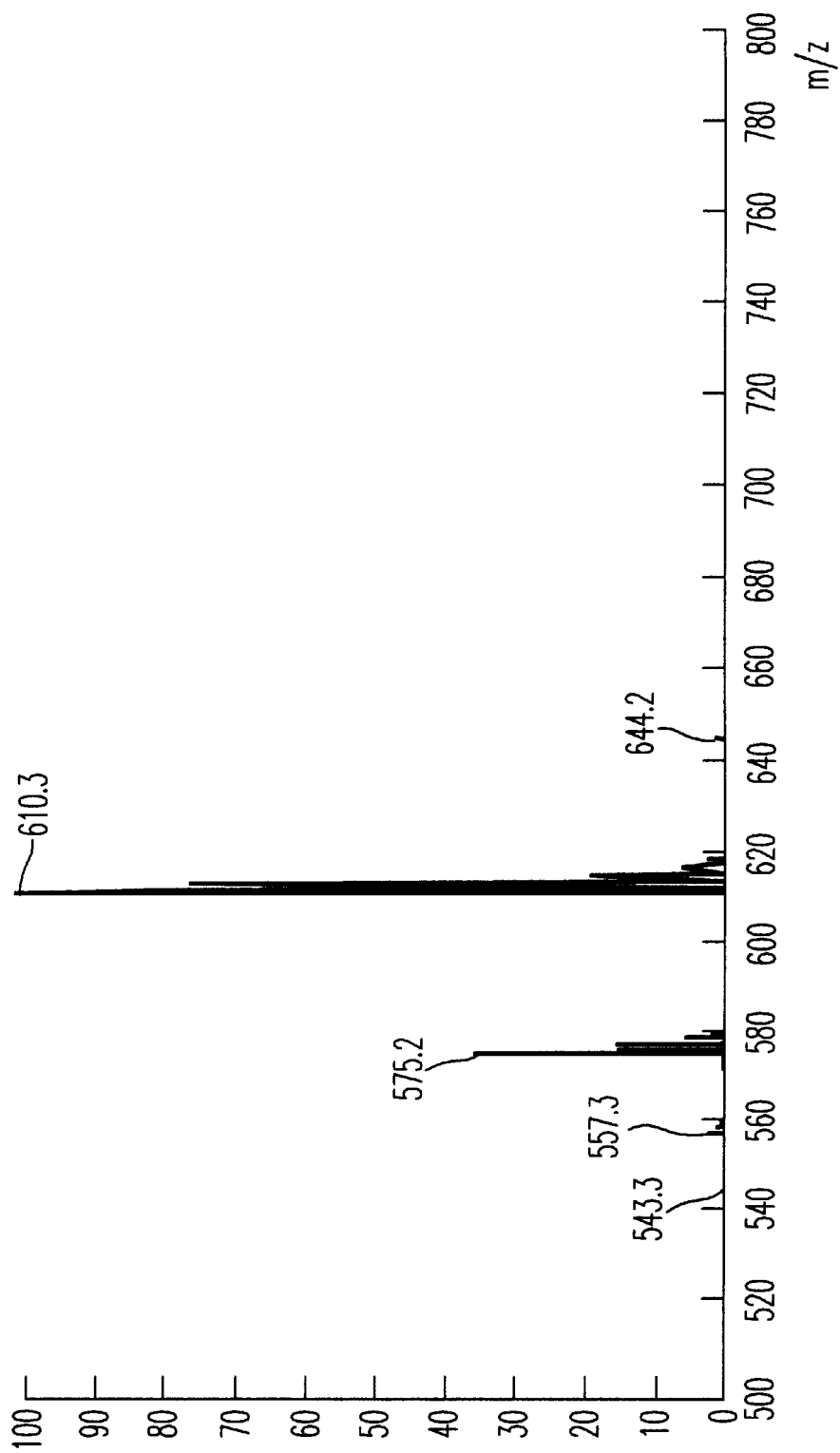
FIG. 2 is a mass spectral diagram of a dichlorosilicon phthalocyanine compound obtained in Synthesis Example 1.
Figure 3:
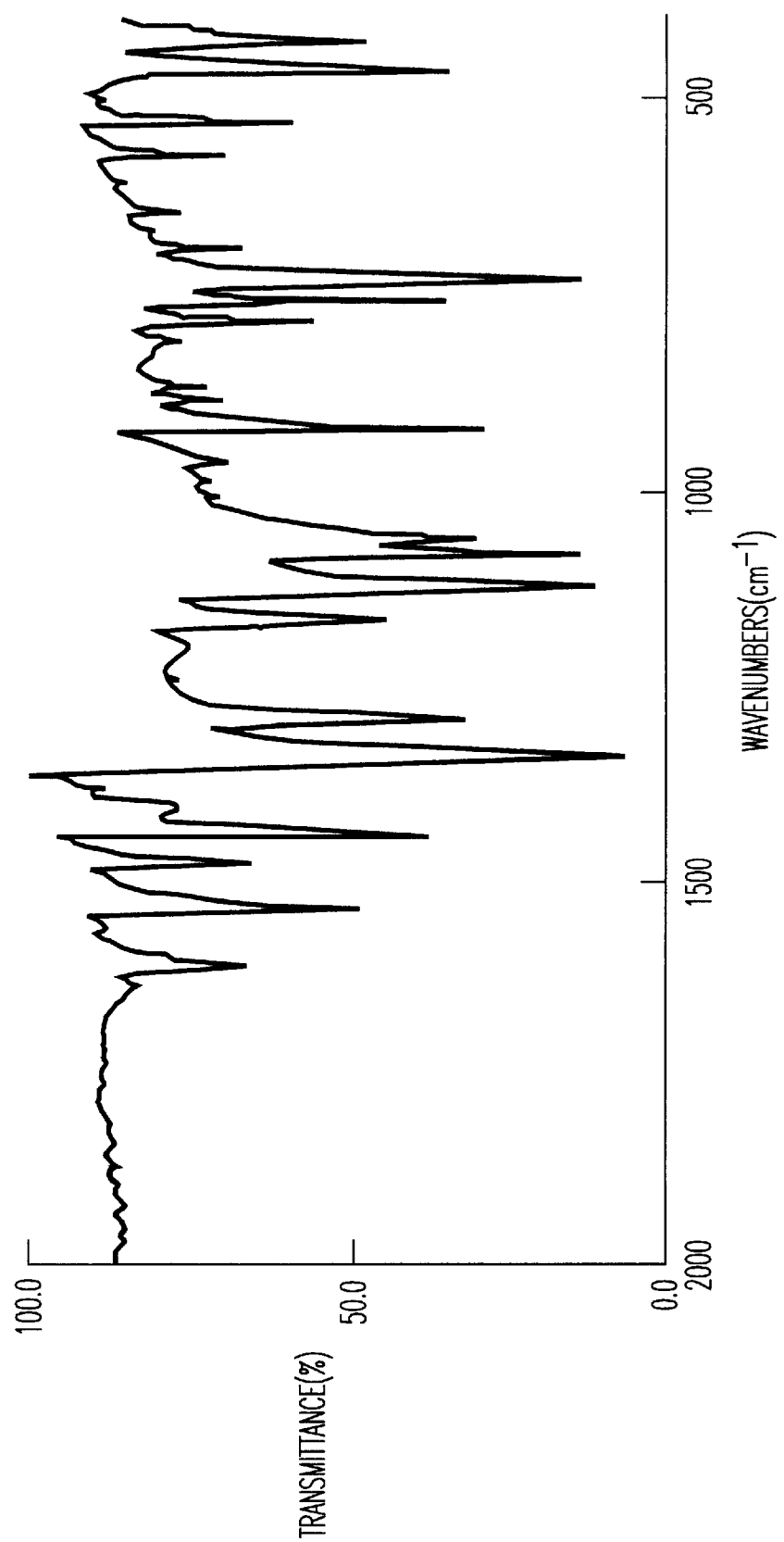
FIG. 3 is an IR spectral diagram of a dichlorosilicon phthalocyanine compound obtained in Synthesis Example 1.

43.5 g of 1,3-diiminoisoindoline and 73.5 g of silicon tetrachloride were added to 500 ml of quinoline and reacted at 210 to 220° C. for 1 hour in a nitrogen atmosphere. The reaction product was thermally filtrated at 180° C. and washed with quinoline and acetone in the order named. After the product was heated under reflux in 300 ml of acetone, crystals were separated by filtration and dried to obtain 38.7 g of dichlorosilicon phthalocyanine. Structural analysis was carried out by mass spectral (negative measurement), IR (KBr method) and elemental analysis methods. FIG. 2 shows the mass spectrum of dichlorosilicon phthalocyanine and FIG. 3 shows the IR spectrum thereof. In the mass spectrum, a peak of dichlorosilicon phthalocyanine was observed at an m/z of 610. A peak at an m/z of 575 is a fragment peak of the compound from which one chlorine atom is removed. In the IR spectrum, absorption special to dichlorosilicon phthalocyanine was observed at 1,533, 1,079 and 1,060 $cm^{-1}$ (see E. Ciliberto et al., J. Am. Chem. Soc., 106, 7748 (1984)). The results of the elemental analysis are shown below and almost agree with calculation values. It was thereby confirmed that the synthesized product was dichlorosilicon phthalocyanine.

TABLE 3

|  | C (%) | H (%) | N (%) | Si (%) | Cl (%) |
|---|---|---|---|---|---|
| measurement value | 62.65 | 2.58 | 18.12 | 4.48 | 12.21 |
| calculation value | 62.85 | 2.62 | 18.33 | 4.58 | 11.62 |

Figure 4:
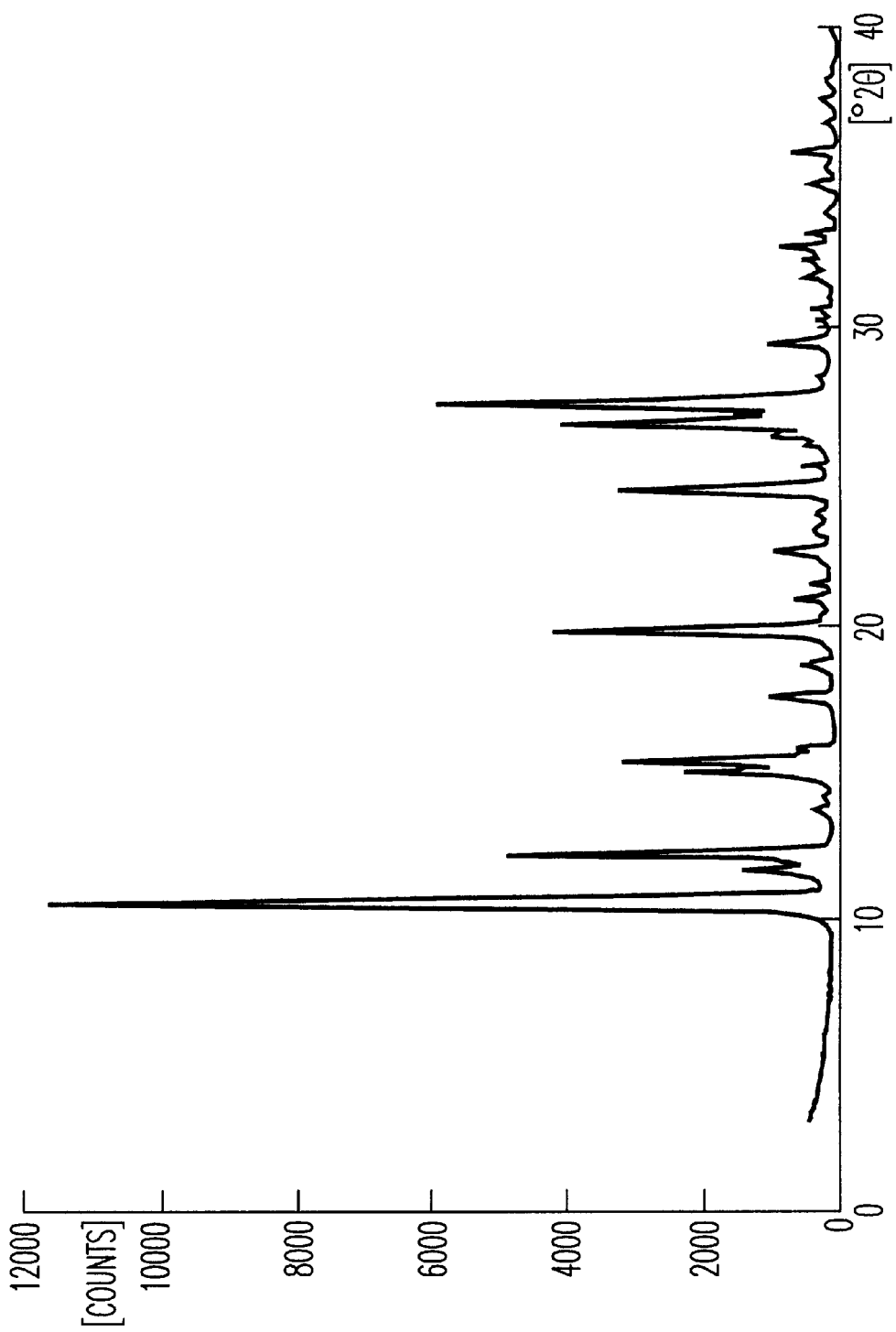
FIG. 4 is an X-ray diffraction diagram of a dichlorosilicon phthalocyanine compound obtained in Synthesis Example 1.

The X-ray diffraction spectrum of the obtained dichlorosilicon phthalocyanine is shown in FIG. 4. It has peaks when 2θ is 10.7, 12.3, 15.5, 17.6, 19.9, 24.6, 26.8 and 27.6°, respectively.

SYNTHESIS EXAMPLE 2

(Synthesis of dimethoxysilicon phthalocyanine)

Figure 5:
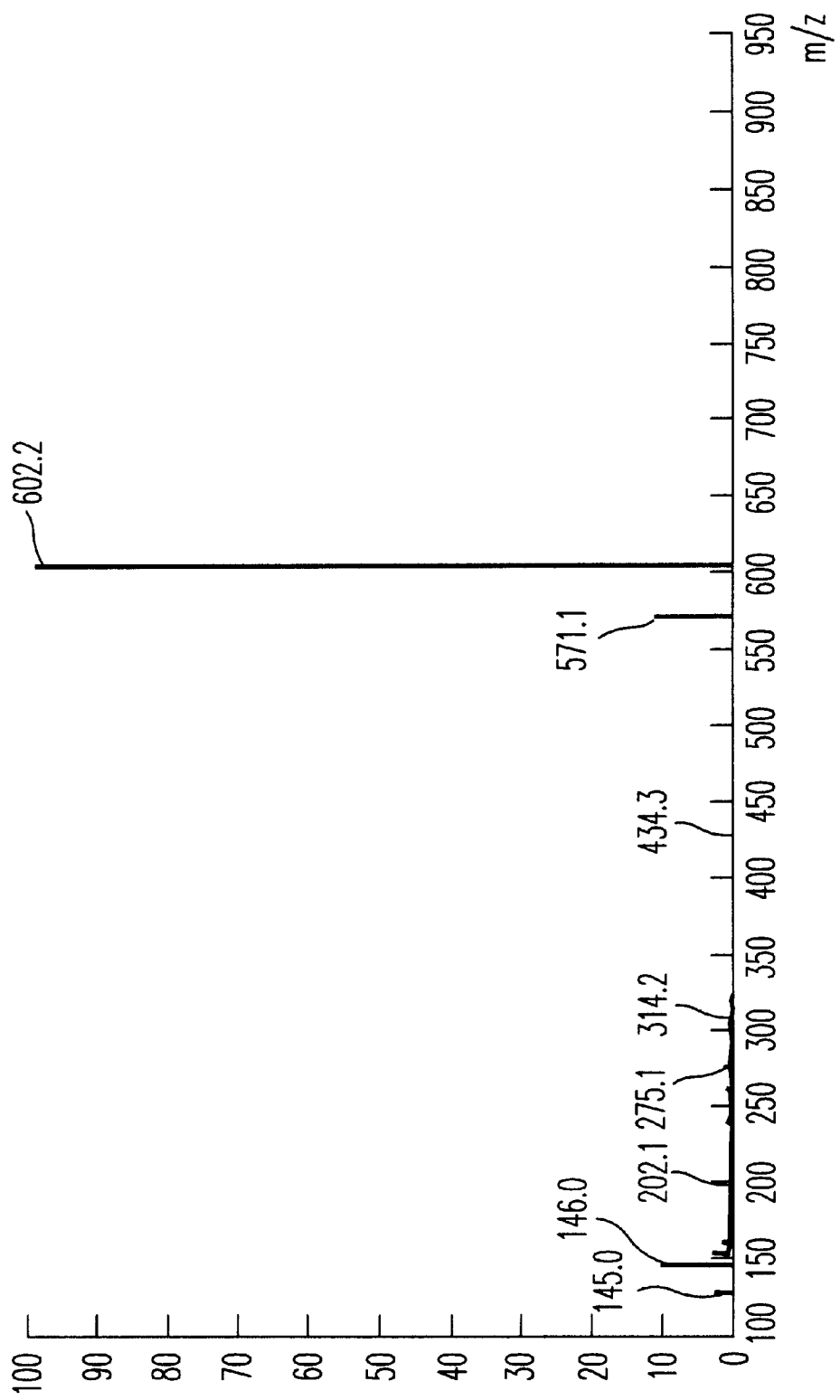
FIG. 5 is a mass spectral diagram of a dimethoxysilicon phthalocyanine compound obtained in Synthesis Example 2.

10 g of dichlorosilicon phthalocyanine synthesized in Synthesis Example 1 was added to a mixture solution of 1.86 g of sodium methoxide, 100 ml of methanol and 100 ml of pyridine and reacted under reflux for 3 hours. The reaction product was thermally filtrated and washed with methanol, water and acetone in the order named. Thereafter, it was washed in 100 ml of water several times, its neutralization was confirmed, and crystals were separated by filtration and dried to obtain 9.7 g of dimethoxysilicon phthalocyanine. Structural analysis was carried out by mass spectral (negative measurement), IR (KBr method) and elemental analysis methods. FIG. 5 shows the mass spectrum of dimethoxysilicon phthalocyanine. In the mass spectrum, a peak of dimethoxysilicon phthalocyanine was observed at an m/z of 602. A peak at an m/z of 571 is a fragment peak of the compound from which one methoxy group is removed. The results of the elemental analysis are shown below and almost agree with calculation values. It was thereby confirmed that the synthesized product was dimethoxysilicon phthalocyanine.

TABLE 4

|  | C (%) | H (%) | N (%) | Si (%) |
|---|---|---|---|---|
| measurement values | 68.02 | 3.72 | 18.71 | 4.70 |
| calculation values | 67.78 | 3.65 | 18.60 | 4.65 |

Figure 6:
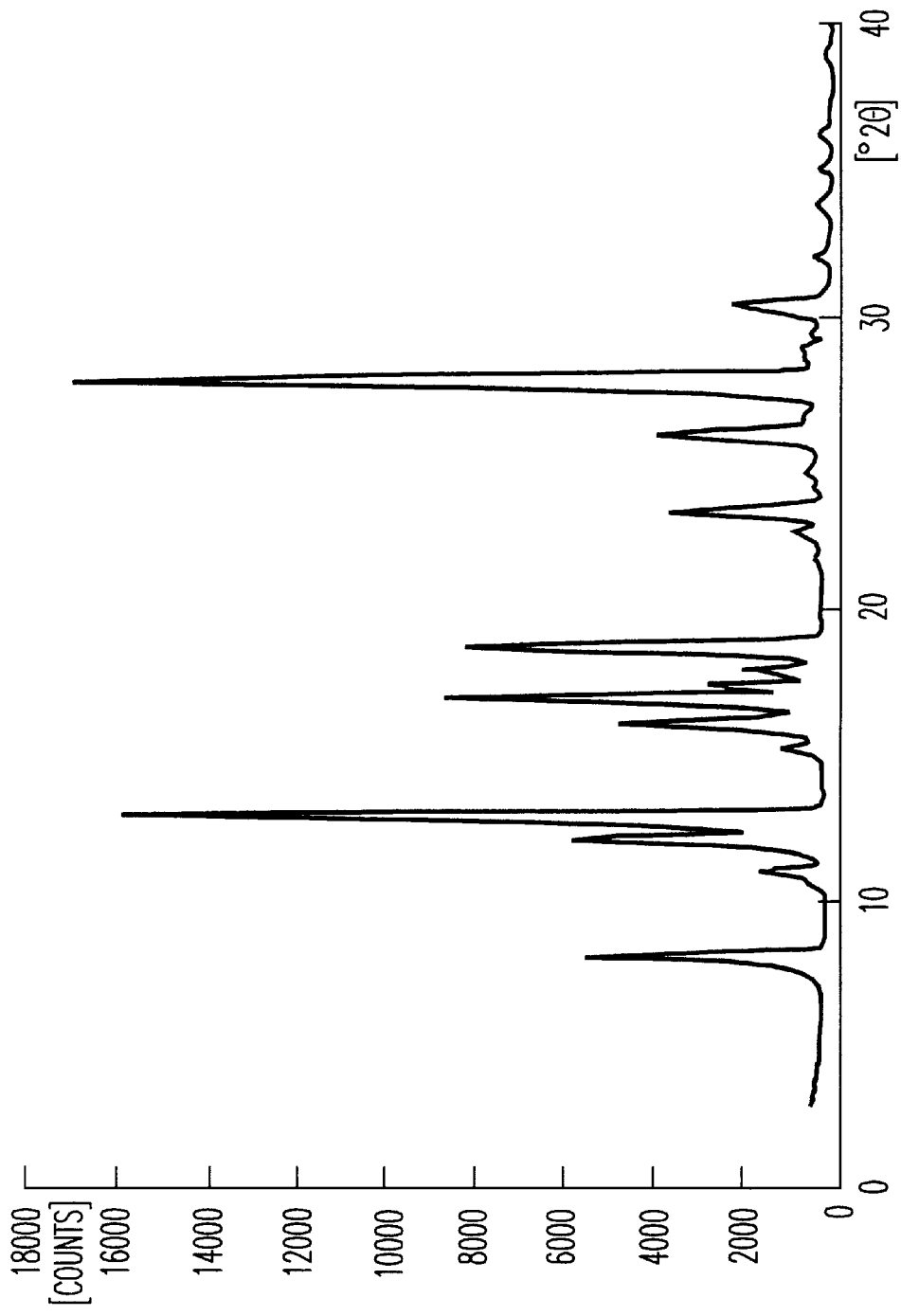
FIG. 6 is an X-ray diffraction diagram of a dimethoxysilicon phthalocyanine compound obtained in Synthesis Example 2.

FIG. 6 shows the X-ray diffraction spectrum of the obtained dimethoxysilicon phthalocyanine. It has peaks when 2θ is 8.1, 12.2, 13.0, 17.0, 18.7, 23.3, 26.0, 27.8 and 30.4°, respectively.

Synthesis of dihydroxysilicon phthalocyanine

EXAMPLE 1

Figure 7:
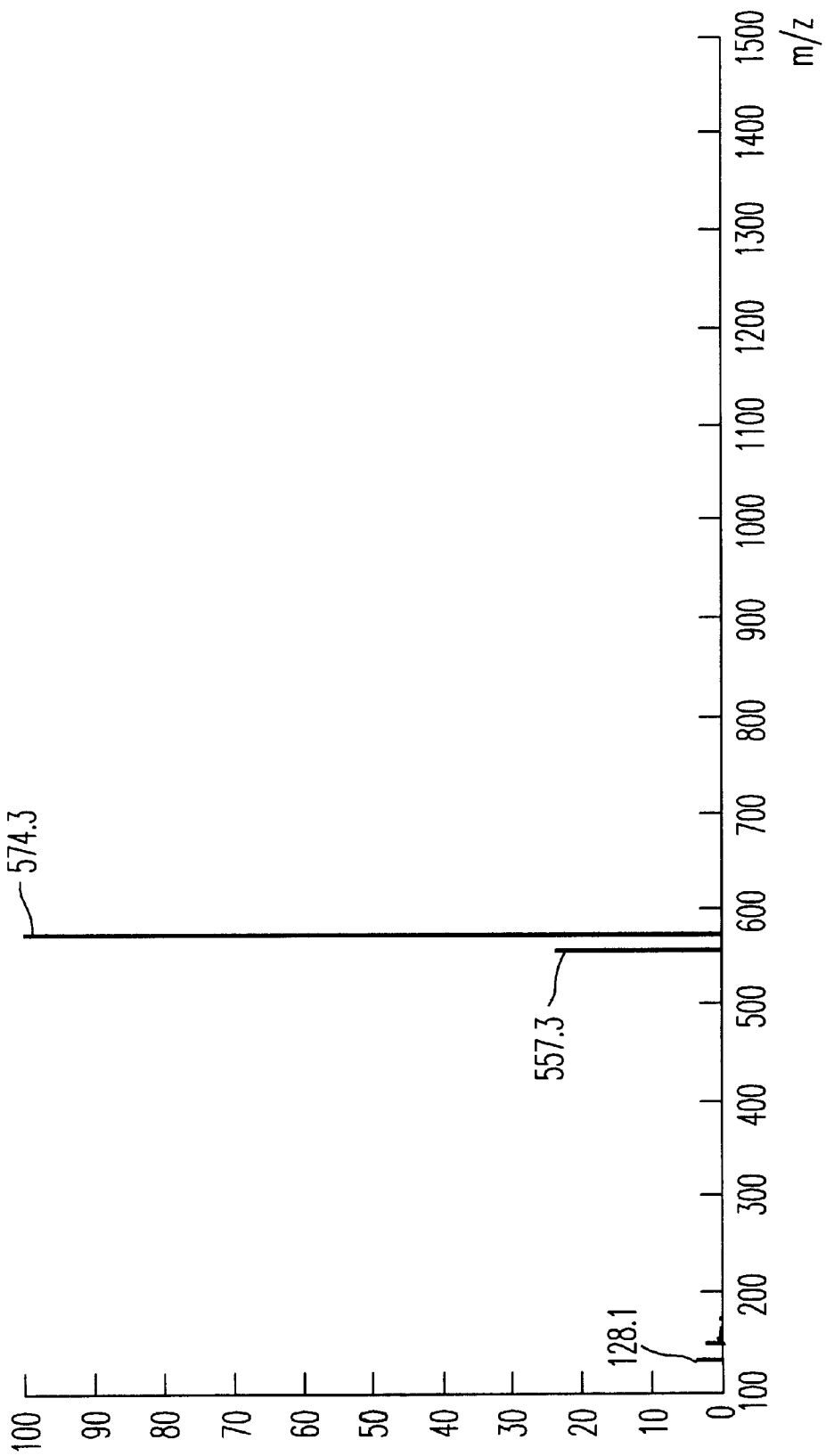
FIG. 7 is a mass spectral diagram of a dihydroxysilicon phthalocyanine compound obtained in Example 1.
Figure 8:
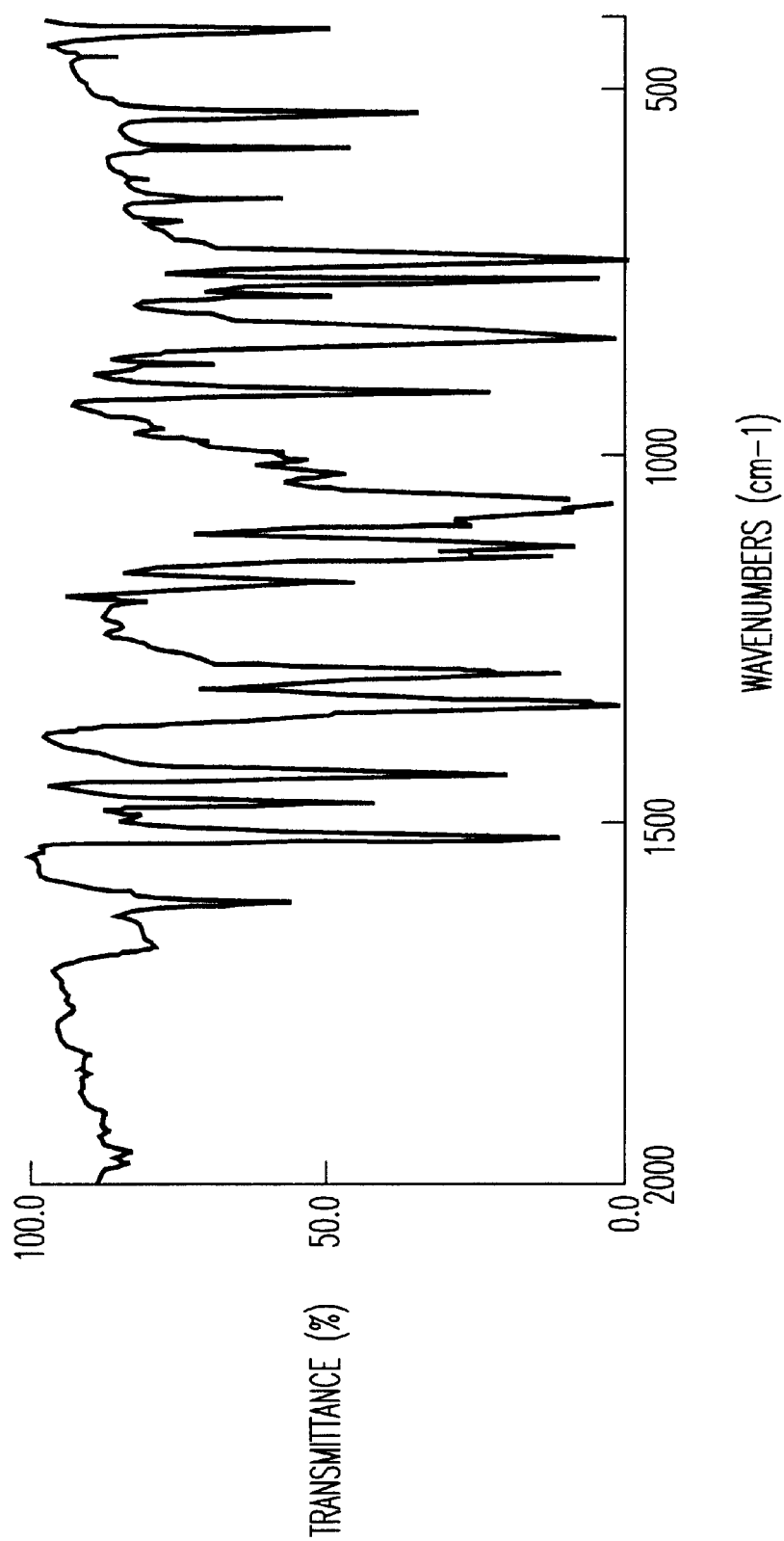
FIG. 8 is an IR spectral diagram of a dihydroxysilicon phthalocyanine compound obtained in Example 1.

10 g of dichlorosilicon phthalocyanine synthesized in Synthesis Example 1 was added to 5 g of water and 95 g of N-methylpyrrolidone (95% NMP aqueous solution) and reacted at 130° C. for 8 hours. The reaction product was thermally filtrated and washed with NMP and acetone in the order named. After the product was stirred in 50 ml of acetone at room temperature, crystals were separated by filtration and dried to obtain 8.4 g of dihydroxysilicon phthalocyanine. Structural analysis was carried out by mass spectral (negative measurement), IR (KBr method) and elemental analysis methods. FIG. 7 shows the mass spectrum of dihydroxysilicon phthalocyanine and FIG. 8 shows the IR spectrum thereof. In the mass spectrum, a peak of dihydroxysilicon phthalocyanine was observed at an m/z of 574. A peak at an m/z of 557 is a fragment peak of the compound from which one hydroxyl group is removed. In the IR spectrum, absorption special to dihydroxysilicon phthalocyanine was observed at 1,519, 1,066 and 839 $cm^{-1}$ (see the above thesis). The results of the elemental analysis are shown below and almost agree with calculation values. It was thereby confirmed that the synthesized product was dihydroxysilicon phthalocyanine.

TABLE 5

|  | C (%) | H (%) | N (%) | Si (%) | Cl (%) |
|---|---|---|---|---|---|
| measurement values | 62.70 | 3.10 | 19.10 | 4.94 | 0.03 |
| calculation values | 66.89 | 3.16 | 19.50 | 4.89 | 0 |

The structural analysis of the obtained dihydroxysilicon phthalocyanine was carried out in accordance with the method of Itoh. It was found to be monoclinic and have lattice constants a=12.78Å, b=14.61Å, c=6.79Å and β=94.4°. According to the X-ray spectrum (FIG. 1), it was confirmed that it was dihydroxysilicon phthalocyanine having the crystal form of the present invention and a main peak at a 2θ of 9.2° and other peaks at 12.2, 14.0, 15.3, 19.7, 23.4 and 27.1°, respectively.

EXAMPLE 2

Figure 9:
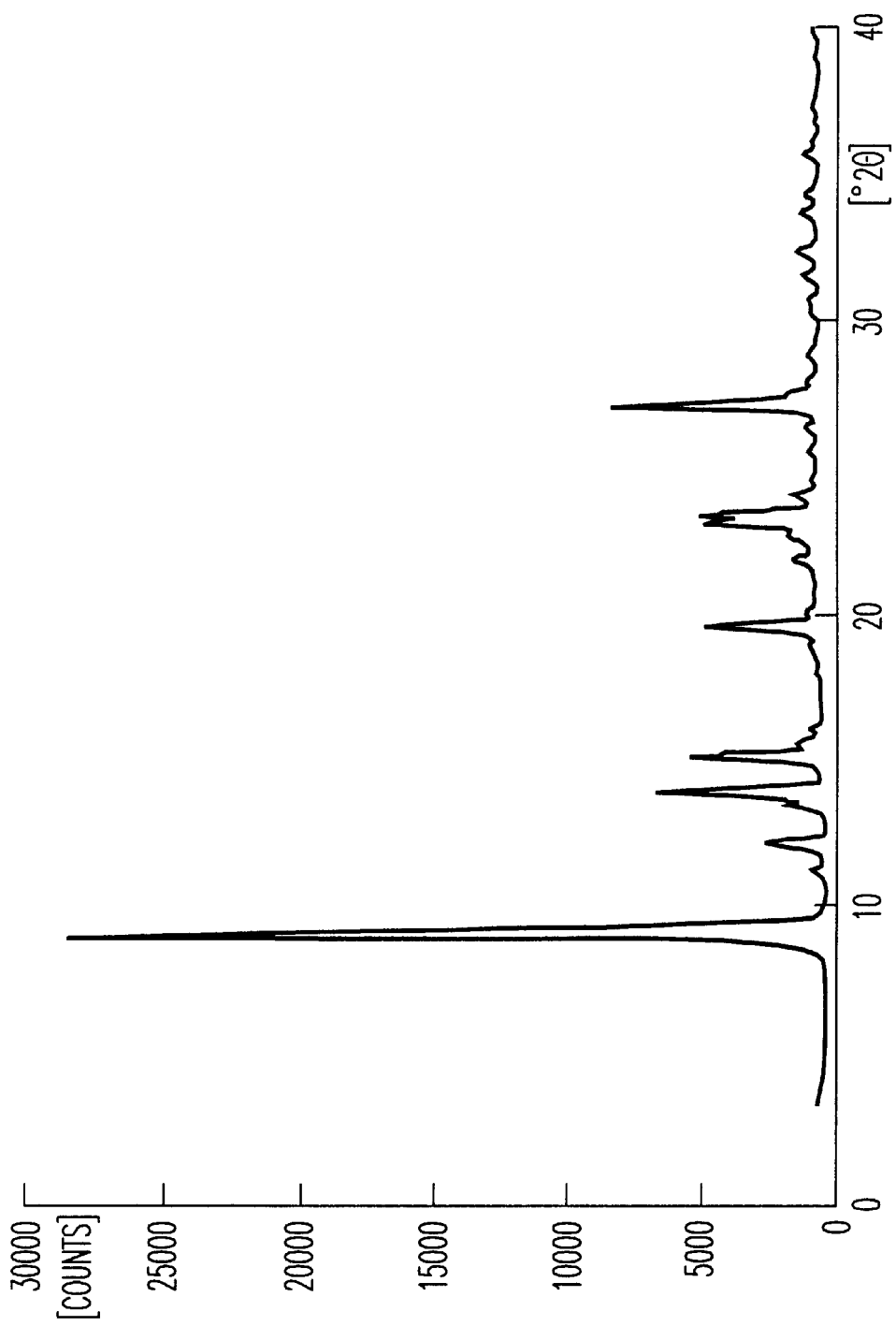
FIG. 9 is an X-ray diffraction diagram of a dihydroxysilicon phthalocyanine compound obtained in Example 2.

10 g of dichlorosilicon phthalocyanine synthesized in Synthesis Example 1 was added to 10 g of water and 90 g of propylene carbonate (90% PCN aqueous solution) and reacted at 120° C. for 10 hours. The reaction product was thermally filtrated and washed with PCN and acetone in the order named. After the product was stirred in 50 ml of acetone at room temperature, crystals were separated by filtration and dried to obtain 8.4 g of dihydroxysilicon phthalocyanine. When structural analysis was carried out by mass spectral (negative measurement) and IR (KBr method) methods, the same spectrum as that of Example 1 was obtained. Therefore, it was confirmed that the product was dihydroxysilicon phthalocyanine. According to the X-ray diffraction spectrum (FIG. 9), the obtained dihydroxysilicon phthalocyanine is a dihydroxysilicon phthalocyanine having the crystal form of the present invention and a main peak at a 2 θ of 9.2° and other peaks at 12.2, 14.0, 15.3, 19.7, 23.4 and 27.1°, respectively.

EXAMPLE 3

10 g of dimethoxysilicon phthalocyanine synthesized in Synthesis Example 2 was added to 5 g of water and 95 g of N-methylpyrrolidone (95% NMP aqueous solution) and reacted at 120° C. for 3 hours. The reaction product was thermally filtrated and washed with NMP and acetone in the order named. After the product was stirred in 100 ml of acetone at room temperature, crystals were separated by filtration and dried to obtain 8.0 g of dihydroxysilicon phthalocyanine. When structural analysis was carried out by mass spectral (negative measurement) and IR (KBr method) methods, the same spectrum as that of Example 1 was obtained. Therefore, it was confirmed that the product was dihydroxysilicon phthalocyanine. The results of elemental analysis are shown below and almost agree with calculation values.

TABLE 6

|  | C (%) | H (%) | N (%) | Si (%) |
|---|---|---|---|---|
| measurement values | 62.70 | 3.10 | 19.10 | 4.94 |
| calculation values | 66.89 | 3.16 | 19.50 | 4.89 |

Figure 10:
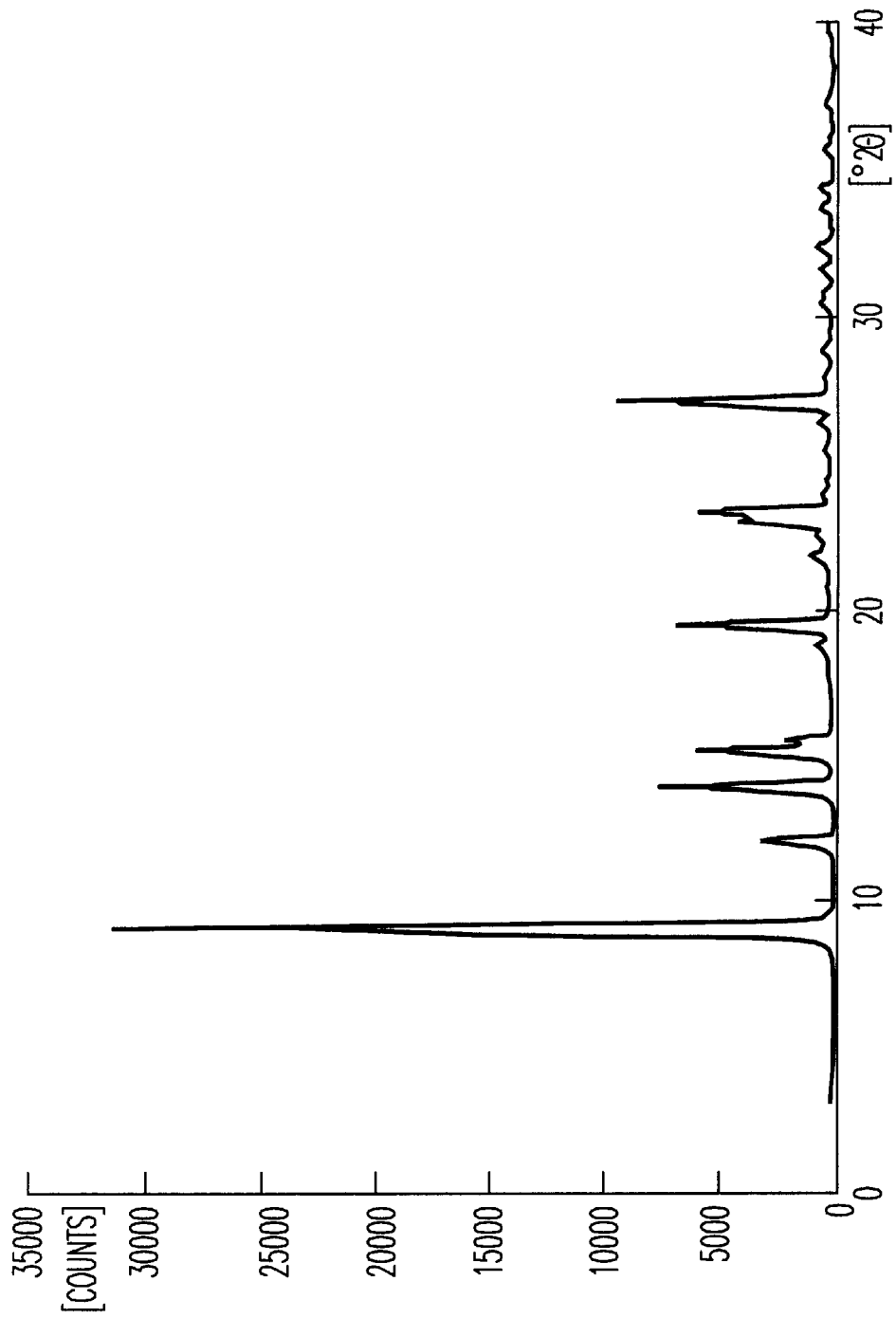
FIG. 10 is an X-ray diffraction diagram of a dihydroxysilicon phthalocyanine compound obtained in Example 3.
Figure 11:
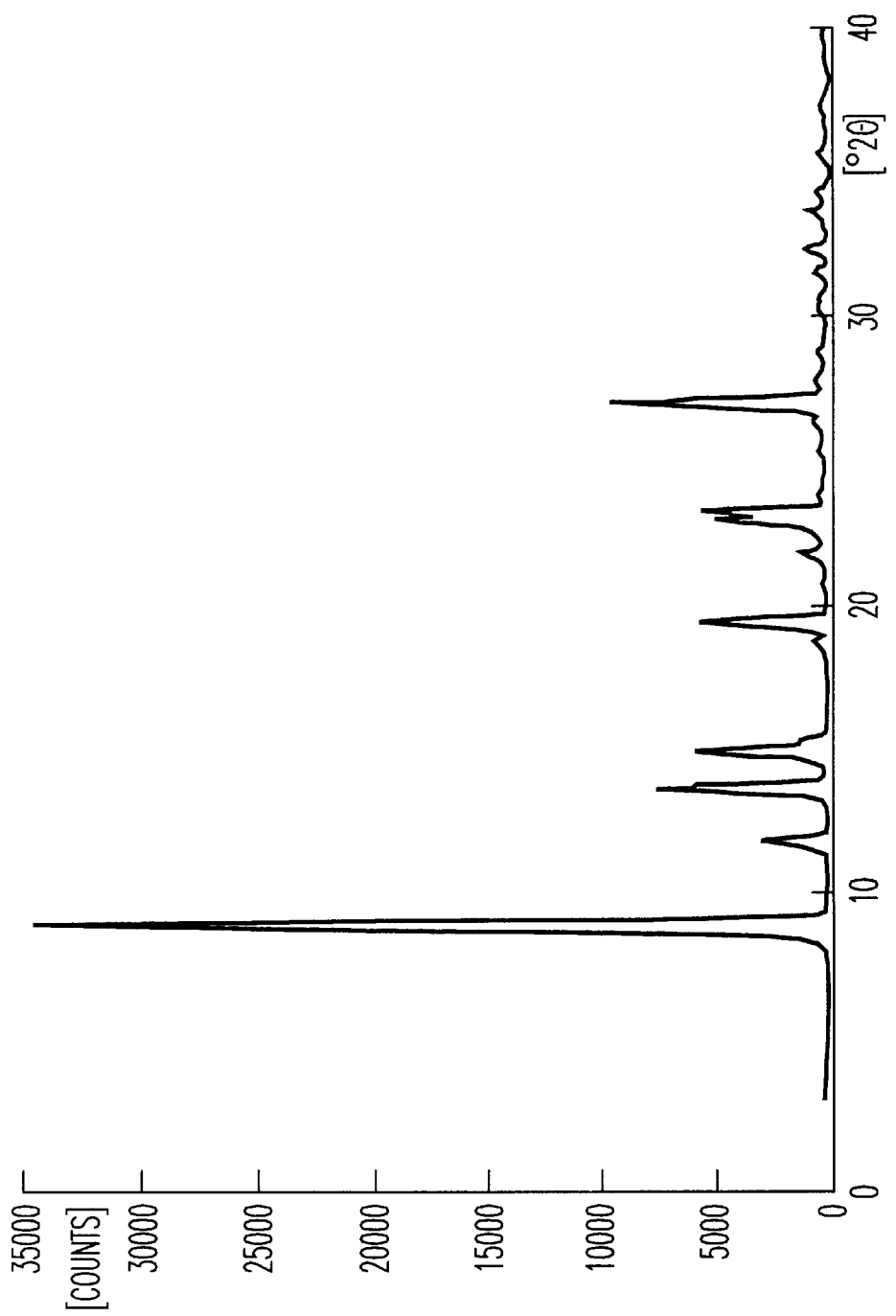
FIG. 11 is an X-ray diffraction diagram of a dihydroxysilicon phthalocyanine compound obtained in Example 4.

When the structural analysis of the obtained dihydroxysilicon phthalocyanine was carried out in accordance with the method of Itoh, it was found to be monoclinic and have lattice constants a=12.82Å, b =14.63Å, c=6.79Å and β=94.4°. According to the X-ray spectrum (FIG. 10), it is a dihydroxysilicon phthalocyanine having the crystal form of the present invention and a main peak at a 2 θ of 9.2° and other peaks at 12.2, 14.0, 15.3, 19.7, 23.4 and 27.1°, respectively.

EXAMPLE 4

10 g of dimethoxysilicon phthalocyanine synthesized in Synthesis Example 2 was added to 5 g of water and 95 g of N-methylpyrrolidone (95% NMP aqueous solution) and reacted at 148° C. for 3 hours. The reaction product was thermally filtrated and washed with NMP and acetone in the order named. After the product was stirred in 100 ml of acetone at room temperature, crystals were separated by filtration and dried to obtain 8.0 g of dihydroxysilicon phthalocyanine. When structural analysis was carried out by mass spectral (negative measurement) and IR (KBr method) methods, the same spectrum as that of Example 1 was obtained. Therefore, it was confirmed that the product was dihydroxysilicon phthalocyanine. When the structural analysis of the obtained dihydroxysilicon phthalocyanine was carried out in accordance with the method of Itoh, it was found to be monoclinic and have lattice constants a=12.79Å, b=14.61Å, c=6.79Å and β=94.4°. According to the X-ray spectrum (FIG. 10), it is a dihydroxysilicon phthalocyanine having the crystal form of the present invention and a main peak at a 2 θ of 9.2° and other peaks at 12.2, 14.0, 15.3, 19.7, 23.4 and 27.1°, respectively.

EXAMPLE 5

Figure 12:
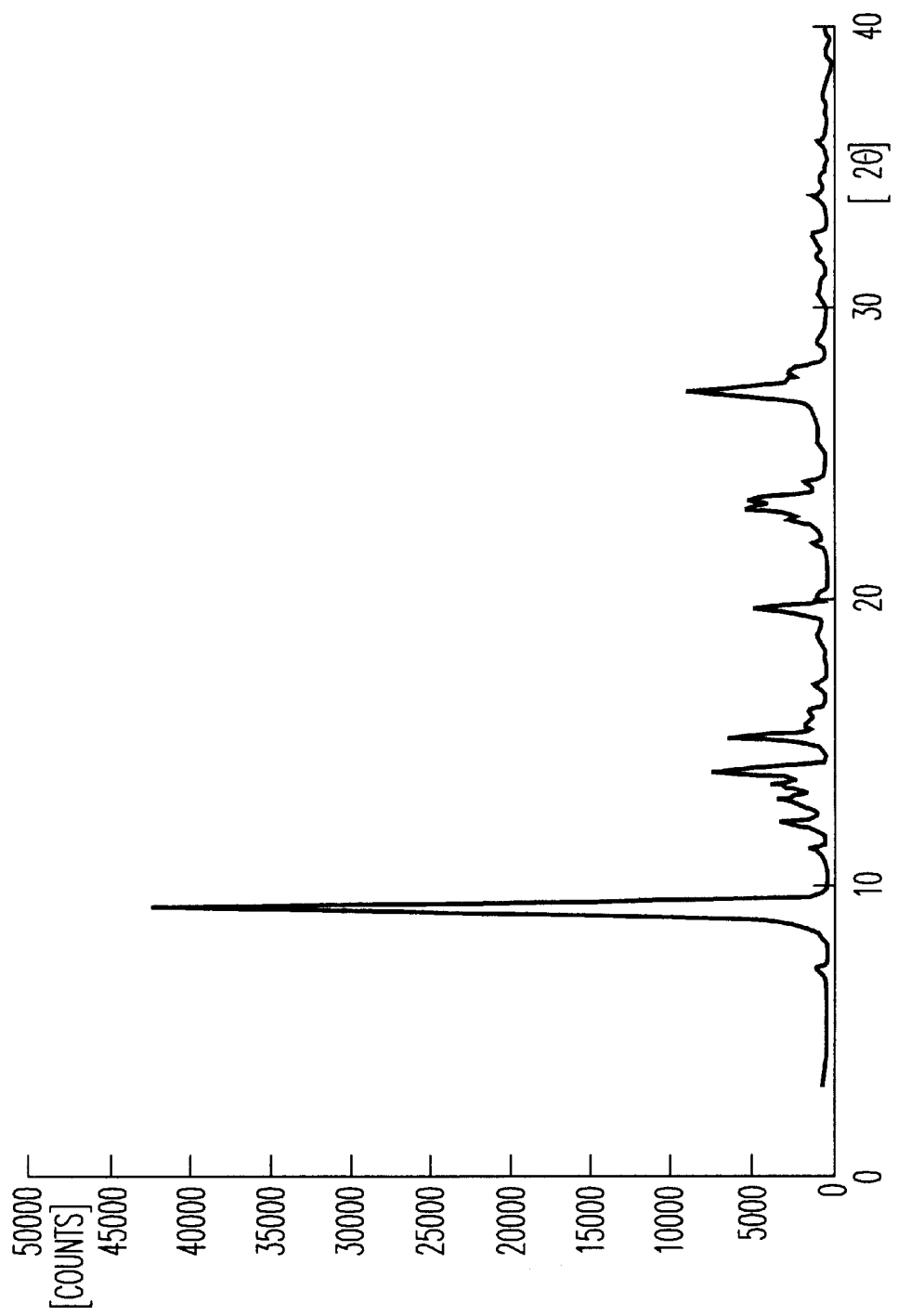
FIG. 12 is an X-ray diffraction diagram of a dihydroxysilicon phthalocyanine compound obtained in Example 5.

10 g of dimethoxysilicon phthalocyanine synthesized in Synthesis Example 2 was added to 10 g of water and 90 g of dimethyl sulfoxide (90% DMSO aqueous solution) and reacted at 120° C. for 3 hours. The reaction product was thermally filtrated and washed with DMF and acetone in the order named. After the product was stirred in 50 ml of acetone at room temperature, crystals were separated by filtration and dried to obtain 8.4 g of dihydroxysilicon phthalocyanine. When structural analysis was carried out by mass spectral (negative measurement) and IR (KBr method) methods, the same spectrum as that of Example 1 was obtained. Therefore, it was confirmed that the product was dihydroxysilicon phthalocyanine. According to the X-ray spectrum (FIG. 12), the obtained dihydroxysilicon phthalocyanine is a dihydroxysilicon phthalocyanine having the crystal form of the present invention and a main peak at a 2 θ of 9.20 and other peaks at 12.2, 14.0, 15.3, 19.7, 23.4 and 27.1°, respectively.

EXAMPLE 6

Figure 13:
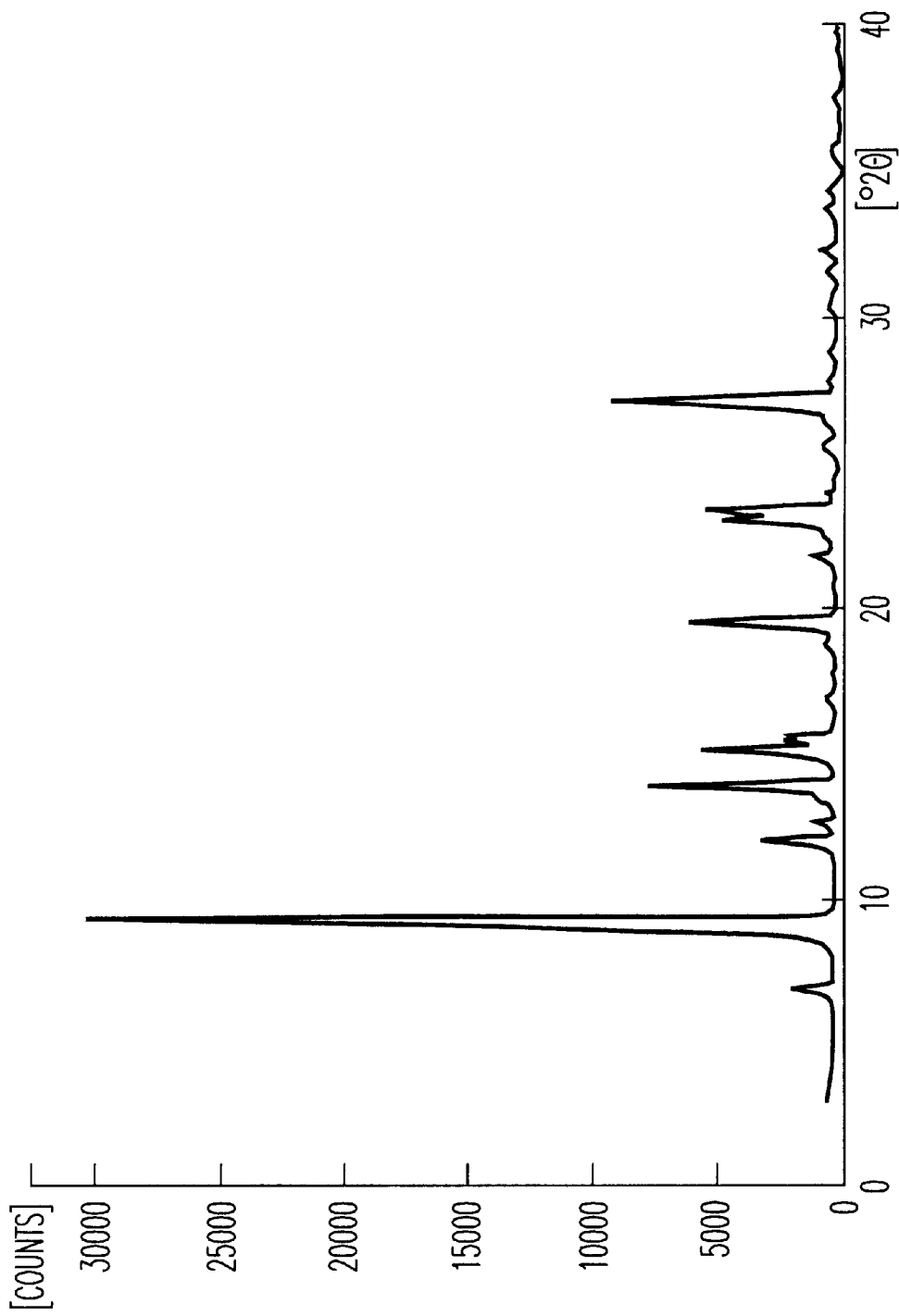
FIG. 13 is an X-ray diffraction diagram of a dihydroxysilicon phthalocyanine compound obtained in Example 6.

10 g of dimethoxysilicon phthalocyanine synthesized in Synthesis Example 2 was added to 10 g of water and 90 g of propylene carbonate (90% PCN aqueous solution) and reacted at 120° C. for 3 hours. The reaction product was thermally filtrated and washed with DMF and acetone in the order named. After the product was stirred in 50 ml of acetone at room temperature, crystals were separated by filtration and dried to obtain 8.4 g of dihydroxysilicon phthalocyanine. When structural analysis was carried out by mass spectral (negative measurement) and IR (KBr method) methods, the same spectrum as that of Example 1 was obtained. Therefore, it was confirmed that the product was dihydroxysilicon phthalocyanine. According to the X-ray spectrum (FIG. 13), the obtained dihydroxysilicon phthalocyanine is a dihydroxysilicon phthalocyanine having the crystal form of the present invention and a main peak at a 2 θ of 9.20 and other peaks at 12.2, 14.0, 15.3, 19.7, 23.4 and 27.1°, respectively.

COMPARATIVE EXAMPLE 1

(prior art 1: J. B. Davision et al., Macromol., 1978, 11, 186)

Figure 14:
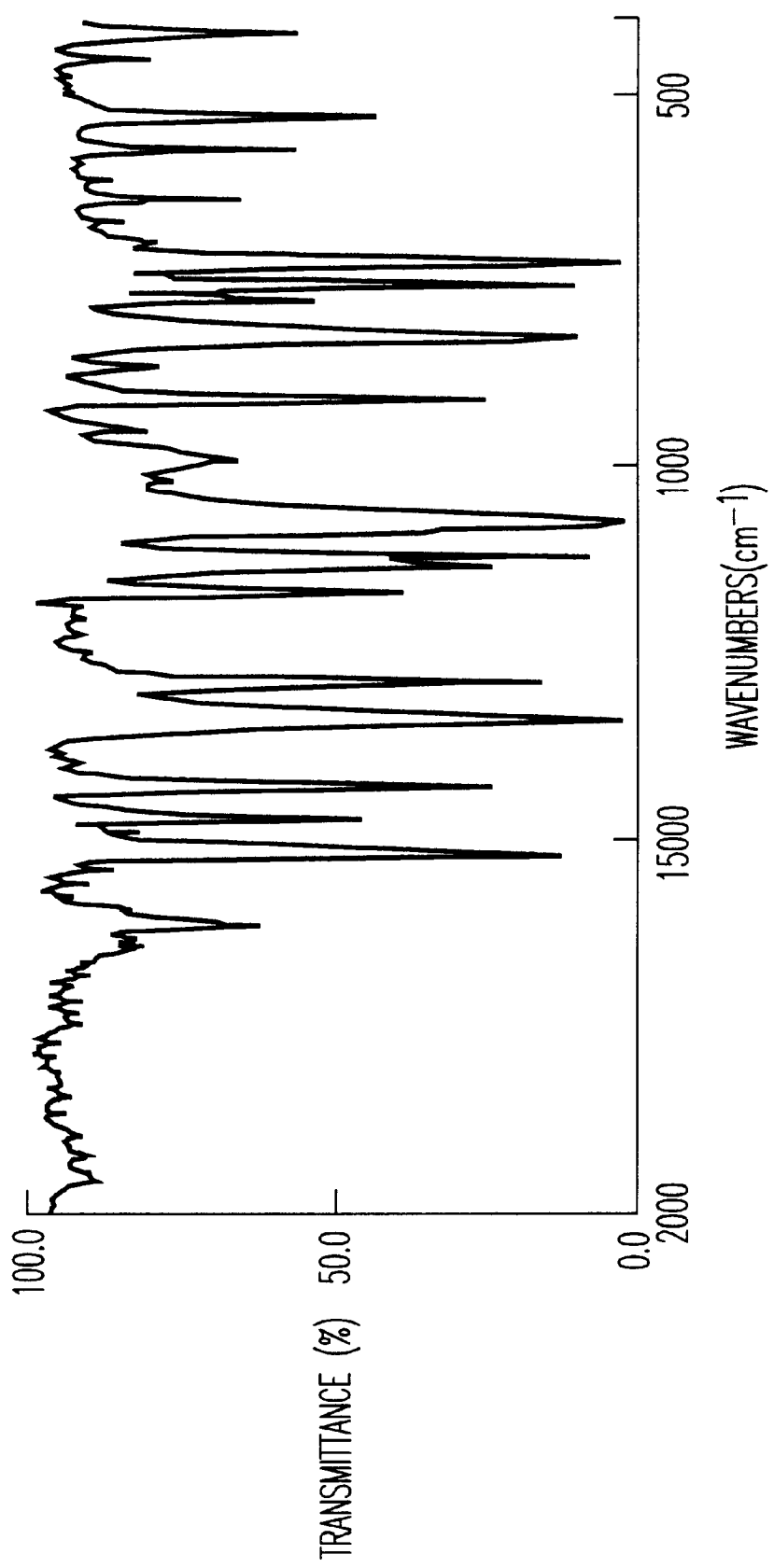
FIG. 14 is an IR spectral diagram of a dihydroxysilicon phthalocyanine compound obtained in Comparative Example 1.
Figure 15:
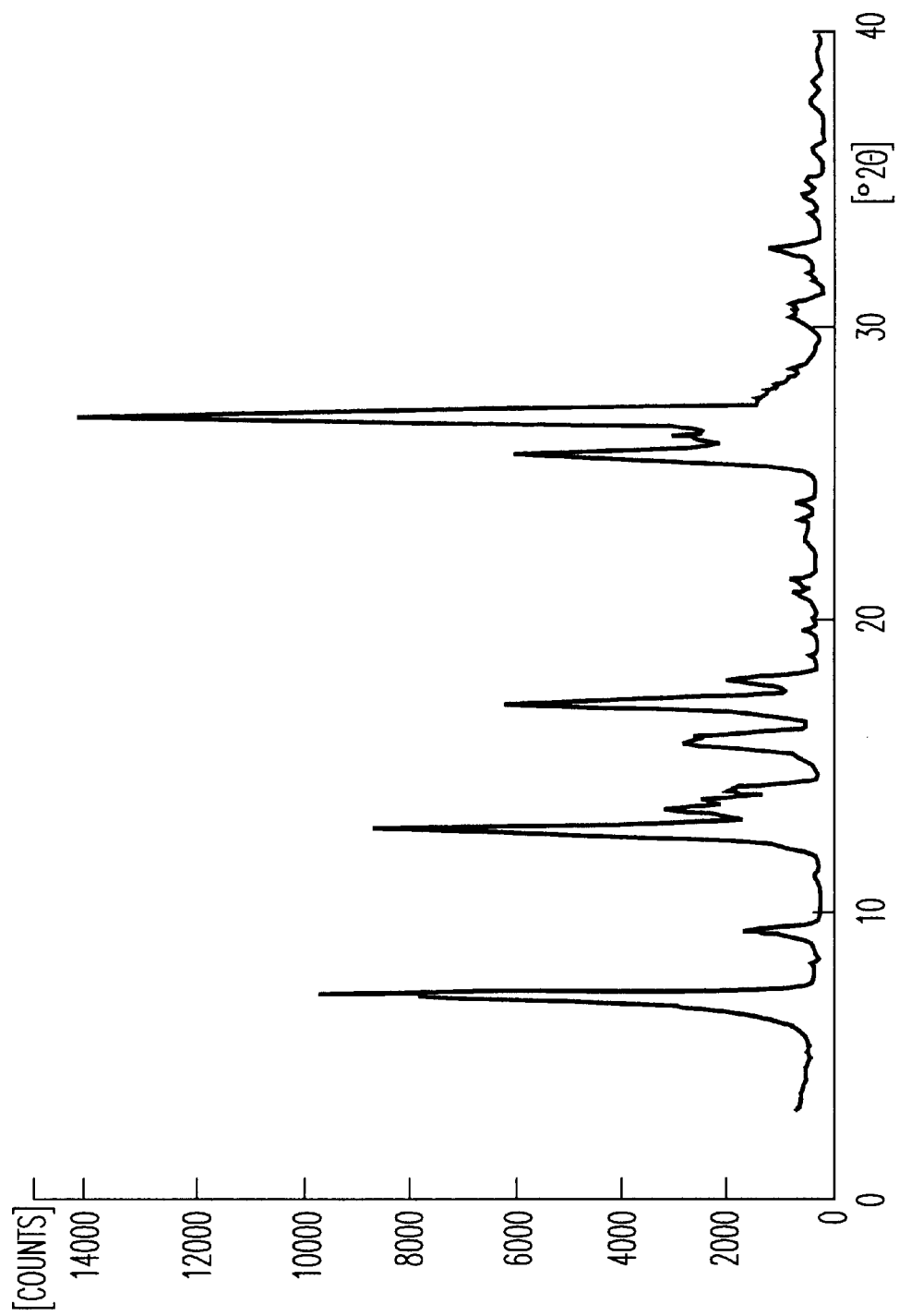
FIG. 15 is an X-ray diffraction diagram of a dihydroxysilicon phthalocyanine compound obtained in Comparative Example 1.

4.4 g of dichlorosilicon phthalocyanine synthesized in Synthesis Example 1 was added to a mixture solution of 1.1 g of NaOH, 100 ml of water and 26 ml of pyridine and heated under reflux to carry out a reaction for 1 hour. The reaction product was thermally filtrated and washed with pyridine, acetone and water in the order named. After the product was stirred in 50 ml of water at room temperature several times and confirmed to be neutralized, crystals were separated by filtration and dried to obtain 3.2 g of dihydroxysilicon phthalocyanine. Structural analysis was carried out by mass spectral (negative measurement) and IR (KBr method) methods. In the mass spectrum, a peak of dihydroxysilicon phthalocyanine was observed at an m/z of 574 and in the IR spectrum, as shown in FIG. 14, absorption special to dihydroxysilicon phthalocyanine was seen at 1,519, 1,070 and 829 $cm^{-1}$. Therefore, it was confirmed that the product was dihydroxysilicon phthalocyanine. However, the dihydroxysilicon phthalocyanine had a crystal form different from that of dihydroxysilicon phthalocyanines produced in Examples 1 to 6 which had absorption at 1,066 and 838 $cm^{-1}$. The X-ray diffraction spectrum of the obtained dihydroxysilicon phthalocyanine is shown in FIG. 15. Since it has peaks at a 2 θ of 7.1, 9.3, 12.8, 15.8, 17.2, 25.6 and 26.9°, respectively, it is a dihydroxysilicon phthalocyanine which apparently differs in crystal form from the dihydroxysilicon phthalocyanine of the present invention.

COMPARATIVE EXAMPLE 2

(prior art 2: Japanese Laid-open Patent Application No. 6-214415 Synthesis Example 10)

Figure 16:
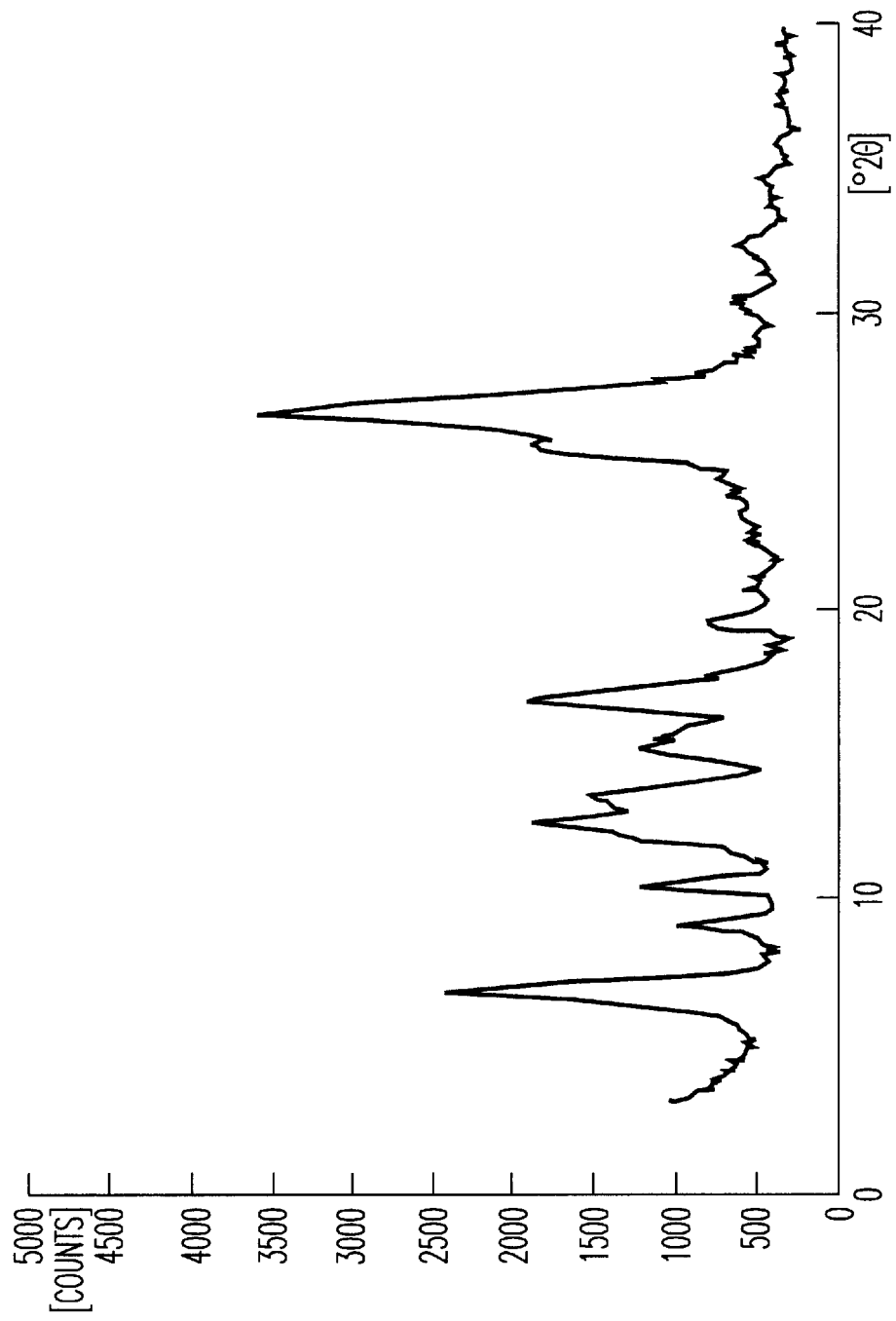
FIG. 16 is an X-ray diffraction diagram of a dihydroxysilicon phthalocyanine compound obtained in Comparative Example 2.

3 g of dichlorosilicon phthalocyanine synthesized in Synthesis Example 1 was dissolved in 80 g of concentrated sulfuric acid at 5° C. and this solution was added dropwise to 450 g of water at 0° C. to deposit crystals. Thereafter, the crystals were washed with water, diluted ammonia water and water in the order named and dried to obtain 2.6 g of dihydroxysilicon phthalocyanine. When structural analysis was carried out by mass spectral (negative measurement) and IR (KBr method) methods, the same spectrum as that of Example 1 was obtained. Therefore, it was confirmed that the product was dihydroxysilicon phthalocyanine. 2.5 g of this dihydroxysilicon phthalocyanine was ground by a ball mill in 60 g of methylene chloride with 100 g of glass beads having a diameter of 1 mmφ for 24 hours and separated by filtration. Thereafter, the ground product was washed with methylene chloride and dried to obtain 1.8 g of dihydroxysilicon phthalocyanine. The X-ray diffraction spectrum of the obtained dihydroxysilicon phthalocyanine is shown in FIG. 16. Since it has peaks at a 2 θ of 7.0, 9.2, 10.6, 12.7, 17.1, 25.6 and 26.6°, respectively, it is a dihydroxysilicon phthalocyanine which apparently differs in crystal form from the dihydroxysilicon phthalocyanine of the present invention. (Fabrication of Electrophotographic Photoreceptor)

EXAMPLE 7

Figure 17:
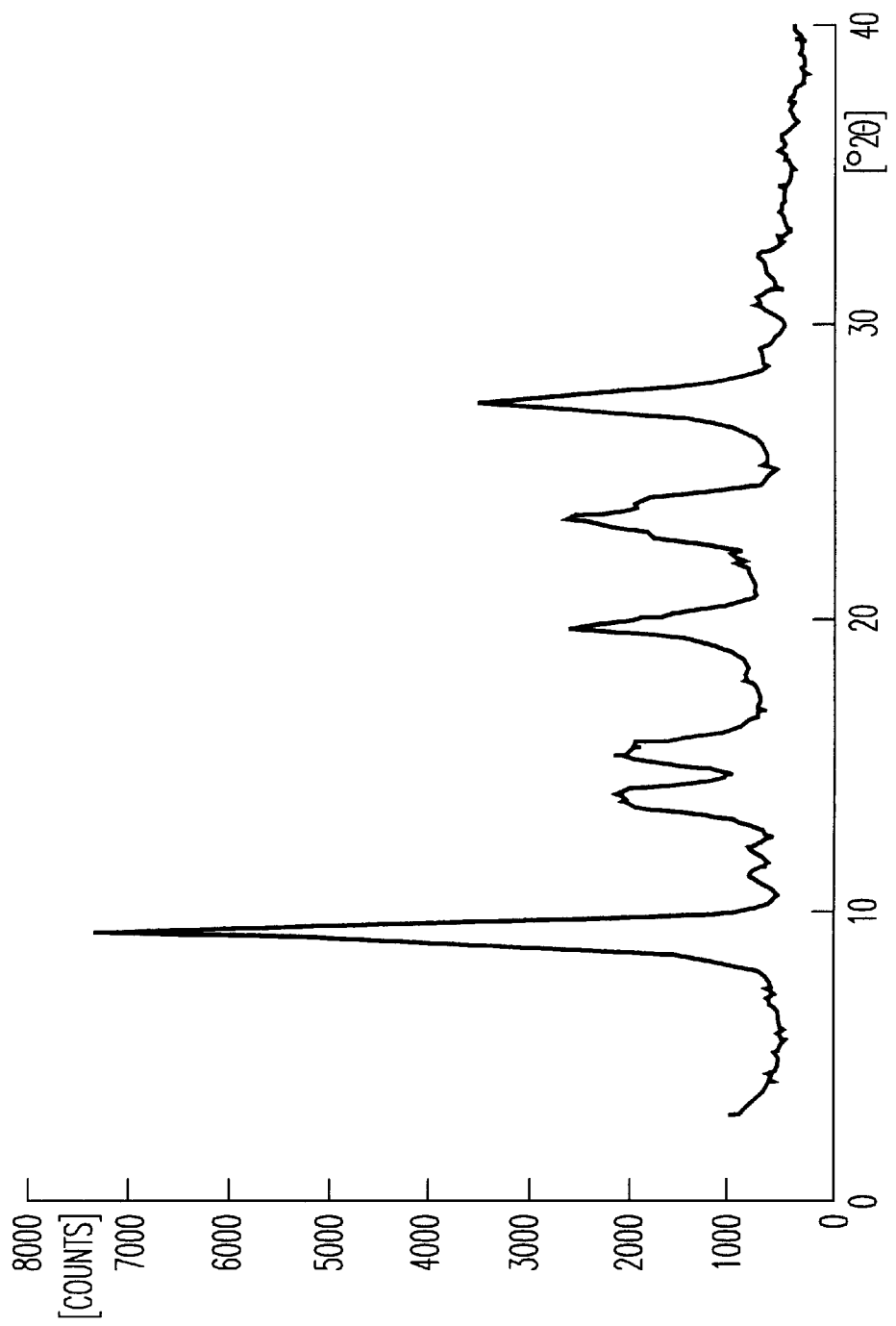
FIG. 17 is an X-ray diffraction diagram of a dihydroxysilicon phthalocyanine compound obtained in Example 7.
Figure 18:
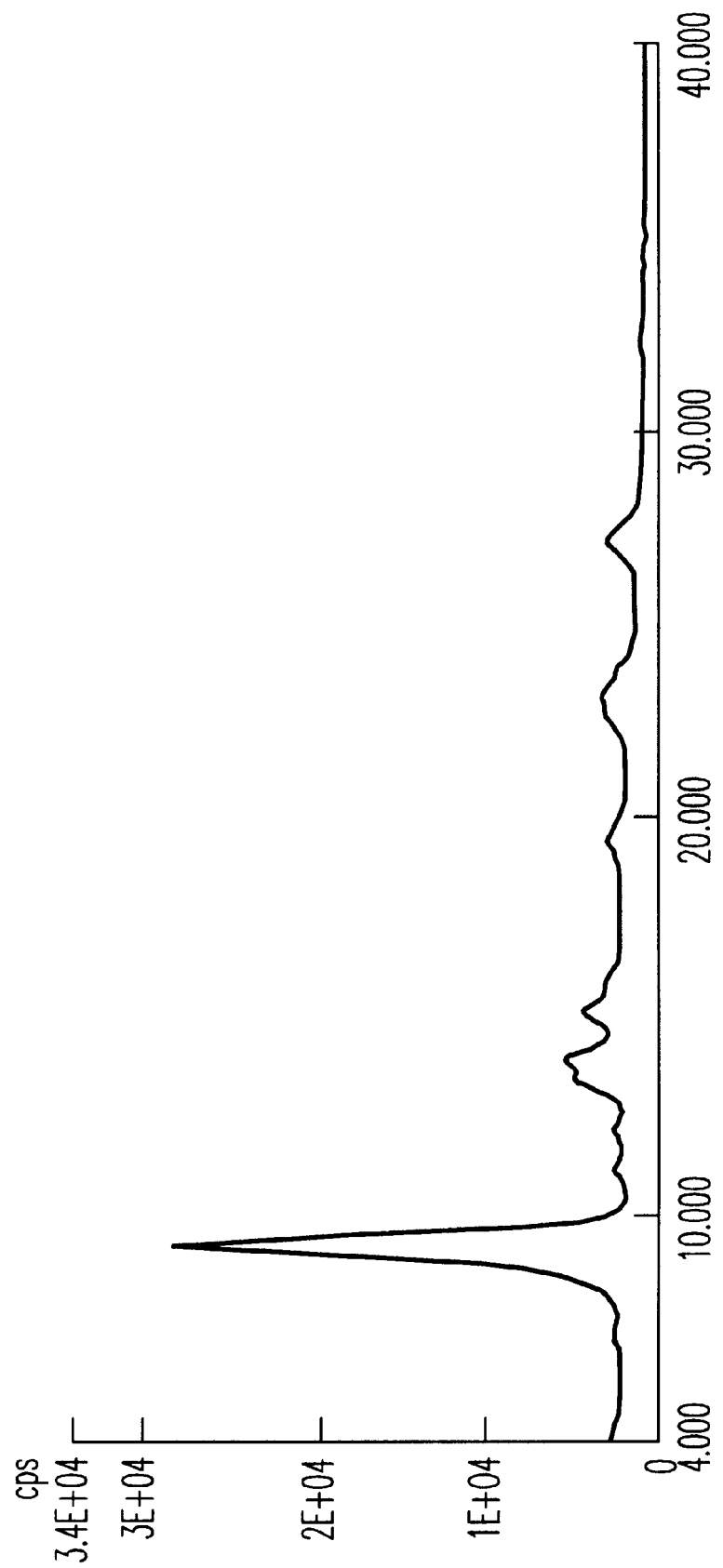
FIG. 18 is an X-ray diffraction diagram of a charge-generation layer thin film obtained in Example 7.

0.4 g of dihydroxysilicon phthalocyanine produced in Example 1 was ground by a sand grind mill together with 30 g of 4-methoxy-4-methylpentanone-2 for 6 hours to carry out atomization for dispersion. Thereafter, the obtained fine particles were mixed with a 10% 4-methoxy-4-methylpentanone-2 solution of 0.1 g of polyvinyl butyral (Denkabutyral #6000C of Denki Kagaku Kogyo Co.) and 0.1 g of phenoxy resin (UCAR of Union Carbide Co.) to prepare a dispersion. This dispersion was applied to an aluminum deposited polyester film by a bar coater to form a charge-generation layer having a dry film thickness of 0.4 μm. The X-ray diffraction spectrum of dihydroxysilicon phthalocyanine contained in the prepared dispersion is shown in FIG. 17 and the X-ray diffraction spectrum of a coated sheet sample is shown in FIG. 18. There isn't a so big change from that before the preparation of the dispersion. A solution of 5.6 g of a hydrazone compound shown below,

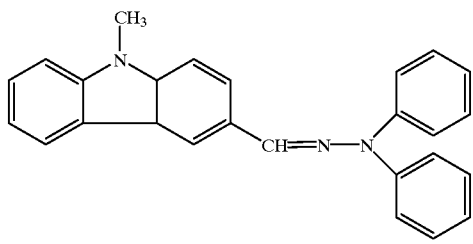

1.4 g of a hydrazone compound shown below

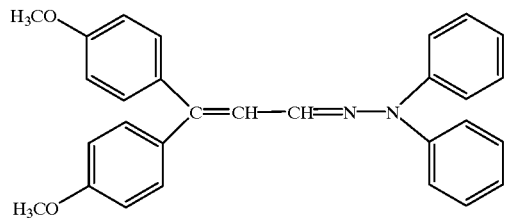

and 10 g of a polycarbonate resin dissolved in 62 g of THF was applied to this charge-generation layer by an applicator to form a charge-transport layer having a dry film thickness of 20 μm.

EXAMPLE 8

An electrophotographic photoreceptor was produced in the same manner as in Example 7 except that the dihydroxysilicon phthalocyanine produced in Example 2 was used in place of the dihydroxysilicon phthalocyanine used in Example 7.

EXAMPLE 9

An electrophotographic photoreceptor was produced in the same manner as in Example 7 except that the dihydroxysilicon phthalocyanine produced in Example 3 was used in place of the dihydroxysilicon phthalocyanine used in Example 7.

EXAMPLE 10

An electrophotographic photoreceptor was produced in the same manner as in Example 7 except that the dihydroxysilicon phthalocyanine produced in Example 4 was used in place of the dihydroxysilicon phthalocyanine used in Example 7.

EXAMPLE 11

An electrophotographic photoreceptor was produced in the same manner as in Example 7 except that dihydroxysilicon phthalocyanine produced in Example 5 was used in place of dihydroxysilicon phthalocyanine used in Example 7.

EXAMPLE 12

An electrophotographic photoreceptor was produced in the same manner as in Example 7 except that the dihydroxysilicon phthalocyanine produced in Example 6 was used in place of the dihydroxysilicon phthalocyanine used in Example 7.

EXAMPLE 13

An electrophotographic photoreceptor was produced in the same manner as in Example 7 except that dihydroxysilicon phthalocyanine produced in Example 3 and the dihydroxysilicon phthalocyanine produced in Comparative Example 1 were used in a weigh ratio of 9:1 in place of the dihydroxysilicon phthalocyanine used in Example 7.

EXAMPLE 14

An electrophotographic photoreceptor was produced in the same manner as in Example 7 except that the dihydroxysilicon phthalocyanine produced in Example 3 and the dihydroxysilicon phthalocyanine produced in Comparative Example 1 were used in a weight ratio of 7:3 in place of the dihydroxysilicon phthalocyanine used in Example 7.

EXAMPLE 15

An electrophotographic photoreceptor was produced in the same manner as in Example 7 except that the dihydroxysilicon phthalocyanine produced in Example 3 and β-type titanyl phthalocyanine were used in a weight ratio of 5:5 in place of the dihydroxysilicon phthalocyanine used in Example 7.

COMPARATIVE EXAMPLE 3

An electrophotographic photoreceptor was produced in the same manner as in Example 7 except that the dihydroxysilicon phthalocyanine produced in Comparative Example 1 was used in place of the dihydroxysilicon phthalocyanine used in Example 7.

COMPARATIVE EXAMPLE 4

An electrophotographic photoreceptor was produced in the same manner as in Example 7 except that the dihydroxysilicon phthalocyanine produced in Comparative Example 2 was used in place of the dihydroxysilicon phthalocyanine used in Example 7.

(FT-Raman of dihydroxysilicon phthalocyanine)

The FT-Raman of each of charge-generation layers (CG layer) containing dihydroxysilicon phthalocyanine compound powders and dihydroxysilicon phthalocyanine compounds produced in the above Examples and Comparative Examples was measured. The measurement was carried out using light having a wavelength of 1,064 nm for excitation under such conditions as an excitation output of 30 to 100 mW, a beam diameter of 200 μm and a measurement range of 0 to 3,600 $cm^{-1}$. The measurement spectra are shown in FIGS. 19 to 32 and Raman-shifts and intensity ratios are shown in Tables 7 and 8. Both the dihydroxysilicon phthalocyanine of the present invention and dihydroxysilicon phthalocyanines produced in Comparative Examples obviously showed different Raman shifts (±4 $cm^{-1}$) of 685, 724, 758, 780, 961, 1,110, 1,199, 1,229, 1,310, 1,343, 1,352, 1,458 and 1,542 $cm^{-1}$. However, the dihydroxysilicon phthalocyanine powders of the present invention showed intensity ratios of 0.35 to 0.65 for 685/1,542, 0.6 to 0.7 for 722/685, 1.2 to 1.4 for 779/758, 0.2 to 0.3 for 1,129/1,199, and 1.0 to 1.15 for 1,352/1,343 whereas the dihydroxysilicon phthalocyanines produced in Comparative Examples showed intensity ratios of 0.7 to 0.8, 0.2 to 0.3, 0.6 to 0.7, 0.55 to 0.7 and 0.8 to 0.9, respectively. Mixtures of two dihydroxysilicon phthalocyanines (Examples 13 and 14) showed intermediate values. This tendency was also seen in the Raman spectra of the charge-generation layers (CG layer) and it is considered that the difference of crystal form is reflected on the Raman spectra.

TABLE 7

Raman shifts of dihydroxysilicon phthalocyanines

Figure 19:
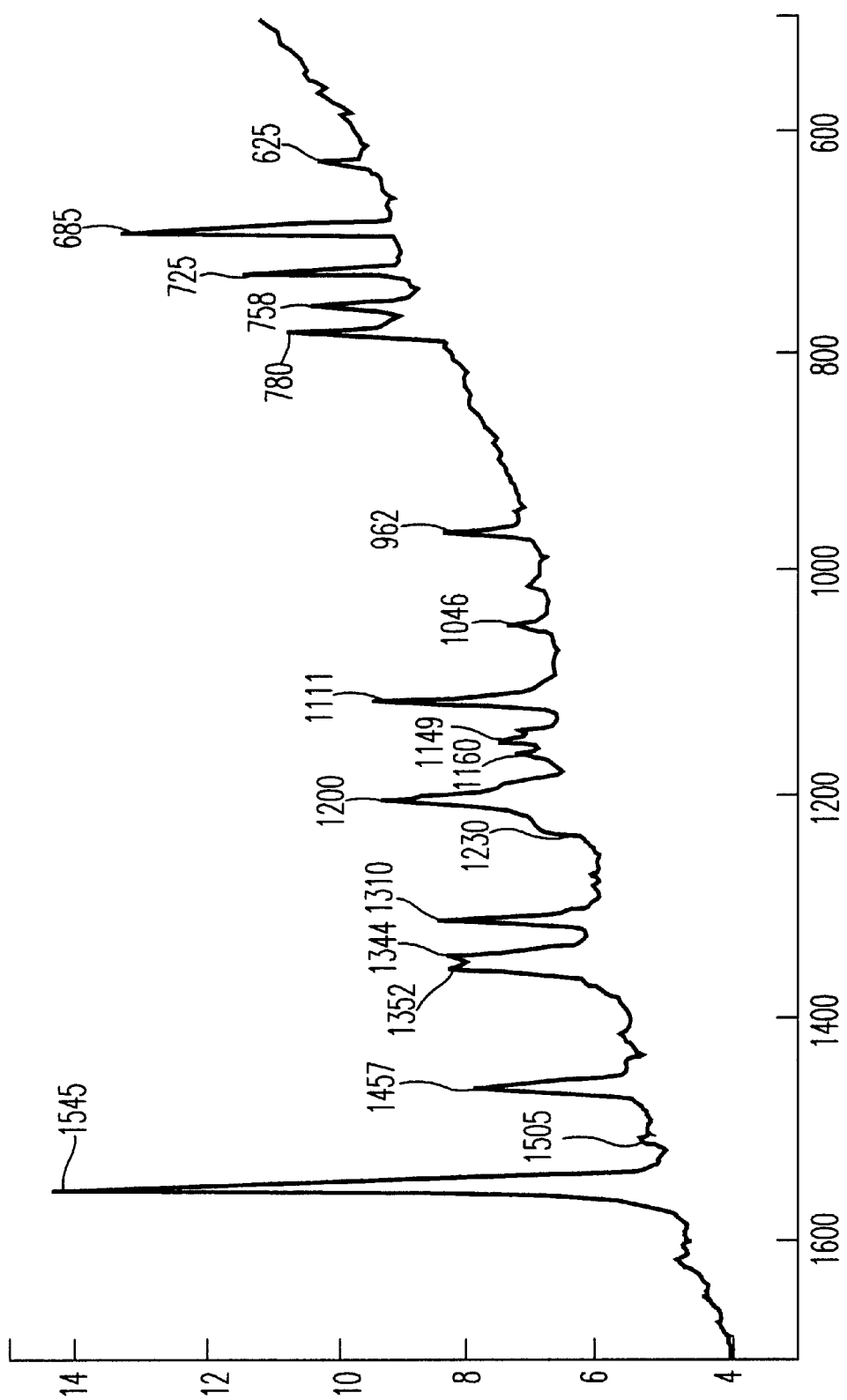
FIG. 19 is a Raman spectral diagram of a dihydroxysilicon phthalocyanine compound obtained in Example 1.
Figure 20:
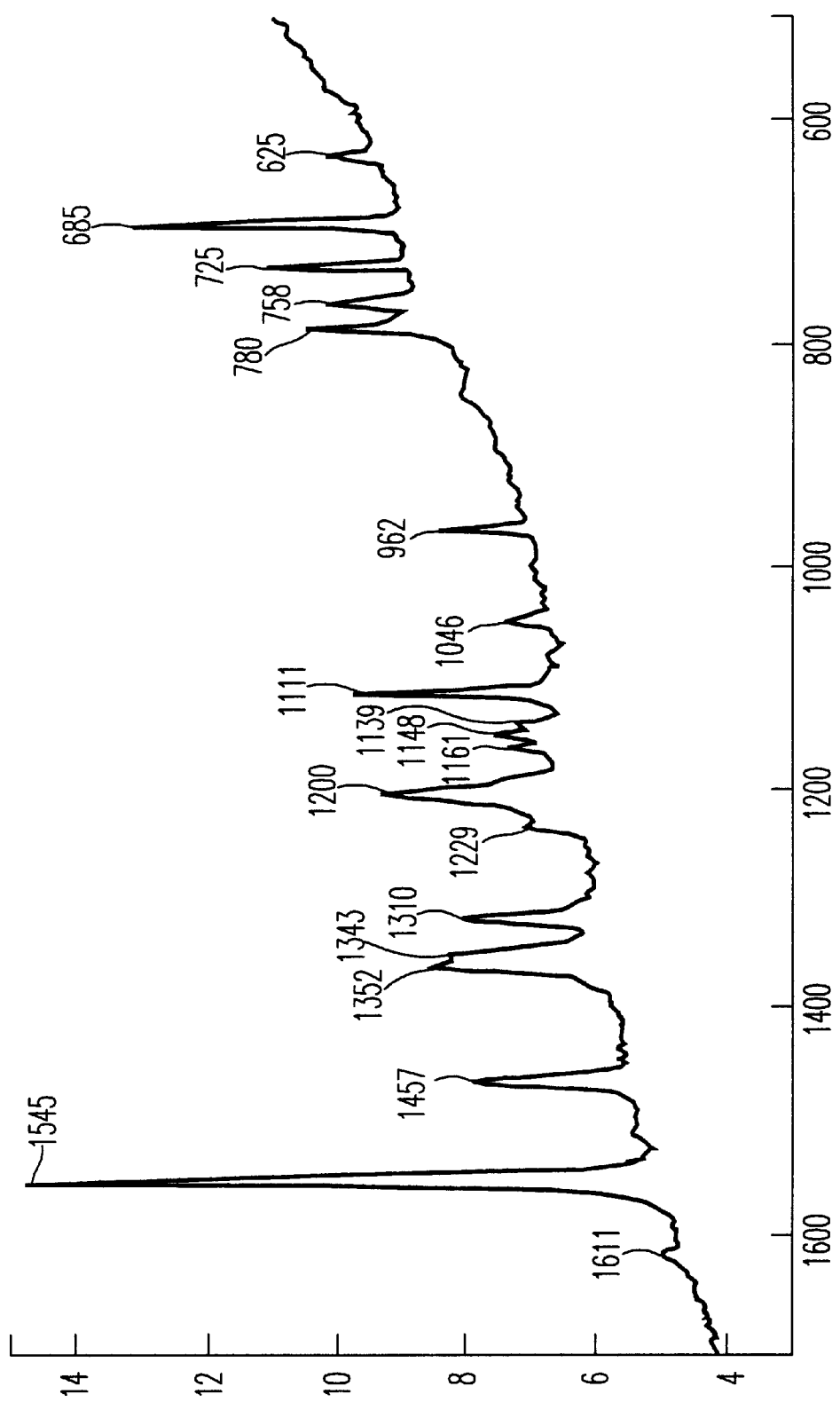
FIG. 20 is a Raman spectral diagram of a dihydroxysilicon phthalocyanine compound obtained in Example 2.
Figure 21:
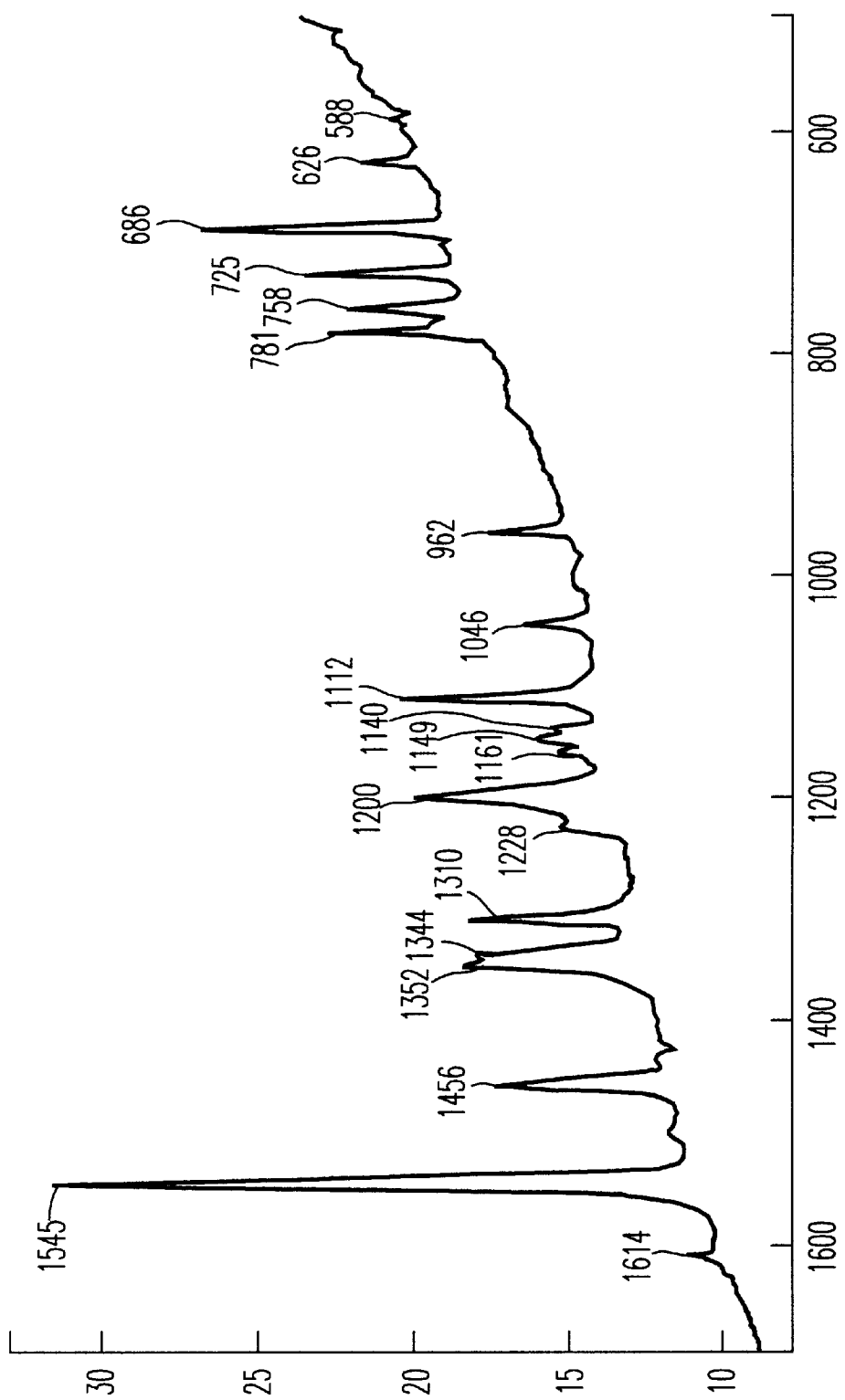
FIG. 21 is a Raman spectral diagram of a dihydroxysilicon phthalocyanine compound obtained in Example 3.
Figure 22:
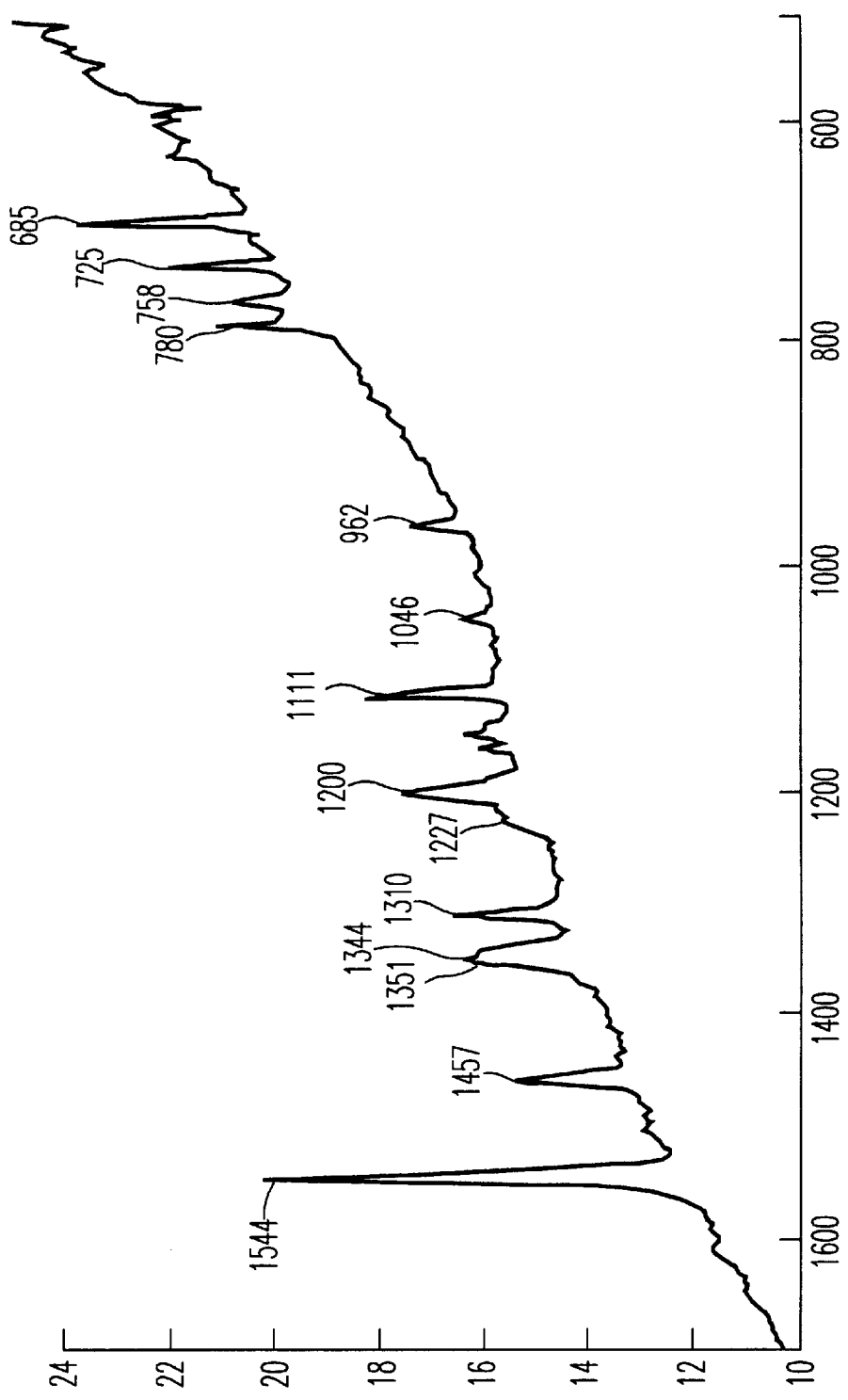
FIG. 22 is a Raman spectral diagram of a dihydroxysilicon phthalocyanine compound obtained in Example 4.
Figure 23:
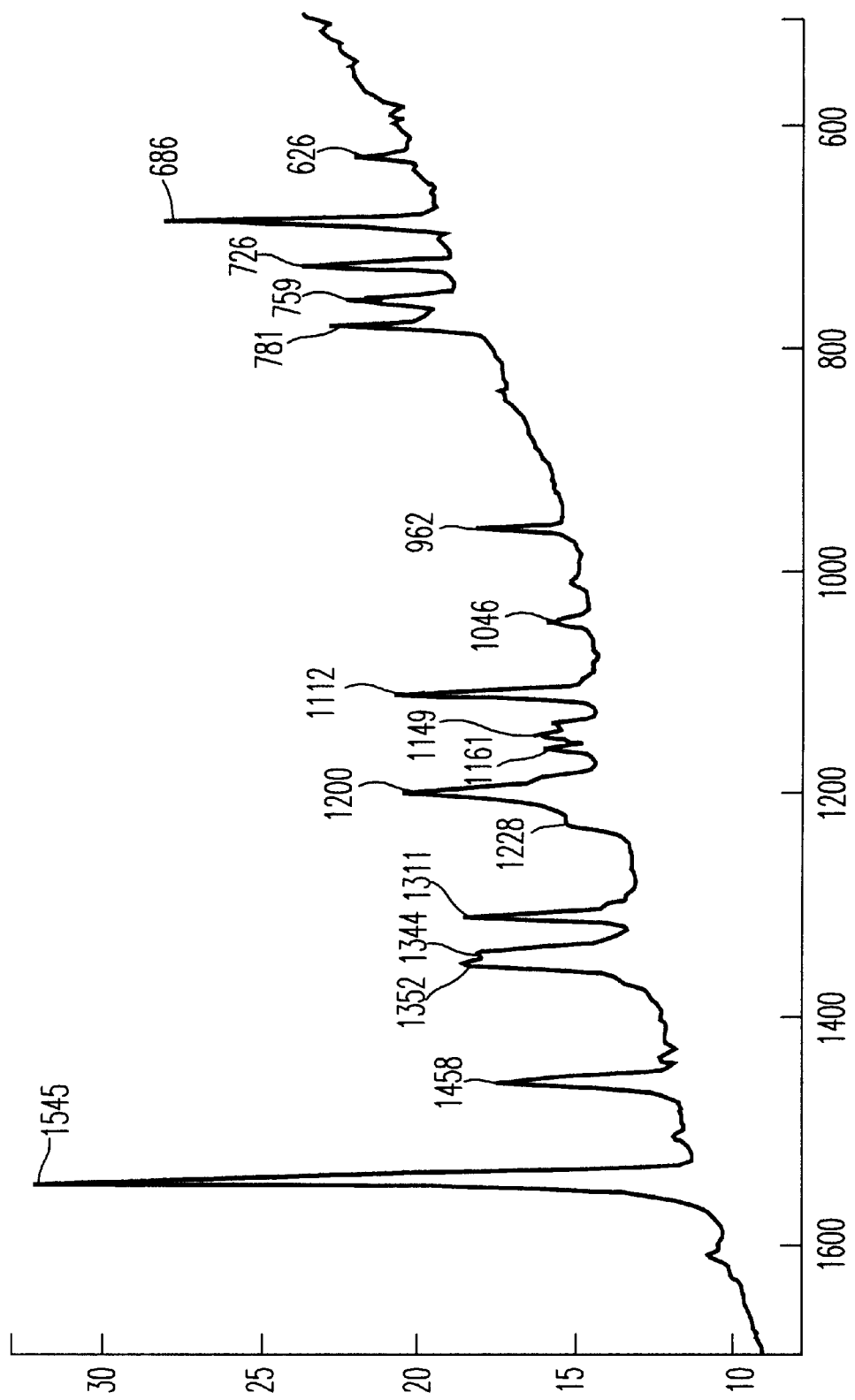
FIG. 23 is a Raman spectral diagram of a dihydroxysilicon phthalocyanine compound obtained in Example 5.
Figure 24:
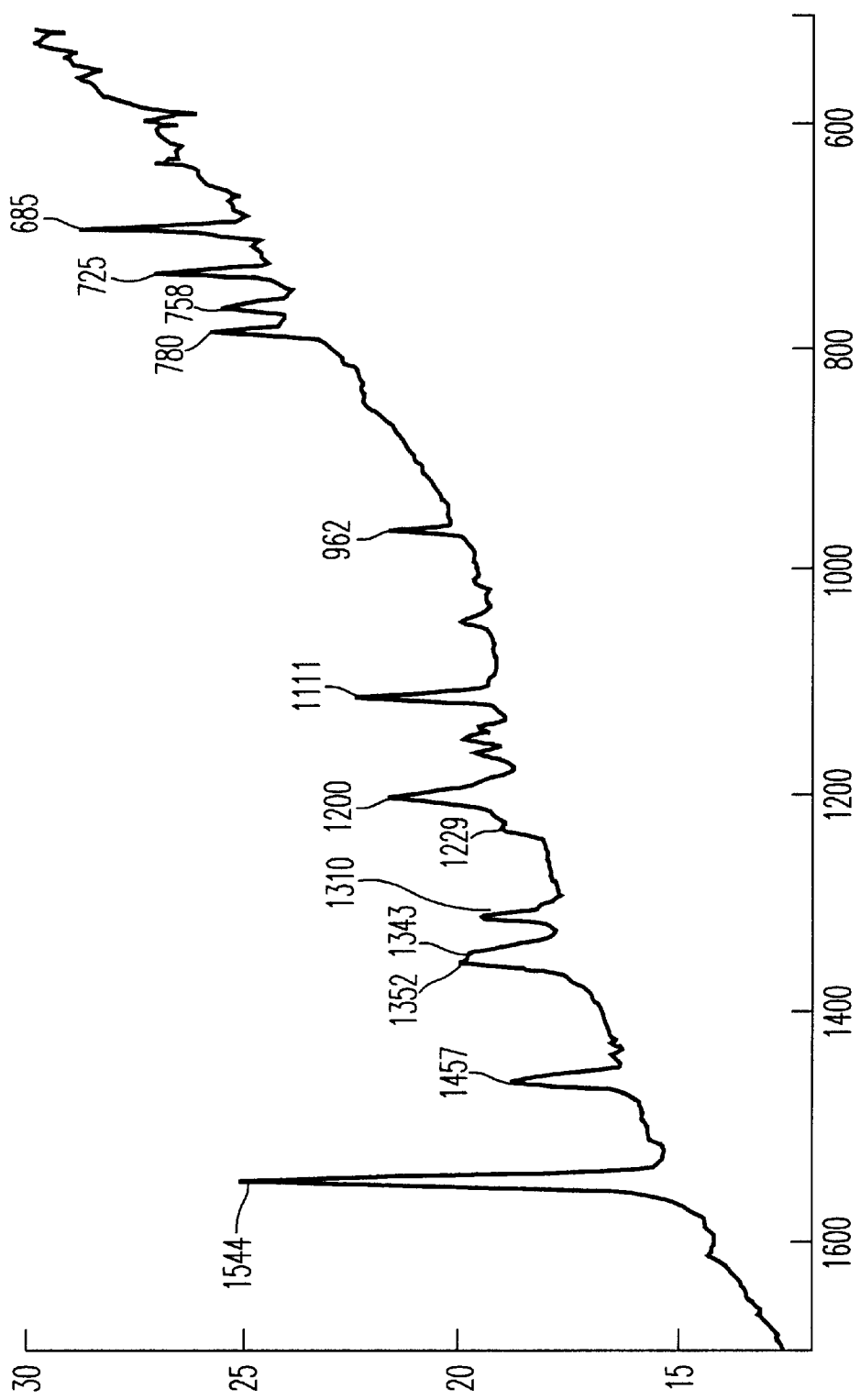
FIG. 24 is a Raman spectral diagram of a dihydroxysilicon phthalocyanine compound obtained in Example 6.
Figure 25:
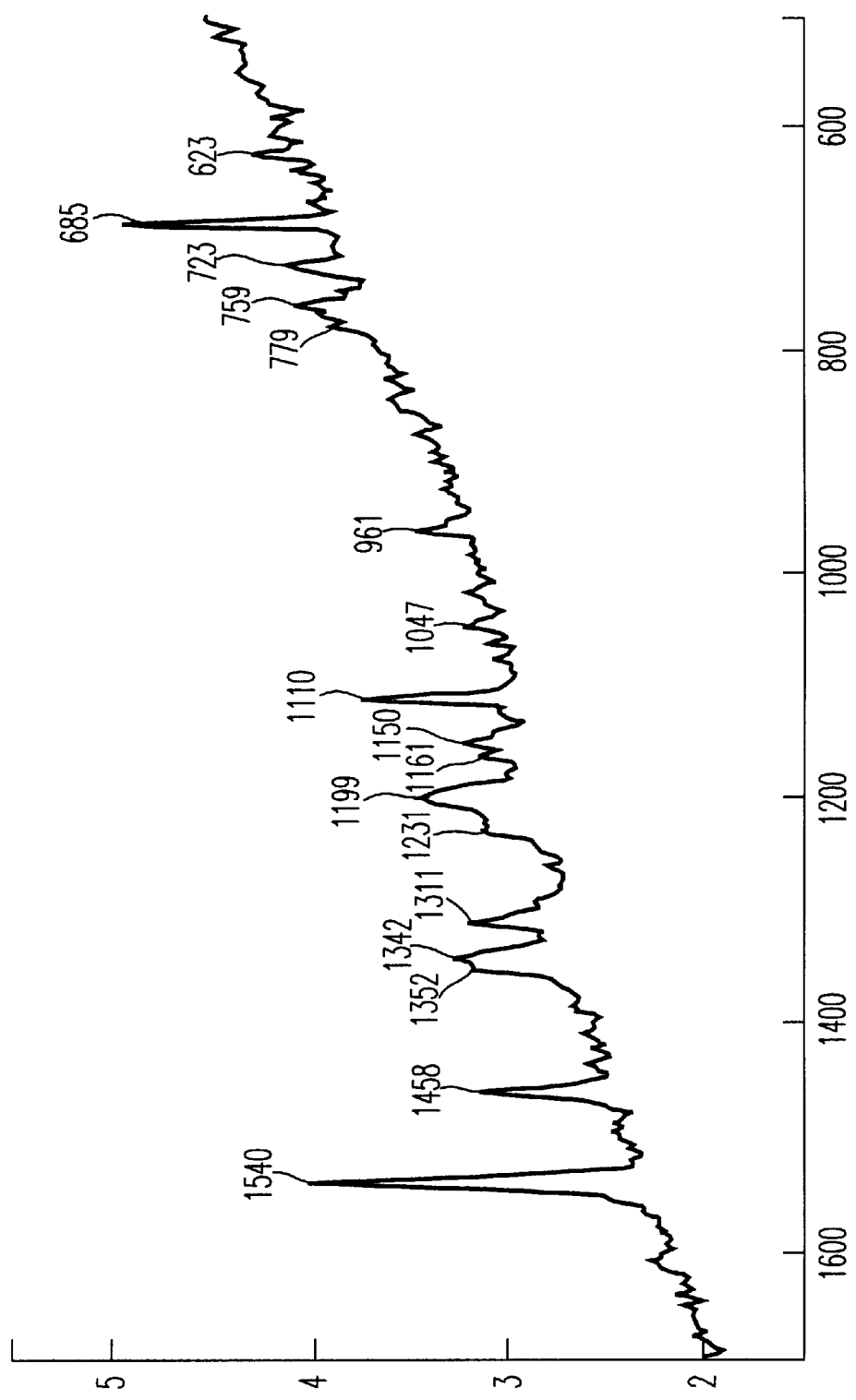
FIG. 25 is a Raman spectral diagram of a dihydroxysilicon phthalocyanine compound obtained in Comparative Example 1.
Figure 26:
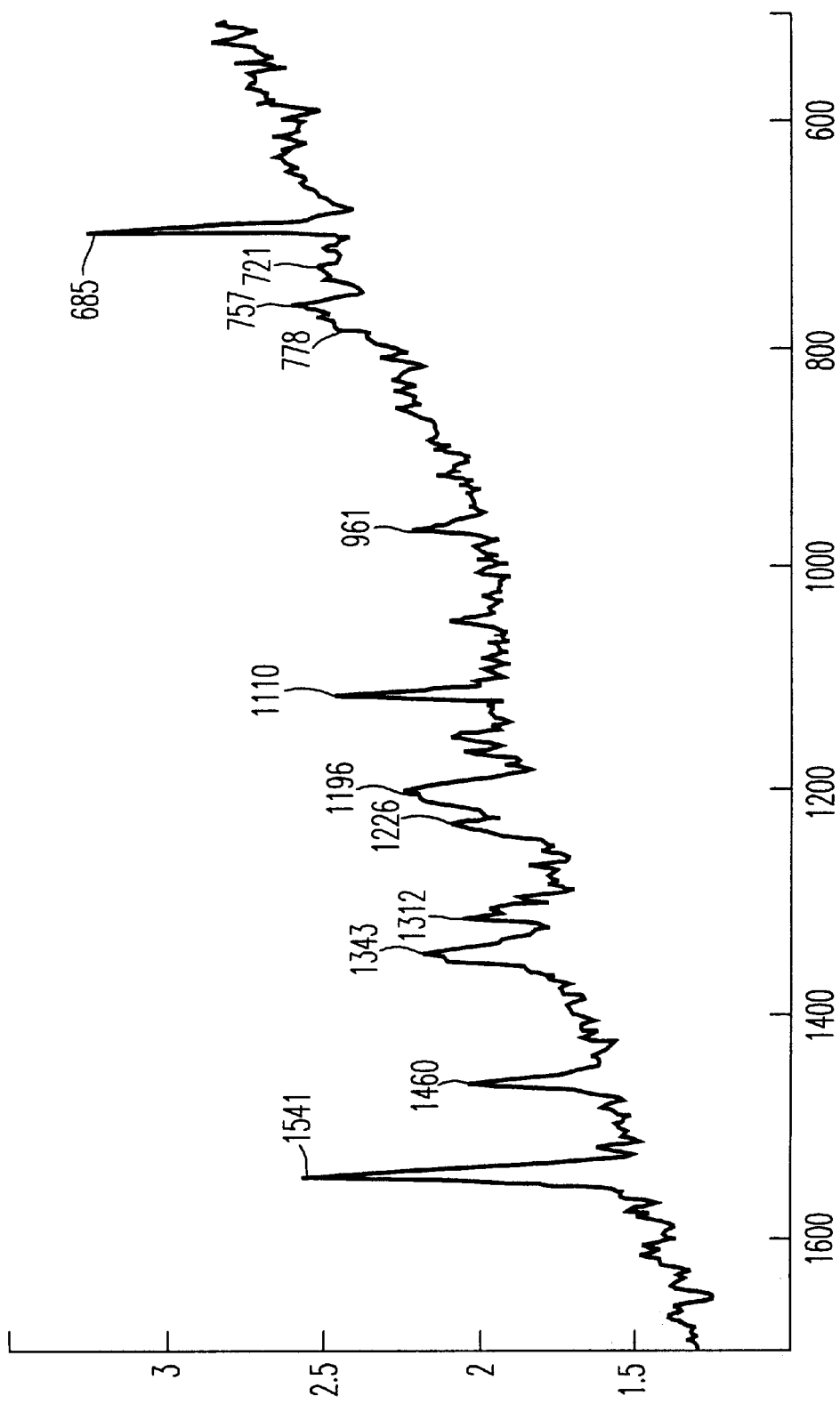
FIG. 26 is a Raman spectral diagram of a dihydroxysilicon phthalocyanine compound obtained in Comparative Example 2.
Figure 27:
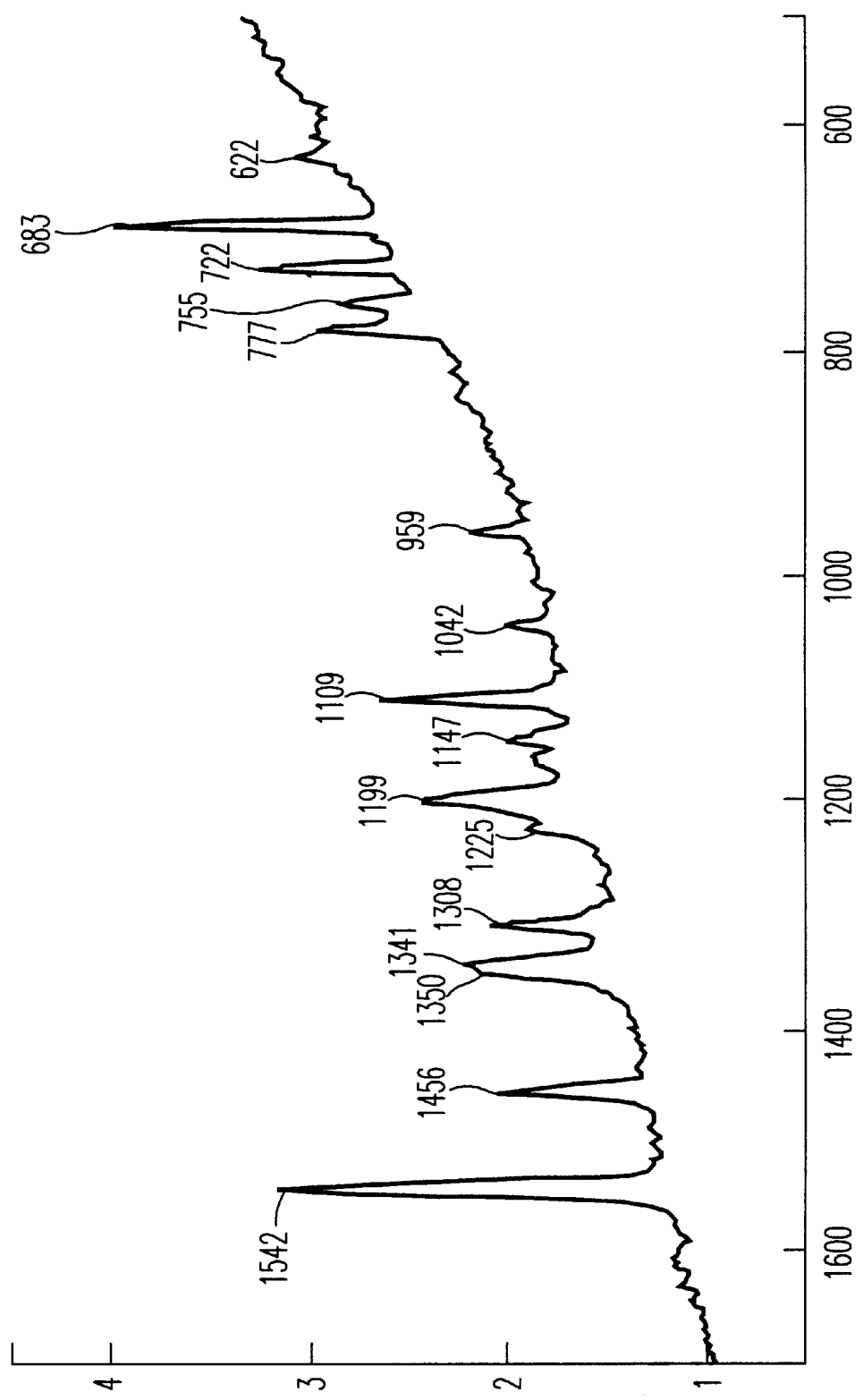
FIG. 27 is a Raman spectral diagram of a charge-generation layer containing a dihydroxysilicon phthalocyanine compound obtained in Example 7.
Figure 28:
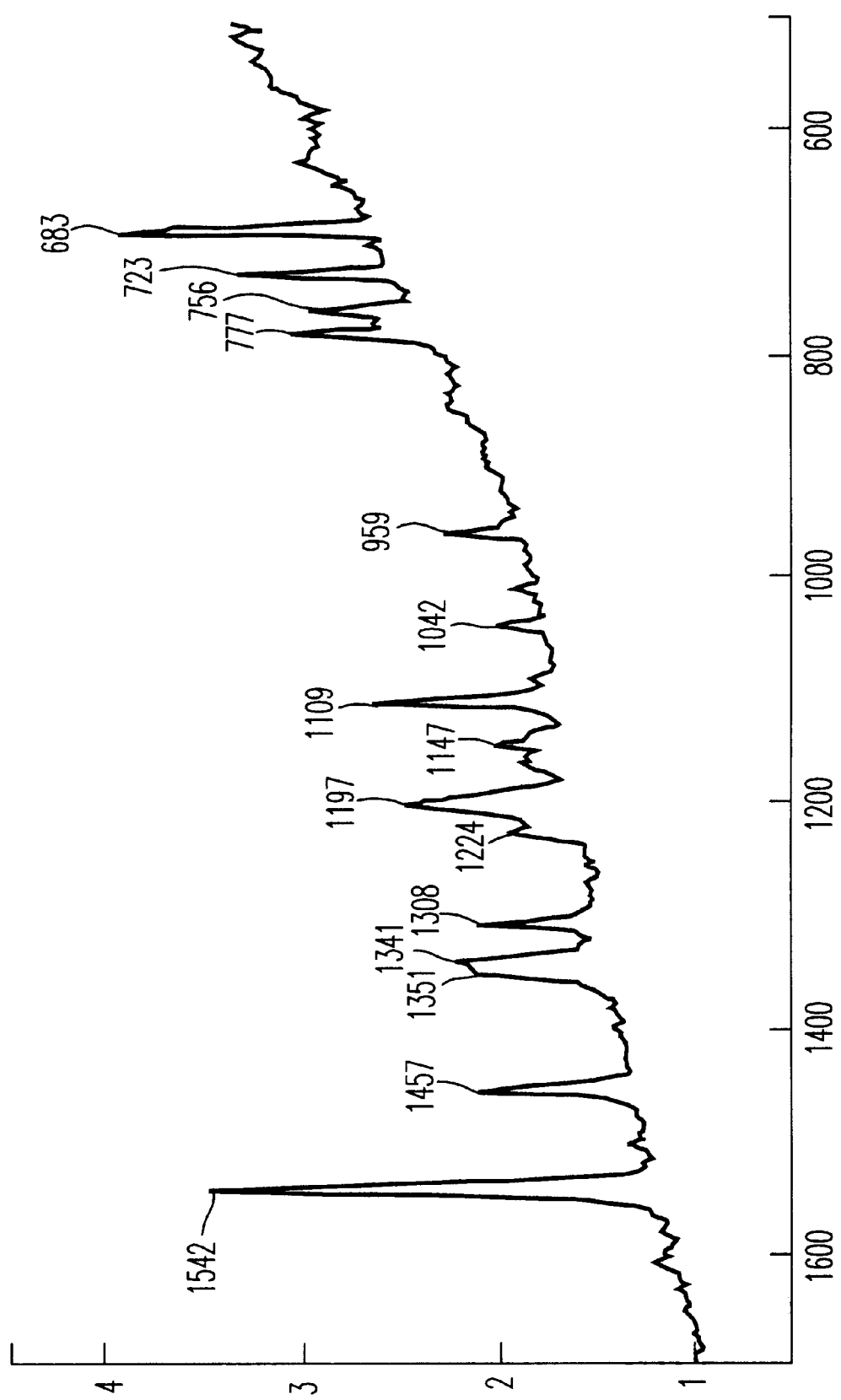
FIG. 28 is a Raman spectral diagram of a charge-generation layer containing a dihydroxysilicon phthalocyanine compound obtained in Example 9.
Figure 29:
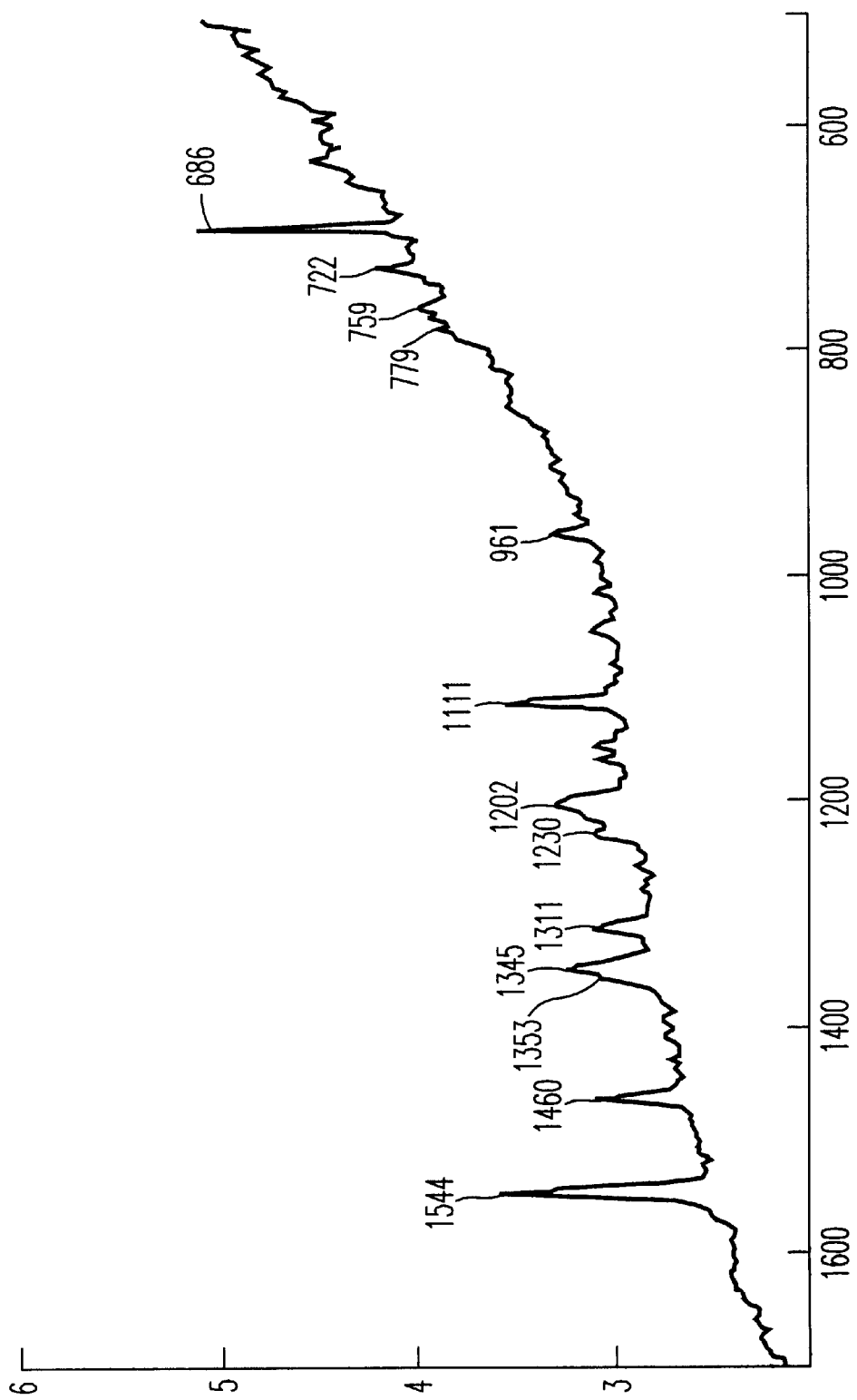
FIG. 29 is a Raman spectral diagram of a charge-generation layer containing a dihydroxysilicon phthalocyanine compound obtained in Comparative Example 3.
Figure 30:
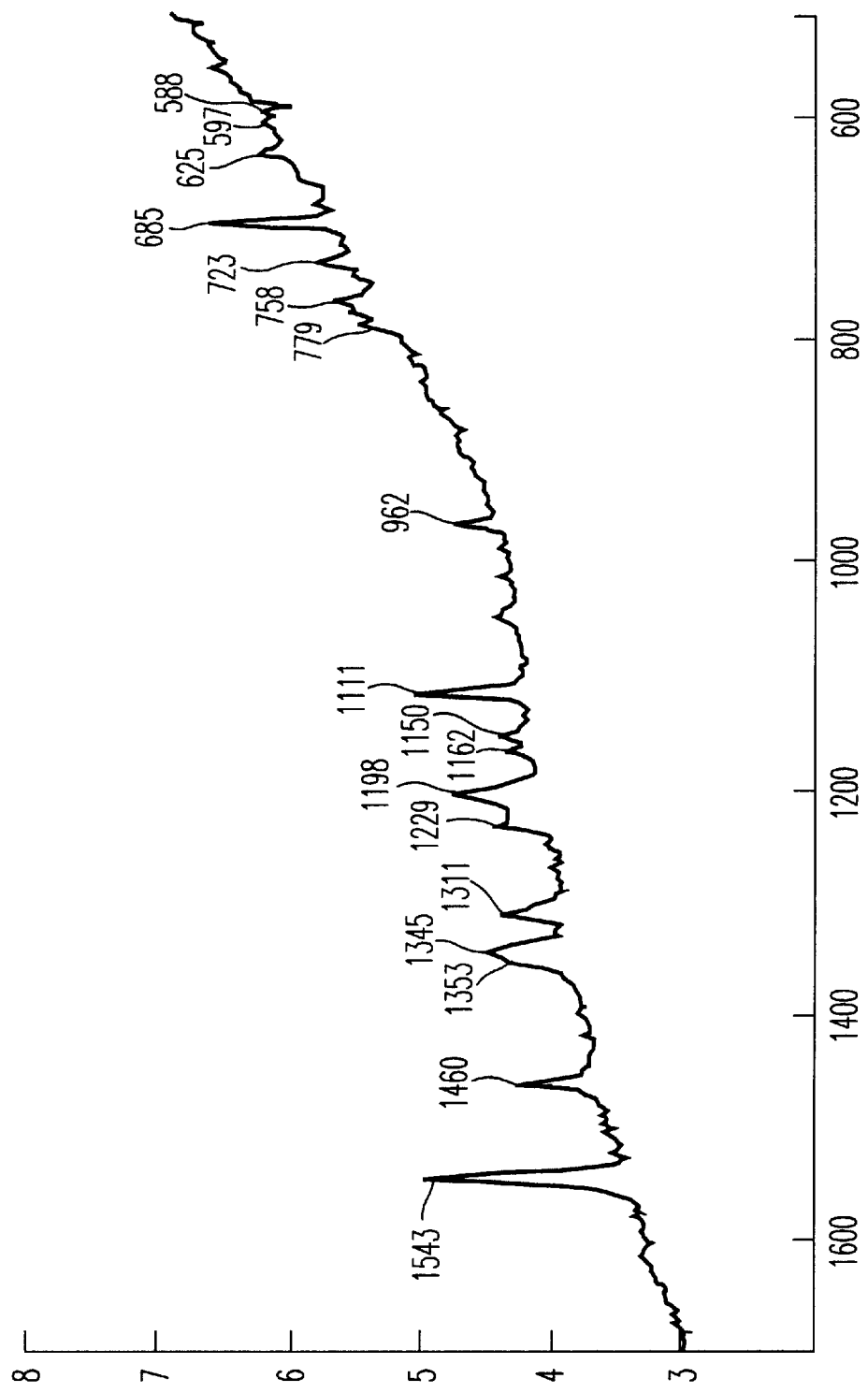
FIG. 30 is a Raman spectral diagram of a charge-generation layer containing a dihydroxysilicon phthalocyanine compound obtained in Comparative Example 4.
Figure 31:
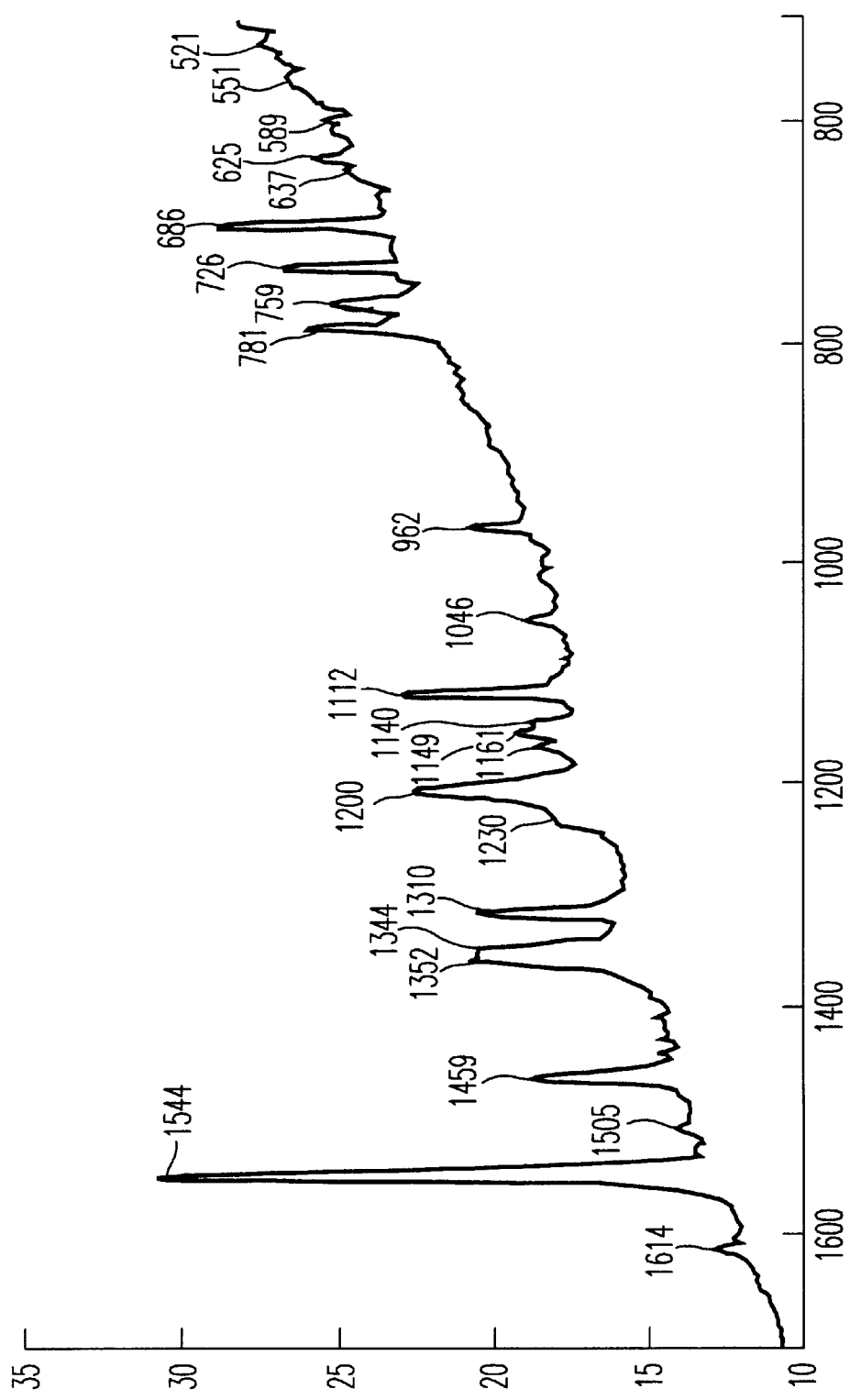
FIG. 31 is a Raman spectral diagram of a charge-generation layer containing a dihydroxysilicon phthalocyanine compound obtained in Example 13.
Figure 32:
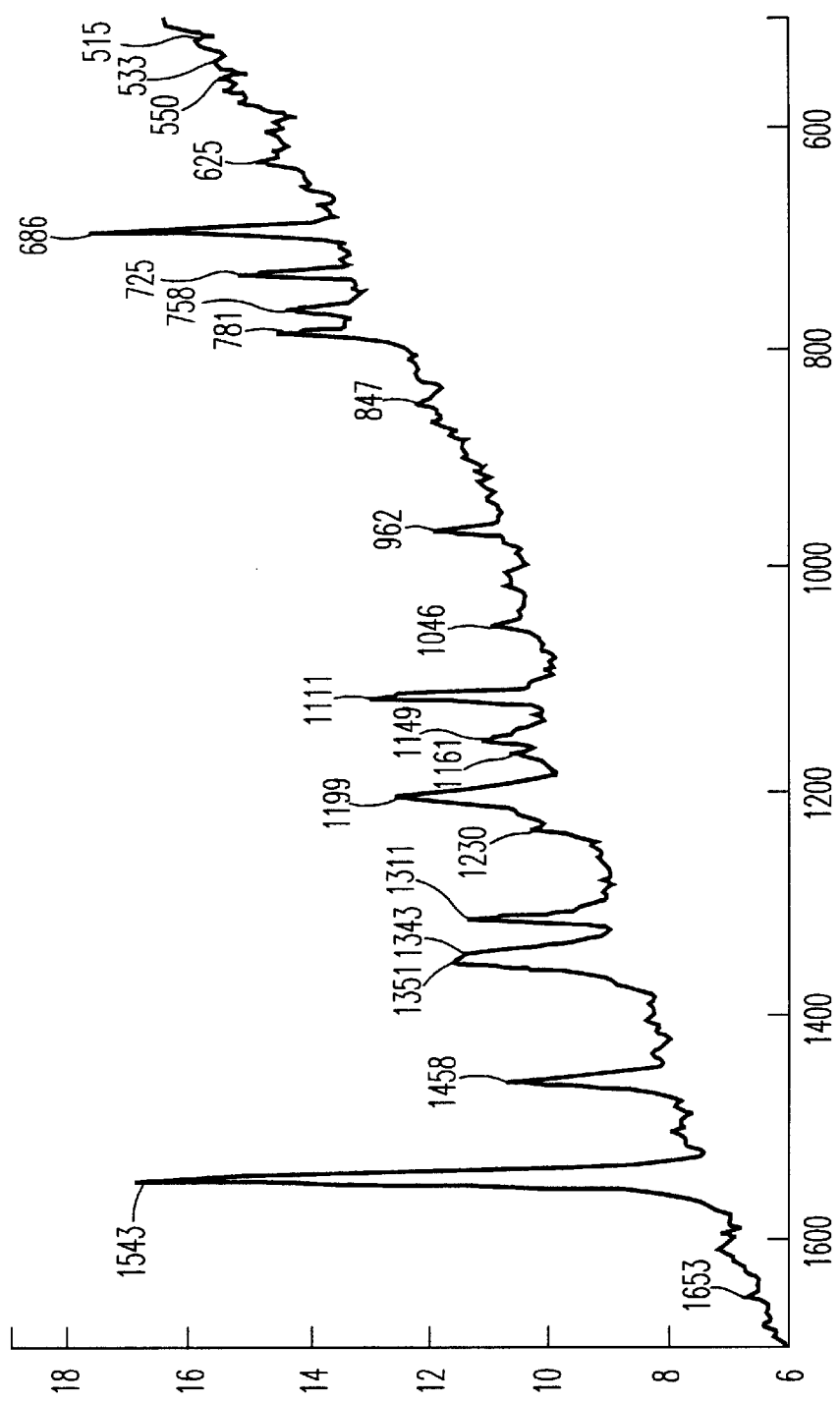
FIG. 32 is a Raman spectral diagram of a charge-generation layer containing a dihydroxysilicon phthalocyanine compound obtained in Example 14.

| | form | Raman shifts ($cm^{-1}$) | | | | | | | | | | | | | |
|---|---|---|---|---|---|---|---|---|---|---|---|---|---|---|---|
| Example 1 | powder | 685 | 725 | 758 | 780 | 962 | 1111 | 1200 | 1230 | 1310 | 1344 | 1352 | 1457 | 1542 | FIG. 19 |
| Example 2 | powder | 685 | 725 | 758 | 780 | 962 | 1111 | 1200 | 1229 | 1310 | 1343 | 1352 | 1457 | 1545 | FIG. 20 |
| Example 3 | powder | 686 | 725 | 758 | 781 | 962 | 1112 | 1200 | 1228 | 1310 | 1344 | 1352 | 1458 | 1545 | FIG. 21 |
| Example 4 | powder | 686 | 725 | 758 | 780 | 962 | 1111 | 1200 | 1227 | 1310 | 1344 | 1351 | 1457 | 1545 | FIG. 22 |
| Example 5 | powder | 686 | 726 | 759 | 781 | 962 | 1112 | 1200 | 1228 | 1311 | 1344 | 1352 | 1458 | 1545 | FIG. 23 |
| Example 6 | powder | 685 | 725 | 758 | 780 | 962 | 1111 | 1200 | 1229 | 1310 | 1343 | 1352 | 1457 | 1545 | FIG. 24 |
| Comparative Example 1 | powder | 685 | 723 | 759 | 779 | 961 | 1110 | 1199 | 1231 | 1311 | 1342 | 1352 | 1458 | 1540 | FIG. 25 |
| Comparative Example 2 | powder | 685 | 721 | 757 | 778 | 961 | 1110 | 1196 | 1226 | 1312 | 1343 | 1352 | 1460 | 1541 | FIG. 26 |
| Example 7 | CG layer | 683 | 722 | 755 | 777 | 959 | 1109 | 1199 | 1225 | 1308 | 1341 | 1350 | 1456 | 1542 | FIG. 27 |
| Example 9 | CG layer | 683 | 727 | 756 | 777 | 959 | 1109 | 1197 | 1224 | 1308 | 1341 | 1351 | 1457 | 1542 | FIG. 28 |
| Comparative Example 3 | CG layer | 686 | 722 | 759 | 779 | 961 | 1111 | 1202 | 1230 | 1311 | 1345 | 1353 | 1460 | 1544 | FIG. 29 |
| Comparative Example 4 | CG layer | 685 | 723 | 758 | 779 | 962 | 1111 | 1198 | 1229 | 1311 | 1345 | 1353 | 1460 | 1543 | FIG. 30 |
| Example 13 | powder | 686 | 726 | 759 | 781 | 962 | 1112 | 1200 | 1230 | 1311 | 1345 | 1352 | 1458 | 1545 | FIG. 31 |
| Example 14 | powder | 686 | 725 | 758 | 781 | 962 | 1111 | 1199 | 1230 | 1311 | 1343 | 1351 | 1458 | 1543 | FIG. 32 |

TABLE 8

Raman shift intensity ratios of dihydroxysilicon phthalocyanines
Raman-shift intensity ratios ($cm^{-1}$)

| | | 685/1542 | 724/685 | 780/758 | 1229/1199 | 1352/1343 | |
|---|---|---|---|---|---|---|---|
| Example 1 | powder | 0.38 | 0.68 | 1.32 | 0.27 | 1.09 | FIG. 19 |
| Example 2 | powder | 0.42 | 0.60 | 1.34 | 0.30 | 1.12 | FIG. 20 |

TABLE 8-continued

Raman shift intensity ratios of
dihydroxysilicon phthalocyanines
Raman-shift intensity ratios (cm$^{-1}$)

| | | 685/1542 | 724/685 | 780/758 | 1229/1199 | 1352/1343 | |
|---|---|---|---|---|---|---|---|
| Example 3 | powder | 0.41 | 0.61 | 1.28 | 0.30 | 1.12 | FIG. 21 |
| Example 4 | powder | 0.46 | 0.64 | 1.43 | 0.30 | 1.15 | FIG. 22 |
| Example 5 | powder | 0.41 | 0.59 | 1.27 | 0.29 | 1.14 | FIG. 23 |
| Example 6 | powder | 0.46 | 0.64 | 1.41 | 0.29 | 1.13 | FIG. 24 |
| Comparative Example 1 | powder | 0.69 | 0.27 | 0.68 | 0.57 | 0.85 | FIG. 25 |
| Comparative Example 2 | powder | 0.76 | 0.19 | 0.68 | 0.69 | 0.84 | FIG. 26 |
| Example 7 | CG layer | 0.61 | 0.52 | 1.55 | 0.40 | 0.93 | FIG. 27 |
| Example 9 | CG layer | 0.63 | 0.52 | 1.48 | 0.42 | 0.90 | FIG. 28 |
| Comparative Example 3 | CG layer | 0.91 | 0.27 | 0.91 | 0.55 | 0.66 | FIG. 29 |
| Comparative Example 4 | CG layer | 0.95 | 0.23 | 0.92 | 0.61 | 0.81 | FIG. 30 |
| Example 13 | powder | 0.41 | 0.57 | 1.26 | 0.27 | 1.06 | FIG. 31 |
| Example 14 | powder | 0.44 | 0.50 | 1.22 | 0.31 | 1.09 | FIG. 32 |

(Evaluation)

The initial electric properties (charge potential, dark decay, half-decay exposure sensitivity, residual potential) of the obtained photoreceptor were evaluated using an electrostatic copy paper testing machine (Model EPA-8100 of Kawaguchi Denki Seisakusho Co.). The photoreceptor was negatively charged by corona discharge at an application voltage which was set to ensure that the corona current should be 22 $\mu$A in the dark (surface potential at this point was taken as charge potential) and exposed to 1.0 $\mu$W/cm$^2$ monochromatic light having a wavelength of 780 nm for 10 seconds continuously after 2.4 seconds for charging to measure the attenuation of surface potential (surface potential after 10 seconds of exposure was taken as residual potential). The reducing potential of one second after charging was taken as dark decay and the amount of exposure (E1/2) required to reduce surface potential from –450 V to –225 V was taken as half-decay exposure sensitivity. The results are shown in Table 9.

TABLE 9

| | charge potential | dark decay | sensitivity | residual potential |
|---|---|---|---|---|
| Example 7 | 841 | 26 | 0.31 | 13 |
| Example 8 | 800 | 25 | 0.32 | 12 |
| Example 9 | 825 | 16 | 0.27 | 10 |
| Example 10 | 815 | 18 | 0.29 | 12 |
| Example 11 | 802 | 28 | 0.33 | 10 |
| Example 12 | 825 | 23 | 0.32 | 12 |
| Example 13 | 800 | 28 | 0.29 | 10 |
| Example 14 | 720 | 33 | 0.27 | 10 |
| Example 15 | 806 | 20 | 0.39 | 8 |
| Comparative Example 3 | 150 | — | — | — |
| Comparative Example 4 | 80 | — | — | — |

It is understood from Table 9 that dihydroxysilicon phthalocyanines which differ in crystal form have greatly different electric properties. When Raman shift intensity ratios (powder) are 0.65 or less for 685/1,542, 0.3 or more for 724/685, 0.7 or more for 780/758 and 0.5 or less for 1,229/1,199, excellent electric properties can be obtained. In other words, the dihydroxysilicon phthalocyanine having a new crystal form of the present invention is excellent in charge acceptance, dark decay, sensitivity and residual potential. However, dihydroxysilicon phthalocyanines having other crystal forms are extremely inferior in charge acceptance and cannot be used actually.

EXAMPLE 16

Figure 33:
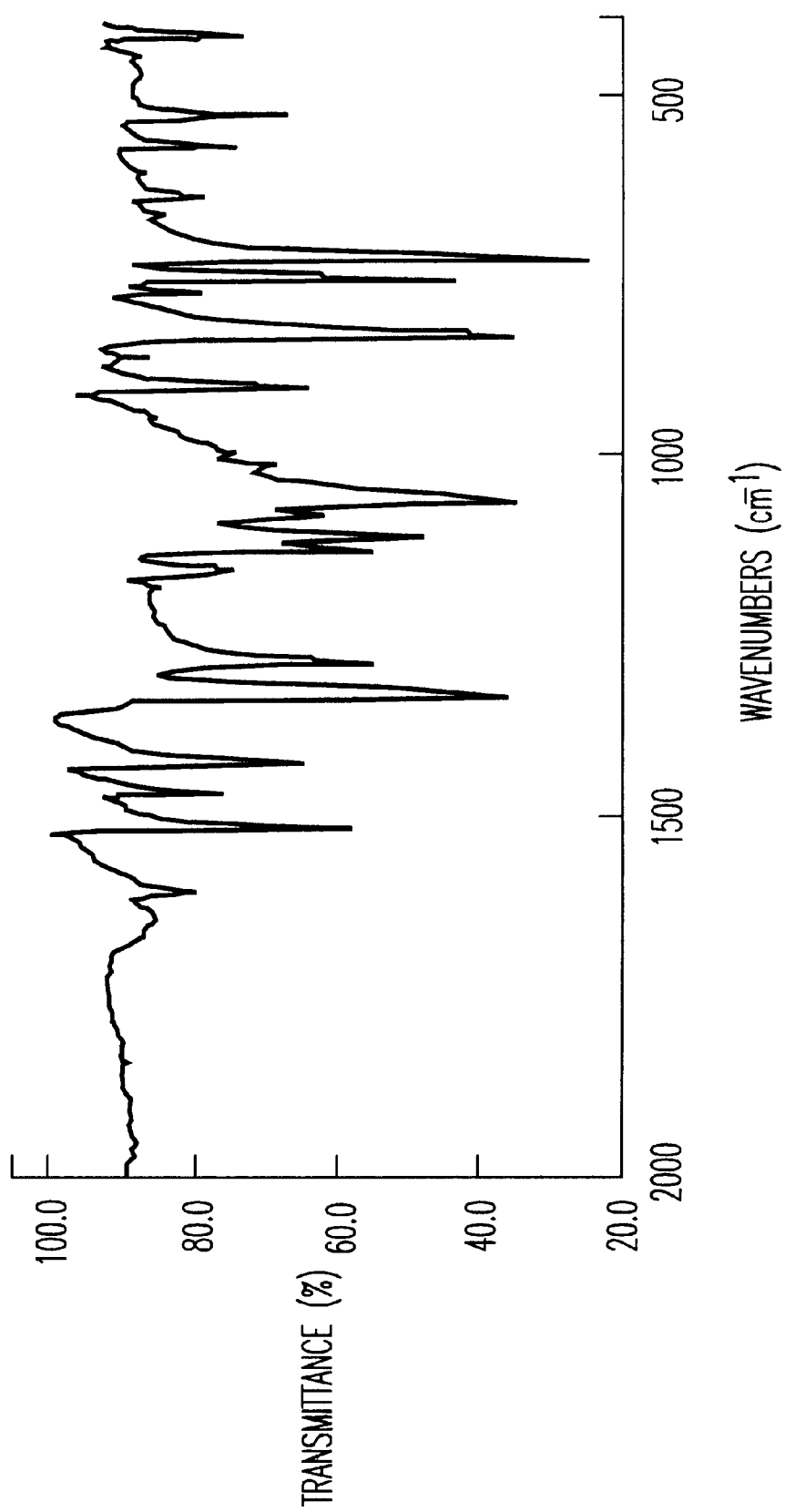
FIG. 33 is an IR spectral diagram of a dihydroxysilicon phthalocyanine compound obtained in Example 16.
Figure 36:
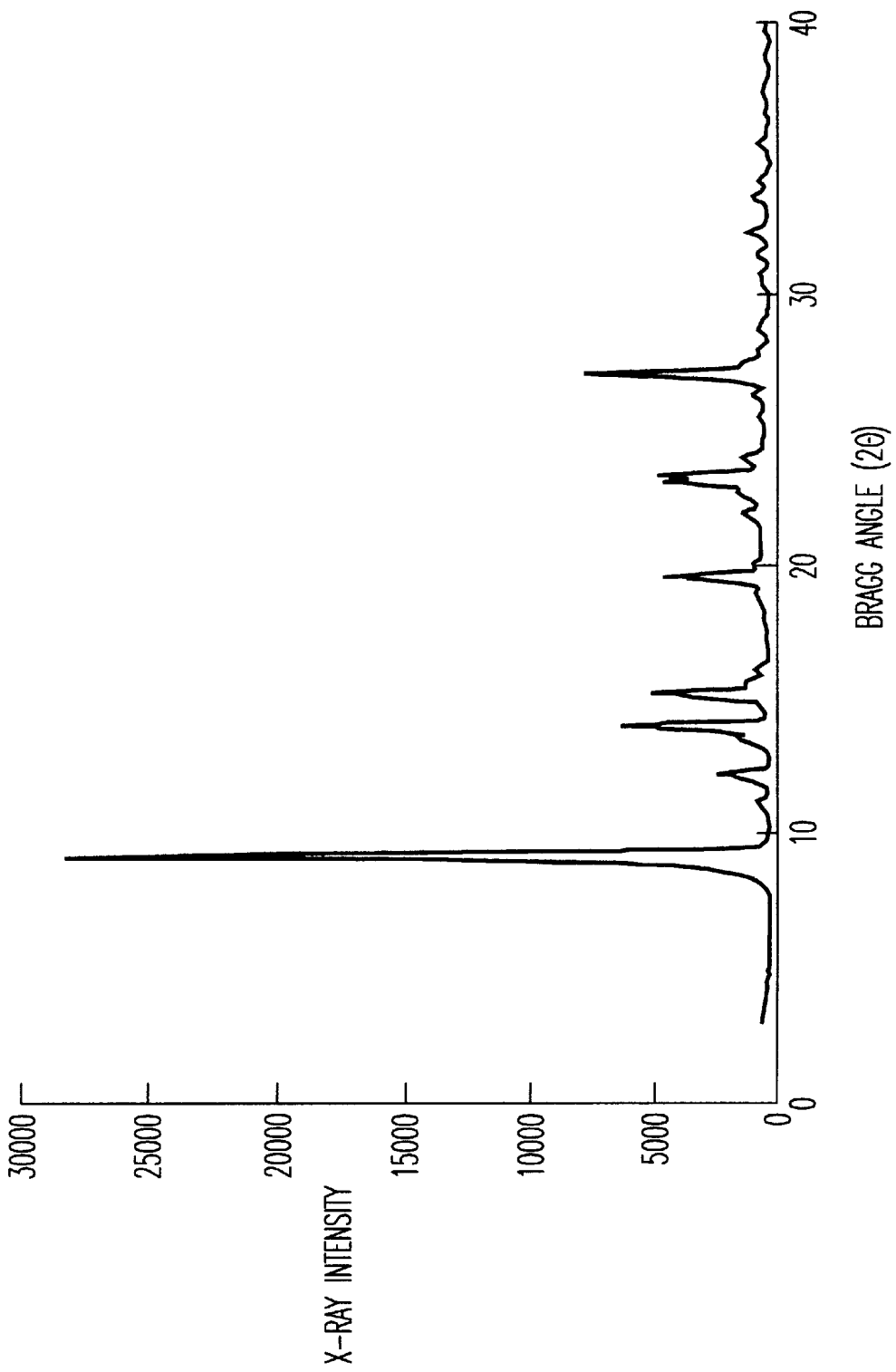
FIG. 36 is an X-ray diffraction diagram of a dihydroxysilicon phthalocyanine compound obtained in Example 16.

10 g of dichlorosilicon phthalocyanine synthesized in Synthesis Example 1 was added to 10 g of water and 90 g of N,N-dimethylformamide (90% DMF aqueous solution) and reacted at 120° C. for 10 hours. The reaction product was thermally filtrated and washed with DMF and acetone in the order named. After the product was stirred in 50 ml of acetone at room temperature, crystals were separated by filtration and dried to obtain 8.4 g of dihydroxysilicon phthalocyanine. As the result of carrying out structural analysis by mass spectrum (negative measurement) and IR spectrum (KBr method), the same spectra as those of Example 1 were obtained. Therefore, it was confirmed that the product was dihydroxysilicon phthalocyanine. FIG. 33 shows the IR spectrum of the dihydroxysilicon phthalocyanine. FIG. 36 shows the X-ray diffraction spectrum of the obtained dihydroxysilicon phthalocyanine. It is a dihydroxysilicon phthalocyanine having the crystal form of the present invention which has a main peak of 9.2° at a 2 θ and other peaks at 12.2, 14.0, 15.3, 19.7, 23.4 and 27.1°, respectively.

EXAMPLES 17 TO 20

5 g of dichlorosilicon phthalocyanine synthesized in Synthesis Example 1 was treated with each of the solvents shown in Table below. The each product was thermally filtrated and washed with acetone in the order named. After the each product was stirred in 50 ml of acetone at room temperature, crystals were separated by filtration and dried respectively to obtain dihydroxysilicon phthalocyanine. As the result of carrying out structural analysis by mass spectrum (negative measurement) and IR spectrum (KBr method), the same spectra as those of Example 1 were obtained, respectively. Therefore, it was confirmed that the products were dihydroxysilicon phthalocyanine.

TABLE 10

| | solvent | | treatment conditions | |
|---|---|---|---|---|
| | organic solvent | water | temp. (° C.) | hours |
| Example 17 | morpholine (40 g) | 10 g | 100 | 10 |
| Example 18 | cyclohexylamine (35 g) | 15 g | 100 | 18 |
| Example 19 | DMSO (45 g) | 5 g | 120 | 8 |
| Example 20 | sulfolane (45 g) | 5 g | 130 | 5 |

EXAMPLE 21

An electrophotographic photoreceptor was produced in the same manner as in Example 7 except that dihydroxysilicon phthalocyanine produced in Example 16 was used in place of dihydroxysilicon phthalocyanine used in Example 7 and evaluated.

TABLE 11

| | charge potential (−V) | dark decay (−V) | sensitivity ($\mu J/cm^2$) | residual potential (−V) |
|---|---|---|---|---|
| Example 7 | 841 | 26 | 0.31 | 13 |
| Example 21 | 758 | 23 | 0.44 | 18 |
| Comparative Example 3 | 150 | — | — | — |
| Comparative Example 4 | 80 | — | — | — |

It is understood from Table 11 that dihydroxysilicon phthalocyanines produced by different methods greatly differ in electric properties. That is, the dihydroxysilicon phthalocyanine produced by the method of the present invention is excellent in charge acceptance, dark decay, sensitivity and residual potential (Example 7 and Comparative Examples 3 and 4 are the same as above).

EXAMPLE 22

Figure 34:
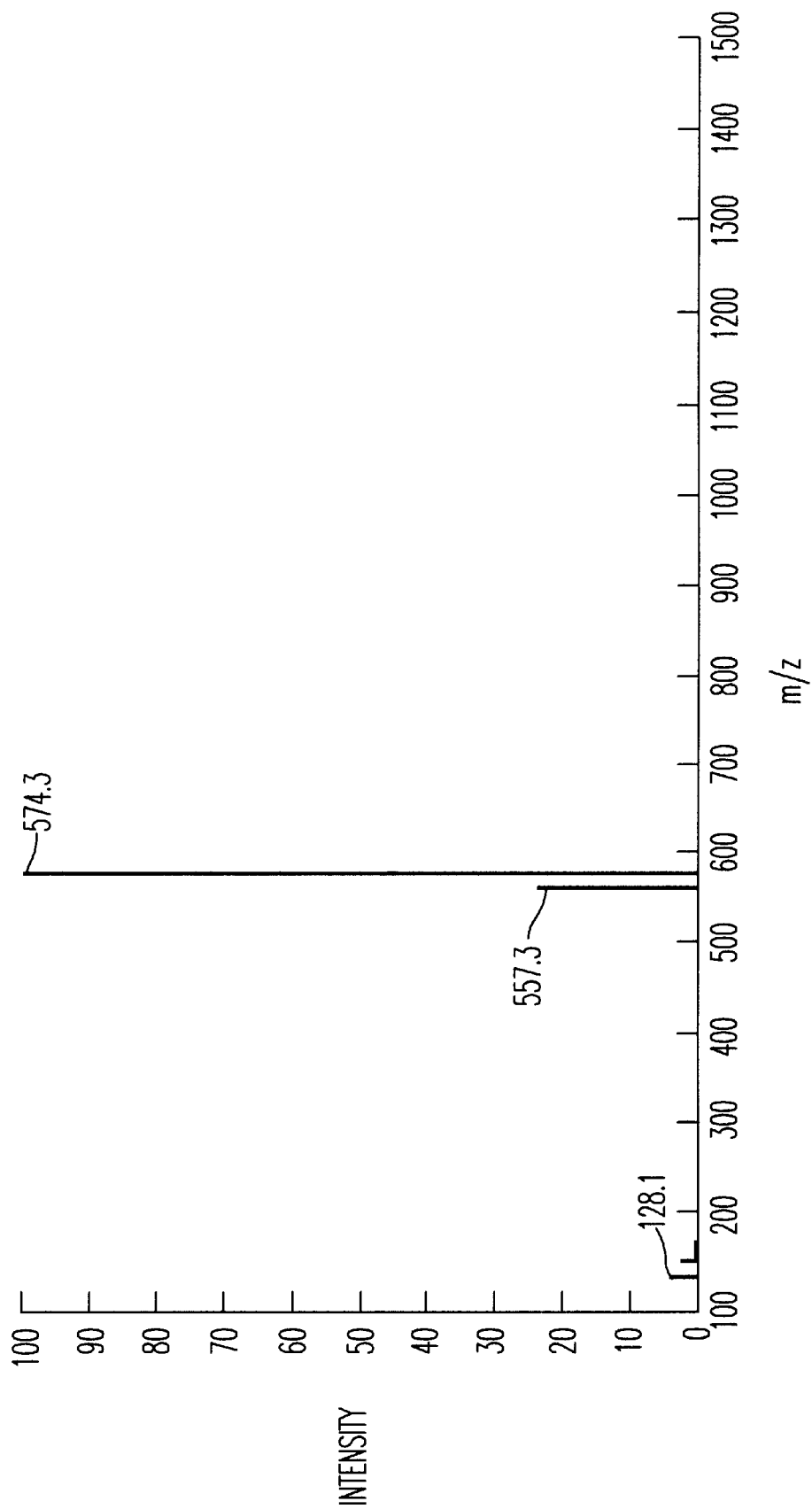
FIG. 34 is a mass spectral diagram of a dihydroxysilicon phthalocyanine compound obtained in Example 22.
Figure 35:
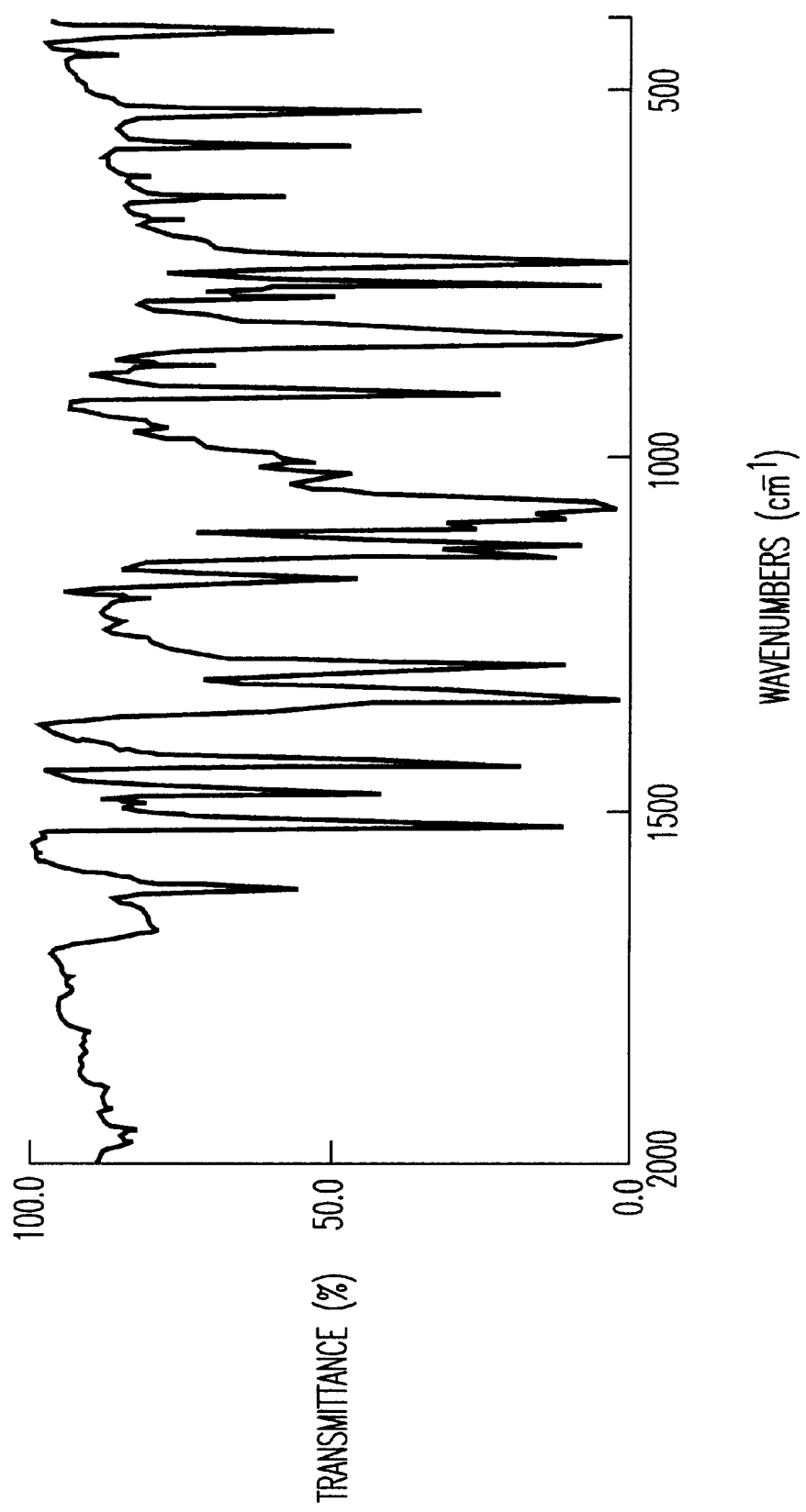
FIG. 35 is an IR spectral diagram of a dihydroxysilicon phthalocyanine compound obtained in Example 22.

10 g of dimethoxysilicon phthalocyanine synthesized in Synthesis Example 2 was added to 5 g of water and 95 g of N-methylpyrrolidone (95% NMP aqueous solution) and reacted at 115° C. for 3 hours. The reaction product was thermally filtrated and washed with NMP and acetone in the order named. After the product was stirred in 100 ml of acetone at room temperature, crystals were separated by filtration and dried to obtain 8.0 g of dihydroxysilicon phthalocyanine. Structural analysis was carried out by mass spectrum (negative measurement), IR spectrum (KBr method) and elemental analysis. FIG. 34 shows the mass spectrum of dihydroxysilicon phthalocyanine and FIG. 35 shows the IR spectrum thereof. In the mass spectrum, a peak of dihydroxysilicon phthalocyanine was observed at an m/z of 574. A peak at an m/z of 557 is a fragment peak at which one hydroxyl group is removed. In the IR spectrum, absorption special to dihydroxysilicon phthalocyanine was observed at 1,519, 1,066 and 839 $cm^{-1}$. The results of elemental analysis are shown below and almost agree with calculation values. It was thereby confirmed that the product was dihydroxysilicon phthalocyanine.

TABLE 12

| | C (%) | H (%) | N (%) | Si (%) |
|---|---|---|---|---|
| measurement values | 62.70 | 3.10 | 19.10 | 4.94 |
| calculation values | 66.89 | 3.16 | 19.50 | 4.89 |

EXAMPLE 23

10 g of dimethoxysilicon phthalocyanine synthesized in Synthesis Example 2 was added to 10 g of water and 90 g of N,N-dimethylformamide (90% DMF aqueous solution) and reacted at 120° C. for 3 hours. The reaction product was thermally filtrated and washed with DMF and acetone in the order named. After the product was stirred in 50 ml of acetone at room temperature, crystals were separated by filtration and dried to obtain 8.4 g of dihydroxysilicon phthalocyanine. As the result of carrying out structural analysis by mass spectrum (negative measurement) and IR spectrum (KBr method), the same spectra as those of Example 22 were obtained. Therefore, it was confirmed that the product was dihydroxysilicon phthalocyanine.

EXAMPLES 24 TO 27

5 g of dimethoxysilicon phthalocyanine synthesized in Synthesis Example 2 was treated with each of the solvents shown in Table below. The each product was thermally filtrated and washed with acetone in the order named. After the each product was stirred in 50 ml of acetone at room temperature, crystals were separated by filtration and dried respectively to obtain dihydroxysilicon phthalocyanine. As the result of carrying out structural analysis for obtained products by mass spectrum (negative measurement) and IR spectrum (KBr method), the same spectra as those of Example 22 were obtained, respectively. Therefore, it was confirmed that the products were dihydroxysilicon phthalocyanine.

TABLE 13

| | solvent | treatment conditions | |
|---|---|---|---|
| | organic solvent | temp. (° C.) | hours |
| Example 24 | propylene carbonate (200 ml) | 120 | 3 |
| Example 25 | N,N-dimethylacetoamide (150 ml) | 130 | 3 |
| Example 26 | DMSO (200 ml) | 130 | 3 |
| Example 27 | sulfolane (200 ml) | 120 | 3 |

EXAMPLE 28

An electrophotographic photoreceptor was produced in the same manner as in Example 7 except that dihydroxysilicon phthalocyanine produced in Example 22 was used in place of dihydroxysilicon phthalocyanine used in Example 7 and evaluated.

EXAMPLE 29

An electrophotographic photoreceptor was produced in the same manner as in Example 7 except that dihydroxysilicon phthalocyanine produced in Example 23 was used in place of dihydroxysilicon phthalocyanine used in Example 7 and evaluated.

TABLE 14

| | charge potential (-V) | dark decay (-V) | sensitivity (μJ/cm$^2$) | residual potential (-V) |
|---|---|---|---|---|
| Example 28 | 825 | 16 | 0.27 | 13 |
| Example 29 | 769 | 19 | 0.29 | 18 |
| Comparative Example 3 | 150 | — | — | — |
| Comparative Example 4 | 80 | — | — | — |

(Comparative Examples 3 and 4 are the same as above)

It is understood from Table 14 that dihydroxysilicon phthalocyanines produced by different methods greatly differ in electrical properties. In other words, dihydroxysilicon phthalocyanine produced by the method of the present invention is excellent in charge acceptance, dark decay, sensitivity and residual potential whereas dihydroxysilicon phthalocyanines produced by other methods are extremely inferior in charge acceptance and cannot be used actually.

What is claimed is:

1. A dihydroxysilicon phthalocyanine compound which is monoclinic and has lattice constants a=12.8±1Å, b=14.5±1Å, c=6.8±1Å and β=94.4±1°.

2. A dihydroxysilicon phthalocyanine compound having peaks at a Bragg angle 2 θ (±0.3°) of 9.2, 14.1, 15.3, 19.7 and 27.1° in the X-ray diffraction spectrum measured by using CuK$_{α1}$ radiation.

3. A dihydroxysilicon phthalocyanine compound showing Raman shifts at least at 685 cm$^{-1}$ and 1,542 cm$^{-1}$ in an FT-Raman spectrum and an intensity ratio of a Raman shift at 685 cm$^{-1}$ to a Raman shift at 1,542 cm$^{-1}$ of 0.65 or less.

4. A dihydroxysilicon phthalocyanine compound which shows Raman shifts at least at 685 cm$^{-1}$, 724 cm$^{-1}$, 758 cm$^{-1}$, 780 cm$^{-1}$, 1,199 cm$^{-1}$, 1,229 cm$^{-1}$ and 1,542 cm$^{-1}$ and has Raman shift intensity ratios of 0.65 or less for 685 cm$^{-1}$/1,542 cm$^{-1}$, 0.3 or more for 724 cm$^{-1}$/685 cm$^{-1}$, 0.7 or more for 780 cm$^{-1}$/758 cm$^{-1}$ and 0.5 or less for 1,229 cm$^{-1}$/1,199 cm$^{-1}$.

5. An electrophotographic photoreceptor having a photosensitive layer containing the dihydroxysilicon phthalocyanine compound of any one of claims 1 to 4 on a electroconductive support.

* * * * *